United States Patent [19]

Bhanu et al.

[11] Patent Number: 5,036,474
[45] Date of Patent: Jul. 30, 1991

[54] MOTION DETECTION AND TRACKING FROM A MOBILE PLATFORM

[75] Inventors: Bir Bhanu, New Brighton, Minn.; Wilhelm Burger, Linz, Austria

[73] Assignee: Honeywell Inc., Minneapolis, Minn.

[21] Appl. No.: 331,706

[22] Filed: Mar. 31, 1989

[51] Int. Cl.[5] ................................................. G01S 5/00
[52] U.S. Cl. ................................. 364/516; 364/424.02
[58] Field of Search ................ 364/424.02, 423, 980, 364/514, 516; 358/103, 105, 93; 235/411

[56] References Cited

U.S. PATENT DOCUMENTS

| | | | |
|---|---|---|---|
| 4,148,026 | 4/1979 | Gendreu | 235/411 |
| 4,162,775 | 7/1979 | Voles | 235/411 |
| 4,270,143 | 5/1981 | Morris | 364/516 |

OTHER PUBLICATIONS

"Intelligent Target Recognizers," by H. Nasr, W. Au, and S. Mader, in Scientific Honeyweller, Summer 1988.
"Machine Vision for the Battlefield," by B. Bhanu, in Scientific Honeywell, Summer 1988.
"Triple: A Multi-Strategy Machine Learning Approach to Target Recognition," by B. Bhanu and J. Ming, in Image Understanding Workshop, Apr. 6–8, 1988.
"Dynamic Model Matching for Target Recognition from a Mobile Platform," by H. Nasr and B. Bhanu, in Image Understanding Workshop, Apr. 6–8, 1988.
"Qualitative Motion Detection and Tracking of Targets from a Mobile Platform," by B. Bhanu and W. Burger, in Image Understanding Workshop, Apr. 6–8, 1988.
"Qualitative Reasoning and Modeling for Robust Target Tracking and Recognition from a Mobile Platform," by B. Bhanu and D. Panda, in Image Understanding Workshop, Apr. 6–8, 1988.
"DRIVE—Dyamic Reasoning from Integrated Visual Evidence," by B. Bhanu and W. Burger, in Image Understanding Workshop, Feb. 23–25, 1987.
"Interpretation of Terrain Using Hierarchical Symbolic Grouping for Multi-Spectral Images," by B. Bhanu and P. Symosek in Image Understanding Workshop, in Feb. 23–25, 1987.
"Guiding an Autonomous Land Vehicle Using Knowlege-Based Landmark Recognition," by H. Nasr, B. Bhanu and S. Schaffer, in Image Understanding Workshop, Feb. 23–25, 1987.
"Honeywell Progress on Knowledge-Based Robust Target Recongition & Tracking," by B. Bhanu, D. Panda and R. Aggarwal, in Image Understanding Workshop, Feb. 23–25, 1987.

Primary Examiner—Parshotam S. Lall
Assistant Examiner—Michael Zanelli
Attorney, Agent, or Firm—John G. Shudy, Jr.

[57] ABSTRACT

From two-dimensional displacement vectors of features of objects in successive two-dimensional images, computing a fuzzy focus of expansion and determining qualitative relationships among the features of the scene and motion parameters of the objects in the images and thereby constructing a qualitative three-dimensional representation of the scene captured in two-dimensional images.

5 Claims, 22 Drawing Sheets

MOTION DETECTION AND TRACKING FROM A MOBILE PLATFORM

FIELD OF INVENTION

The present invention pertains to imaging and particularly to three-dimensional interpretation of two-dimensional image sequences. More particularly, the invention pertains to detection and tracking o moving objects from a moving platform.

BACKGROUND OF THE INVENTION

Visual information plays a key role in mobile robot operation. Even with the use of sophisticated inertial navigation systems, the accumulation of position errors requires periodic corrections. Operation in unknown environments or mission tasks involving search, rescue, or manipulation, critically depends upon visual feedback. Motion understanding becomes vital as soon as moving objects are encountered in some form, e.g., while following a convoy, approaching other vehicles, or detecting moving threats. In the given case of a moving camera, image motion can supply important information about the spatial layout of the environment and the actual movements of the autonomous mobile robot or platform with the camera.

For intelligent action in the presence of potential threats and targets, or navigation in a traffic environment, information on actual motion in the scene is indispensable. Moving objects must be detected and isolated from the stationary environment, their current motions must be estimated to track them, and expectations about their future behavior must be created. Since the camera itself is moving, the stationary part of the scene cannot be assumed to be registered in subsequent images, as in the case of a stationary sensor. Simple frame-differencing or feature-matching techniques to detect and isolate moving objects do not work in this case because image changes, due to sensor motion, tend to generate too many false alarms in cluttered scenes. More sophisticated image-based techniques, which apply 2-D transformations (warping) to the image to compensate for background motion, work well only when objects are moving in front of a relatively flat background, such as in some air-to-ground applications. To detect actual object motion in the complex scenario of a robotic vehicle, the 3-D structure of the observed environment, together with the vehicle's motion, must be taken into account.

Previous work in motion understanding has focused mainly upon numerical approaches for the reconstruction of 3-D motion and scene structure from 2-D image sequences. In the classic numerical approach, structure and motion of a rigid object are computed simultaneously from successive perspective views by solving systems of linear or nonlinear equations. This technique is reported to be noise sensitive even when more than two frames are used. Non-rigid motion, or the presence of several moving objects in the field of view, tends to cause a relatively large residual error in the solution of the system of equations. Moreover, in some cases of non-rigid motion, an acceptable numerical solution may exist that corresponds to a rigid motion interpretation. In such situations, the movements of individual entities in the field of view are not detectable by the classic scheme. This approach has been generalized to handle multiple moving objects by using a complex grouping process to segment the optical flow field.

For situations having mainly translational camera movements, such as robotic land vehicles, alternative systems have been developed to utilize this particular form of self-motion. To reconstruct the 3-D scene structure, some researchers have assumed planar motion or even pure camera translation. Usually, unlike the present invention, a completely static environment is assumed.

SUMMARY OF THE INVENTION

While quantitative techniques have traditionally been dominant in machine vision, qualitative techniques are now receiving increasing attention in this field. Qualitative techniques may replace expensive numerical computations and models (with often unnecessary precision) with a simpler process and more eloquent system which reasons about the important properties of the scene, using less precise representations. The advantages of qualitative techniques of the present invention are particularly apparent for higher levels of vision. Such techniques are useful for building abstract descriptions gradually, starting at the lowest level of vision. Multiple scene interpretations are utilized to identify the ambiguities inherent to any type of scene analysis. If only one interpretation is available at any time, the chance of that interpretation being incorrect would be significant. Simultaneously evaluating a set of scene interpretations allows several alternatives to be considered and, depending upon the situation, an appropriate interpretation (e.g., the most "plausible" or the most "threatening" interpretation) can be selected.

The present invention for motion detection consists of three attainments: 1) estimating the robot's egomotion; 2) reconstructing the 3-D scene structure; and 3) evaluating the motion of individual objects from a sequence of monocular images. A two-stage process used in the invention begins with given sets of displacement vectors between distinct image features in successive frames. The availability of reliable displacement vectors is vital. Although manual point tracking is used for the examples given below, automatic feature selection and tracking is possible.

As to the first attainment, the robot's egomotion is computed in terms of rotations and the direction of translation. To cope with the problems of noise, a "fuzzy" focus of expansion (FOE) concept is used, which defines an image region rather than a single point. All of the numerical effort is packed into the computation of the "focus of expansion" (FOE), a low-level process which is performed entirely in 2-D. The FOE concept has been extended to cope with the problems of noise and errors in the original displacement vectors. Instead of a single FOE, one determines a connected region of possible FOE-locations, called the fuzzy FOE, whose shape is directly related to the "goodness" of the displacement field.

In the second stage, a 3-D scene model is constructed by analyzing the movements and positions of image features relative to each other and relative to the fuzzy FOE. The heart of this invention demonstrates how a fuzzy FOE is used to draw powerful conclusions about motion and the 3-D scene structure. From these clues, one can construct and maintain an internal 3-D representation, termed the qualitative scene model (QSM), in a generate-and-test cycle over extended image sequences. Using a mainly qualitative strategy of reasoning and modeling, to overcome the ambiguities inherent in dynamic scene analysis, multiple interpretations of the scene are pursued simultaneously. The QSM can also serve as a platform for other visual processes such as occlusion analysis, perceptual grouping, and object recognition. This second stage allows the determination of moving objects in the scene. The 3-D motion is detected in two ways: to begin, some forms of motion are concluded directly from the 2-D displacement vectors without any knowledge about the underlying 3-D structure. Next, motion is detected by discovering inconsistencies between the current state of the internal 3-D scene model and the changes actually observed in the image. Detected objects are tracked from frame to frame.

The overall structure of the interpretation process begins with original displacement vectors. From the original displacement vectors (obtained by matching corresponding features), the fuzzy FOE and the derotated displacement field are computed. The qualitative scene model (QSM) is built in a hypothesize-and-test cycle by two sets of rules. Generation rules search for significant image events and place immediate conclusions (hypotheses) in the model. Verification rules check existing hypotheses if they are consistent with the changes occurring in the image. A set of environmental entities that are believed to be stationary is supplied by the QSM to be used by the FOE-computation.

The QSM can be considered as the "mind" of the motion detection and tracking system. The QSM is a 3-D camera-centered representation of the scene which describes the observed environment by using a set of simple qualitative relationships. The set of entities in the QSM is conceptually split into two parts—the stationary world and a set of independently moving objects. Construction of the QSM over time is accomplished by a reasoning process which draws conclusions from significant configurations and changes in the image. As the vehicle travels through the environment, the QSM is continuously updated and revised by adding or deleting hypotheses.

Again, the state of the QSM is not a single interpretation but a set of interpretations which are all pursued simultaneously. This state provides a very flexible mechanism for handling the inherent ambiguities encountered in image understanding. Each interpretation is a collection of hypotheses called partial interpretations which cover overlapping subjects of the entities in the model.

DESCRIPTION OF THE PREFERRED EMBODIMENT

Figure 1:
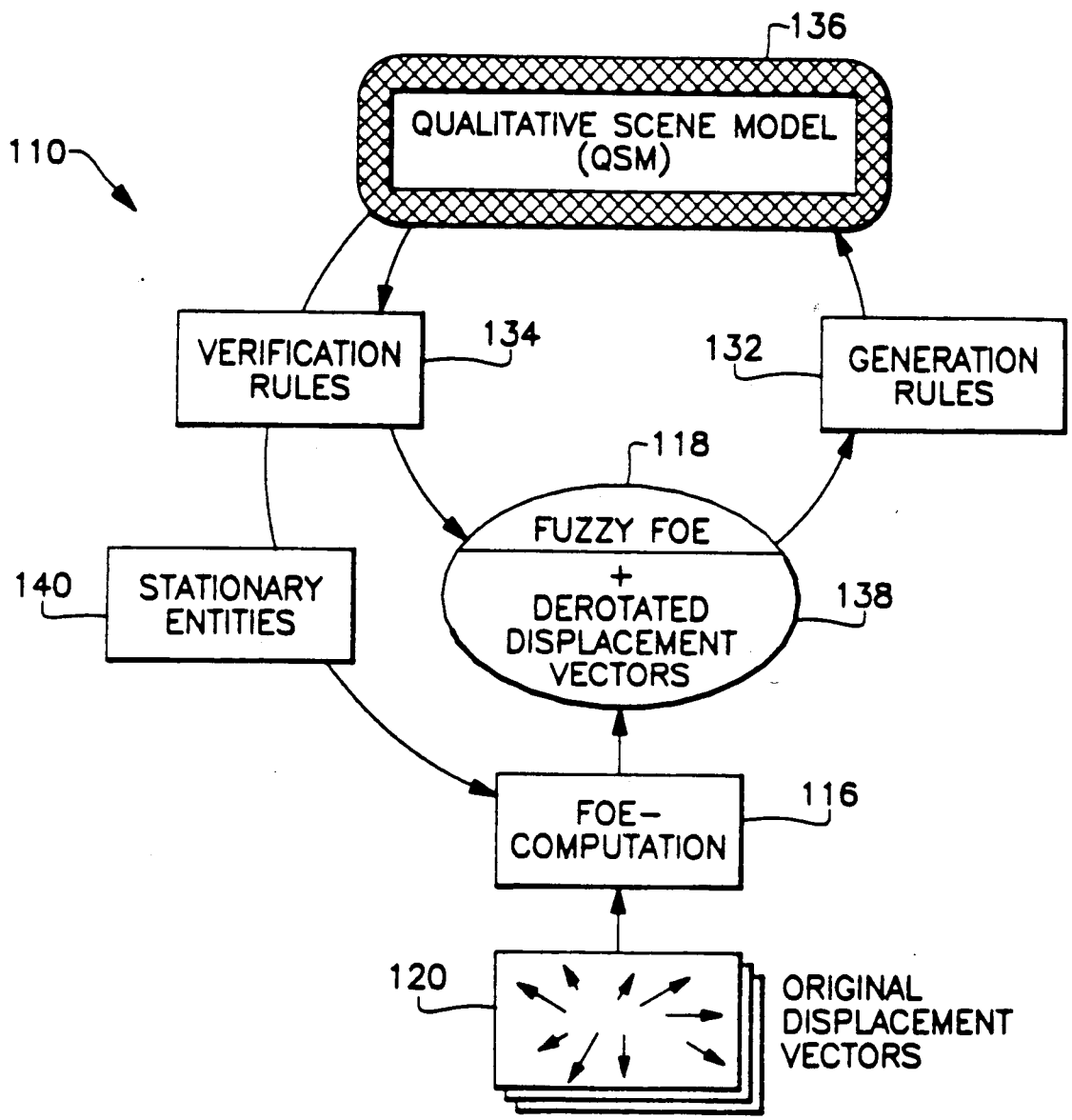
FIG. 1 is a diagram illustrating the overall structure of the interpretation process.

FIG. 1 illustrates the heart of the invention, that is, structure 110 of the scene interpretation process. An important computation 116 of the present invention 110 is the focus of expansion (FOE), i.e., the image location from which all points seem to diverge radially under pure camera translation in the forward direction. In practice, locating the FOE accurately is generally impossible under noisy conditions. Thus, this concept has been extended by computing a patch of possible FOE locations, called the fuzzy FOE 118, instead of a single point.

The present invention has two main components. Given a set of point (token) correspondences for each pair of frames, one first computes the fuzzy FOE 118 and removes the effects of camera rotation. In the second step, one uses the 2-D locations and motion of features relative to each other and relative to the fuzzy FOE 118 to reason about the 3-D scene structure as well as 3-D motion of moving objects. These results are used to incrementally construct a model of the environment, which includes the information about the static scene structure and the moving objects therein. This reasoning process and the scene model are characterized by two key features—the emphasis on qualitative techniques and the ability to pursue multiple scene interpretations simultaneously.

The overall process of constructing the scene interpretations consists of three main steps. First, significant features (points, boundaries, corners, etc.) are extracted from the image sequence and the 2-D displacement vectors 120 are computed for each frame pair. In the following, one employs only point features and assumes that the problem of selecting and matching corresponding points is solved. In the second step, one uses the original displacement field 120 to compute the fuzzy FOE 118, i.e., the vehicle's approximate direction of heading and the amount of rotation in space. Most of the necessary quantitative computations are performed in this 2-D step which is described below. The third step (2-D change analysis) constructs the 3-D qualitative scene model by analyzing the movements of individual features with respect to the fuzzy FOE location.

Figure 2:
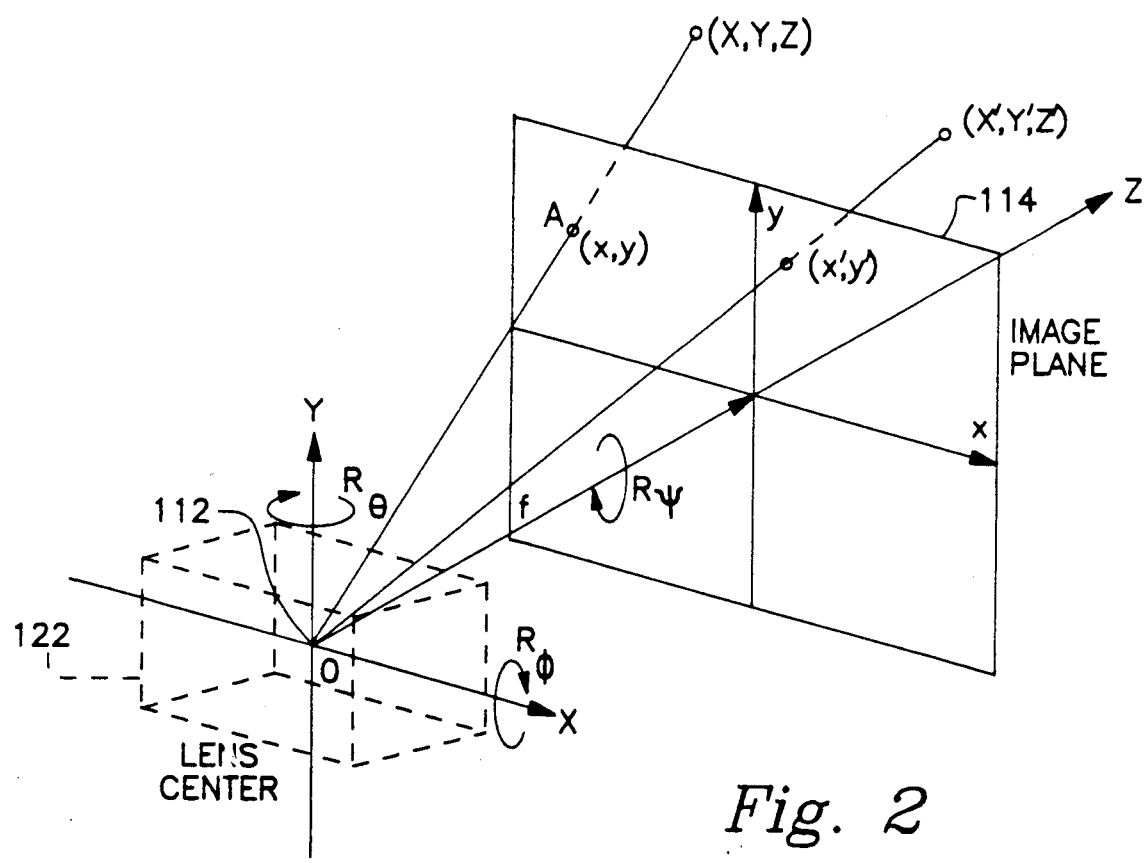
FIG. 2 is of a camera-centered coordinate system.

A camera-centered coordinate system is utilized as illustrated in FIG. 2. The origin O of the coordinate system is located at the lens center 112 of camera 122. The focal length f is the distance between the lens center 112 and the image plane 114. A 3-D point (X Y Z) is mapped onto the 2-D image location (x y).

Figure 3A:
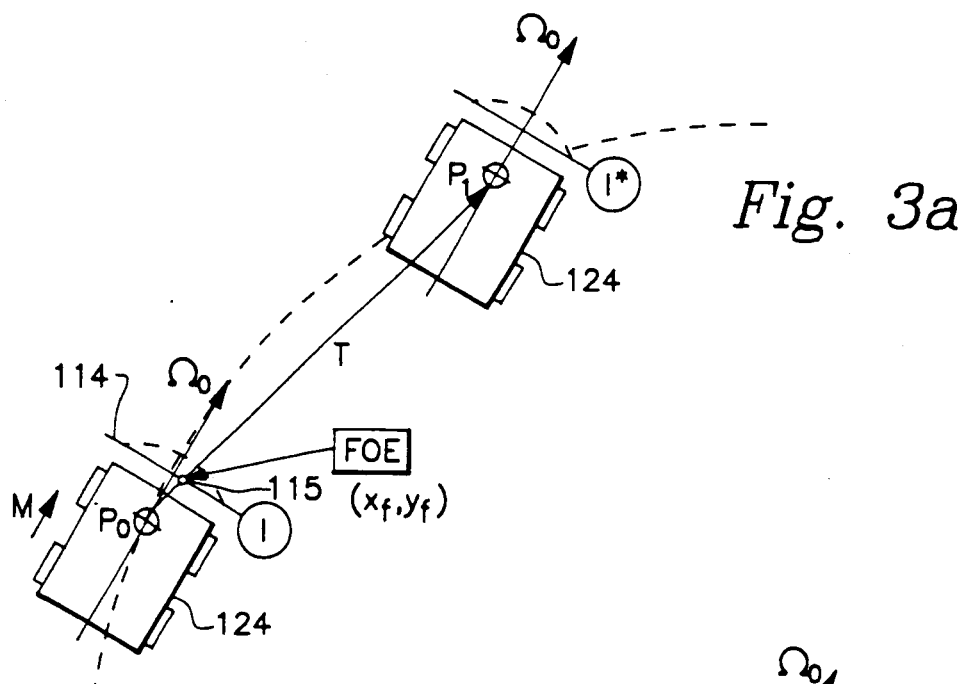
FIGS. 3a and 3b, illustrate an interpretation of the focus of expansion.
Figure 3B:
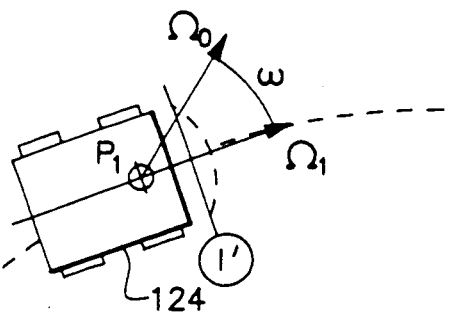

When camera 122 undergoes pure forward translation along a straight line in space, the images of all stationary features seem to diverge out of one particular location in the image, commonly called the "focus of expansion" (FOE). In reality, vehicle 124 in FIGS. 3a and 3b not only translates but also rotates about its three major axes X, Y, Z. For present purposes, the movement of land vehicle 124 can be sufficiently approximated by a translation T followed by rotations about the vertical axis $R_\theta$ (pan) and the horizontal axis $R_\psi$ (tilt), ignoring the yaw component $R_\psi$. A 3-D point $X=(x,y,z)$ in the camera-centered coordinate frame of FIGS. 2, 3a and 3b, is thus transferred by the camera movement M to a new location $X'=(x',y',z')$ $$M: X \rightarrow X' = R_\phi R_\theta T(X).$$

If the observed scene is completely stationary, the effects upon the image caused by the camera movement M can be described by a 2-D transformation d (for displacement), which takes the original image I to the subsequent image I'. The 3-D rotations $R_\phi$ and $R_\theta$ and translation T have their equivalents in d as the separate 2-D transformations $r_\phi$, $r_\theta$, and t:

$$d: I \rightarrow I' = r_\phi r_\theta t(I).$$

Ignoring the effects at the boundary of the image, since pure camera rotations do not supply new aspects of the 3-D environment, the corresponding 2-D transformations $r_\phi$ and $r_\theta$ are effectively the mappings of the image onto itself. Conversely, the image effects t of pure camera translation depend upon each 3-D point's actual location in space. We introduce an intermediate (hypothetical) image I*, which is the result of a pure camera translation T:

$$t: I \rightarrow I^*$$

An interpretation of the focus of expansion (FOE) is illustrated in FIGS. 3a and 3b. Vehicle motion between its initial position (where image I is observed) and its final position (image I') is modeled as two separate steps. First, the vehicle translates by a 3-D vector T from position $P_0$ to position $P_1$ without changing its orientation $\Omega_0$ in FIG. 3a. After this step, the intermediate image I* would be seen. Subsequently in FIG. 3b, the vehicle rotates by changing its orientation from $\Omega_0$ to $\Omega_1$. Now image I' is observed. The FOE is found where the vector T intersects the image plane I (and also I*).

Notice that the image I* is never really observed, except in the special case of pure camera translation (FIG. 3a). However, I* has two important properties: First, all displacement vectors between corresponding points in I and I* seem to diverge from a particular image location $(x_f, y_f)$ known as the FOE, unless the camera does not translate at all. We call this property of the displacement field "radial mapping (I,I*)." Secondly, for given tilt and pan angles $\phi$ and $\theta$, I* can be obtained regardless of the 3-D scene structure by applying the inverse mappings $r_\phi^{-1}$ and $r_\theta^{-1}$ (which always exist) to the observed image I':

$$I^* = r_\theta^{-1} r_\phi^{-1} I'.$$

Once suitable mappings $r_\theta^{-1} r_\phi^{-1}$, have been found, the FOE can be located for the pair of images I and I*. However, it is not trivial to determine how close a given displacement field is to a radial mapping without knowing the location of the FOE. In most of the proposed schemes for testing this property, the displacement vectors are extended as straight lines to measure the spread of their intersections. Unfortunately, the resulting error functions are noise-sensitive and not well behaved for varying values of and $\phi$ and $\theta$, i.e., they require expensive global search.

Figure 4:
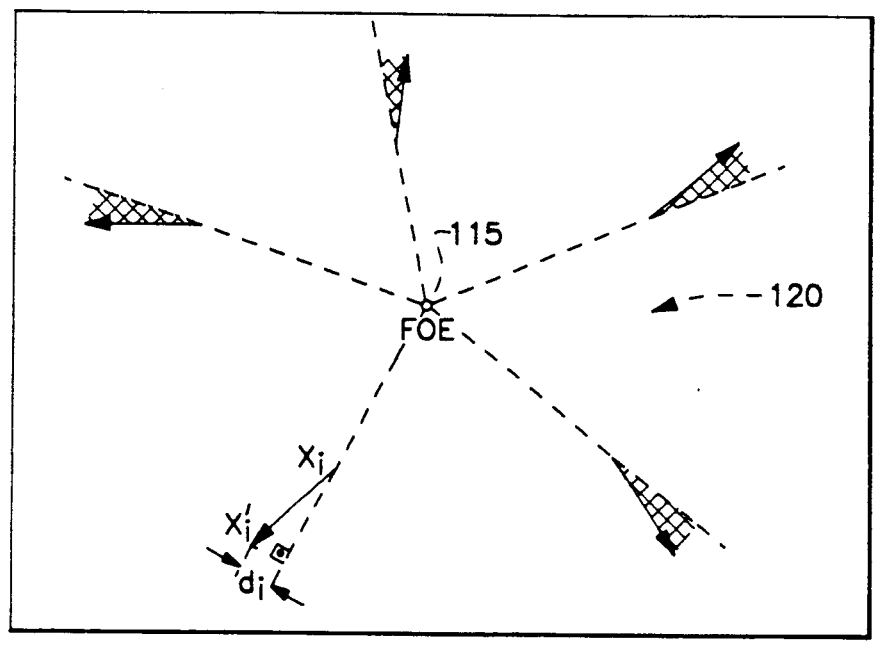
FIG. 4 reveals the method of measuring the deviation from a radial expansion pattern.

Alternatively, one can hypothesize a particular FOE 115 (FIG. 4) and then measure how the displacement field resembles a radial pattern emanating from this FOE. FIG. 4 shows how the deviation from a radial expansion pattern is measured. For a hypothetical FOE and a given set of displacement vectors $\{x_i \rightarrow x'_i\}$, the deviation is defined as the sum of the perpendicular distances $\Sigma d_i$. The sum of the perpendicular distances $d_i$ between radial rays and the end points of the displacement vectors 120 is a simple and useful measure (FIG. 4). The optimal rotation angles for a particular FOE 115, i.e., those that would minimize this deviation, and the remaining error, can be found analytically. This remaining error is used as the criterion to evaluate a hypothetical FOE. When plotted as a 2-D distribution, the resulting error function is smooth and monotonic within a large area around the actual FOE. This means that even from a poor initial guess the global optimum can be found by local search methods, such as steepest descent.

While the above technique is robust even in the presence of considerable noise and under small camera translation, the 2-D error function flattens out in these extreme cases and the location of minimum error may be considerably off the actual FOE. The local shape of the error function is therefore an important indicator for the accuracy of the result. This raises the question whether it is reasonable to locate the FOE as one particular point in the image. After all, even humans seem to have difficulties in estimating the direction of heading under similar conditions.

The concept of the FOE has been extended to specify not a single image location but a connected region, termed the fuzzy FOE, that reflects the shape of the error distribution. In general, a flat error function is reflected by a large fuzzy FOE, i.e., little accuracy in the location of the FOE, whereas a small region indicates a distinct local optimum for the FOE. The following algorithm computes the fuzzy FOE by first looking for the bottom of the error function and then accumulating surrounding FOE-locations (see FIG. 5).

Fuzzy_FOE (I,I')

(Compute the fuzzy FOE for a given pair of images I and I')

(1) Guess initial FOE $(x_O, y_O)$ (e.g., the FOE obtained from the previous frame pair) and compute the corresponding optimal rotations $\phi_O$, $\theta_O$ and the deviation from a radial flow field, error $e_O$.
(2) From $(x_O, y_O)$ start a local search (e.g., steepest descent) for an FOE-location $(x_c, y_c)$ that results in a minimum error $e_c$.
(3) Create the set FUZZY-FOE = $\{(x_c, y_c, e_c)\}$.
(4) Grow the set FUZZY-FOE by including adjacent FOE-locations $(x_i, y_i, e_i)$ until the accumulated error $E = e_c + \Sigma e_i$ exceeds a predefined limit.

After computing the fuzzy FOE 118 (FIG. 5) and the angles of horizontal and vertical rotation $\phi$ and $\theta$, a good estimate for the motion parameters of the vehicle is available. Notice that this is possible without knowing the 3-D structure of the observed scene. Also, it is to be noted that to measure the camera motion with respect to the stationary world, none of the displacement vectors 120 (FIG. 4) used for this computation may belong to another moving object. This information is supplied by the internal scene model (as described below), which, among other things, tells what features are currently believed to be stationary.

Figure 5:
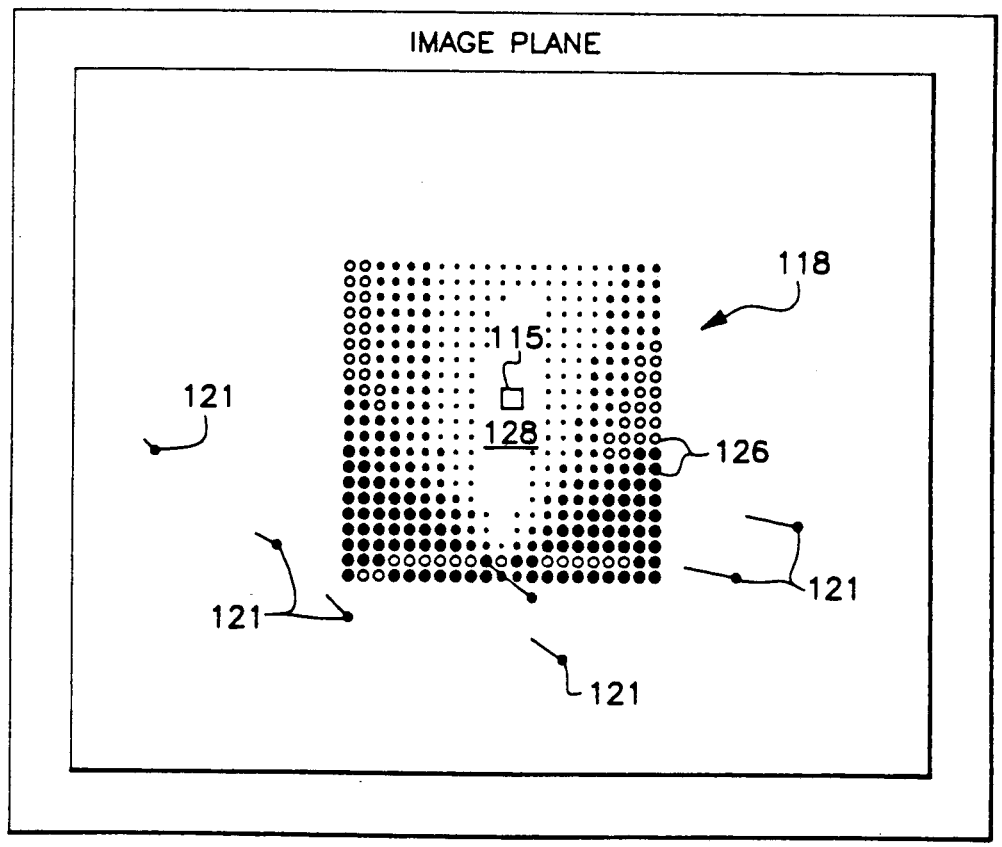
FIG. 5 shows a fuzzy FOE for a simulated displacement field.

FIG. 5 displays the results of applying this algorithm to a simulated sparse displacement field. The shape of the error function 118 around the actual FOE 115 is plotted with circles 126 of size proportional to the error. The blank area 128 in the center of FIG. 5, marks the resulting fuzzy FOE for the simulated displacement field. Vehicle 124 of FIG. 3a is translating forward and rotating to the right by 2°. The small square in the center is the location of the actual FOE 115 (FIG. 5). Notice the elongated shape of the FOE region 128 which is due to the particular distribution of displacement vectors 121 (typical for road scenes).

The qualitative scene model (QSM) 136 of FIG. 1 may be constructed as indicated below. The choice of a suitable scheme for the internal representation of scene 130 of FIG. 7a is of great importance. QSM 136 is a 3-D camera-centered interpretation of scene 130, which is built incrementally from visual information gathered over time. The nature of model 136, however, is qualitative rather than a precise geometric description of the scene. The basic building blocks of QSM 136 are entities, which are the 3-D counterparts of the 2-D features observed in the corresponding image 114 (FIG. 2). For example, the point feature A located in image 114 at x,y at time t, is denoted by (POINT-FEATURE A t x y), has its 3-D counterpart in model 136 as (POINT-ENTITY A).

Since QSM 136 is camera-centered, the image locations and 2-D movements of features are implicitly part (i.e., known facts) of QSM 136. Additional entries are the properties of entities (e.g., "stationary" or "mobile") and relationships between entities (e.g., "closer"), which are not given facts but are the outcome of some interpretation step (i.e., hypotheses). The hypotheses are expressed in QSM 136 as either (STATIONARY entity) or (MOBILE entity).

A key feature of QSM 136 is that it generally contains not only one interpretation of scene 130 but a (possibly empty) set of interpretations which are all pursued simultaneously. At any point in time, a hypothesis is said to be "feasible" if it exists in QSM 136 and does not conflict with some observation made since it was established.

Interpretations are structured as an inheritance network of partial hypotheses. Individual scene interpretations are treated as "closed worlds", i.e., a new conclusion only holds within an interpretation where all the required premises are true. Interpretations are also checked for internal consistency, e.g., entities cannot be both stationary and mobile within the same interpretation. QSM 136 is maintained through a generate-and-test process as the core of a rule-based blackboard system. The two major groups of rules are "generation rules" 132 and "verification rules" 134 in FIG. 1. Below, the original notation of the ART computer language is used for stating the definitions of rules 132 and 134. A large portion of the rules are derived directly from the laws of perspective imaging. The rules that reflect some form of heuristics (which hold for a large class of scenes in practical applications) are clearly marked.

FIG. 1 reveals the overall structure of the interpretation process. From the original displacement vectors 120 (obtained by matching corresponding features), the fuzzy FOE 118 and the derotated displacement field 138 are computed. QSM 136 is built in a hypothesize-and-test cycle by the two sets of rules 132 and 134. Generation rules 132 search for significant image events and place immediate conclusions (hypotheses) in model 136. Verification rules 134 check existing hypotheses if they are consistent with the changes occurring in image 114 (FIG. 2). A set of environmental entities 140 that are believed to be stationary is supplied by QSM 136 to be used by the FOE-computation 116 (FIG. 1).

Particularly, generation rules 132 examine the (derotated) image sequence for significant changes and modify each interpretation in the QSM 136 if applicable. Some of these observations have unconditional effects upon the model, e.g., if an image feature is found to be moving towards the fuzzy FOE 118 (instead of moving away from it), then it belongs to a moving entity in 3-D space. The actual rule contains only one premise and asserts (MOBILE ?x) as a globally known fact (i.e., one that is true in every interpretation):

| | |
|---|---|
| (defrule DEFINITE-MOTION | |
|    (MOVING-TOWARDS-FOE ?x ?t) | <observation at time t> |
|    → | |
|    (assert (MOBILE ?x))). | <a global fact> |

Similarly, if two image features A and B lie on opposite sides of the fuzzy FOE and they are getting closer to each other, then they must be in relative motion in 3-D space:

| | |
|---|---|
| (defrule RELATIVE-MOTION | |
|    (OPPOSITE-FOE ?x ?y ?t) | <image observation 1 (global)> |
|    → | |
|    (CONVERGING ?x ?y ?t) | <image observation 2 (global)> |
|    → | |
|    (assert (MOVEMENT-BETWEEN ?x ?y))). | <a new global fact> |

Other observations depend upon the facts that are currently true with a "world," and therefore may have only local consequences inside particular interpretations. The following rule pair responds to the new fact created by the above rule by creating two new hypotheses. If an interpretation exists that considers at least one of the two entities (x,y) stationary, then the other entity cannot be stationary (i.e., it must be mobile):

| | |
|---|---|
| (defrule RELATIVE-MOTION-X | |
|    (MOVEMENT-BETWEEN ?x ?y) | <a global fact> |
|    (STATIONARY ?x) | <true only inside an interpretation> |
|    → | |
|    (assert (MOBILE ?y))) | <new fact local to this interpretation> |
| (defrule RELATIVE-MOTION-Y | |
|    (MOVEMENT-BETWEEN ?x ?y) | |
|    (STATIONARY ?y) | |
|    → | |
|    (assert (MOBILE ?x))). | |

While some image observations allow direct conclusions about motion in scene 130 (FIG. 7a), other observations give clues about the stationary 3-D structure. If the exact location of the FOE is known then the depth of each stationary point (i.e., its 3-D distance from the camera) is proportional to the rate of divergence (from the FOE) of that point. Applied to fuzzy FOE 118 (FIG. 1), where a set of potential FOE locations is given, the distance Z(A) of a stationary point A is determined as an interval instead of a single number:

$$Z^{min}(A) \leq Z(A) \leq Z^{max}(A).$$

Therefore, point A must be closer in 3-D than another point B if the corresponding ranges of depth do not overlap, i.e., $$Z^{max}(A) < Z^{min}(B) \rightarrow (CLOSER\ A\ B).$$

Since this conclusion only holds if both entities are actually stationary, the following rule fires only within a suitable interpretation (if it exists):

```
(defrule CLOSER-FROM-DIVERGENCE
    (STATIONARY ?x)        <interpretation where both x
                            and y are stationary>
    (STATIONARY ?y)
    (test (< (Zmax ?x) (Zmin ?y)))   <no overlap in
                                      range>
    →
    (assert (CLOSER ?x ?y))).        <a new hypothesis>
```

To compare the ranges of 3-D points, another criterion can be used that does not measure the individual rate of divergence. According to this criterion, the change of distances between certain pairs of features is observed. If two stationary points lie on the same side of the FOE and the distance between them is becoming smaller, then the inner feature (i.e., the one which is nearer to the FOE) is closer in 3-D space. This test is valuable for features that are relatively close to each other. It can be employed even if the image is not (or incorrectly) derotated and the location of the FOE is either only known very roughly or is completely outside the field of view (i.e., for a side-looking camera):

```
(defrule CLOSER-FROM-CHANGING-DISPARITY
    (STATIONARY ?x)        <interpretation where both x
                            and y are stationary>
    (STATIONARY ?y
    (SAME-SIDE-OF-FOE ?x ?y)   <e.g., both are right
                                of the FOE
    (CONVERGING ?x ?y)     <dist. between x and
                            y is decreasing>
    (INSIDE ?x ?y)         <x is nearer to the
                            fuzzy FOE than y>
    →
    (assert (CLOSER ?x ?y))).        <a new hypothesis>
```

While the purpose of the generation rules 132 is to establish new hypotheses and conclusions, the purpose of verification rules 134 is to review interpretations after they have been created (see FIG. 1) and, if possible, prove that they are false. When a hypothesis is found to be inconsistent with some new observation, that hypothesis is usually removed from QSM 136. Simultaneously, any interpretation that is based on that hypothesis is removed. Since one is always trying to come up with a single (and hopefully correct) scene interpretation, this mechanism is important for pruning the search tree. Notice that all the rules described so far are based upon the known effects of perspective imaging, i.e. they are valid for any type of scene.

Verification rules 134 fall into two categories. One group of rules verifies the internal consistency of scene model 136. For example, a particular entity cannot be labeled both stationary and mobile in one single interpretation. The following rule detects those cases and removes ("poisons") the affected hypothesis:

```
(defrule REMOVE-STATIONARY-AND-MOBILE
    (STATIONARY ?x)       <this is an inconsistent
                           hypothesis>
    (MOBILE ?x)
    →
    (poison)).            <remove this
                           hypothesis>
```

Similarly, the CLOSER-relation may not be symmetric for any pair of stationary entities 140. For non-symmetric situation, we conclude that there is some 3-D movement between the two entities:

```
(defrule CHECK-FOR-CLOSER-SYMMETRY
    (CLOSER ?x ?y)        <this is an inconsistent
                           hypothesis
    (CLOSER ?y ?x)
    →
    (at ROOT (assert (MOVEMENT-BETWEEN ?x ?y)))).  <a
                                                    new
                                                    global
                                                    fact>
```

The second group of verification rules 134 checks whether existing hypotheses (created in the past) are compatible with the current activities in the image 114 (FIG. 2). Usually these rules, if used as generators, would produce a large number of unnecessary conclusions. For example, the general layout of scene 130 (observed from the top of land vehicle 124 in FIG. 3a) suggests the rule of thumb that things which are lower in the image 114 are generally closer to camera 122. Otherwise, some motion has probably occurred between the two entities involved. The first of the following rules signals that conflict and the other pair of rules creates two different hypotheses about the direction of motion:

```
(defrule LOWER-IS-CLOSER-HEURISTIC
    (CLOSER ?x ?y)        <existing hypothesis
    (BELOW ?y ?x ?t)      <image observation: actually x
                           should be below y>
    →
    (at ROOT (assert (LOW-CLOSE-CONFLICT ?x ?y ?t))))

(defrule CONCLUDE-RECEDING-MOTION
    (LOW-CLOSE-CONFLICT ?x ?y ?t)
    (STATIONARY ?x
    →
    (assert (MOBILE ?y) (MOVES-RECEDING ?y ?t)))

(defrule CONCLUDE-APPROACHING-MOTION
    (LOW-CLOSE-CONFLICT ?x ?y ?t)
    (STATIONARY ?y)
    (assert (MOBILE ?x) (MOVES-APPROACHING ?x ?t))).
```

Meta rules determine the behavior of the reasoning process to obtain the interpretation of the image rather than the processing itself. "Meta rules" is a term commonly used in the field of artificial intelligence. The construction of QSM 136 and the search for the most plausible scene interpretation are guided by the following meta rules:

Always tend towards the "most stationary" (i.e. most conservative) solution. By default all new entities (i.e., features entering the field of view) are considered stationary.

Assume that an interpretation is feasible unless it can be proved to be false (the principle of "lack of conflict").

If a new conclusion causes a conflict in one but not in another current interpretation, then remove the conflicting interpretation.

If a new conclusion cannot be accommodated by any current interpretation, then create a new, feasible interpretation and remove the conflicting ones.

The information contained in QSM 136 is useful for a variety of purposes. First, it supplies a partial ordering in depth for the static entities 140 in scene 130 (FIG. 7a), which is important in scene assessment and navigation. Threat analysis can be based upon the mobile entities in QSM 136. Finally, the FOE computation 116 (FIG. 1) must be supplied with a set of features 140 that are currently believed to be stationary, i.e., those that are not considered mobile in any existing scene interpretation.

While perspective imaging has been the motivation for the rules described here, other important visual clues are available from occlusion analysis, perceptual grouping, and semantic interpretation. Occlusion becomes an interesting phenomenon when features of higher dimensionality than points are employed, such as lines and regions. Similarities in form and motion found by perceptual grouping allow assembly of simple features into more complex aggregates. Finally, as an outcome of the recognition process, semantic information may help to disambiguate the scene interpretation. If an object has been recognized as a building, for example, it makes every interpretation obsolete that considers this object mobile.

Figure 10:
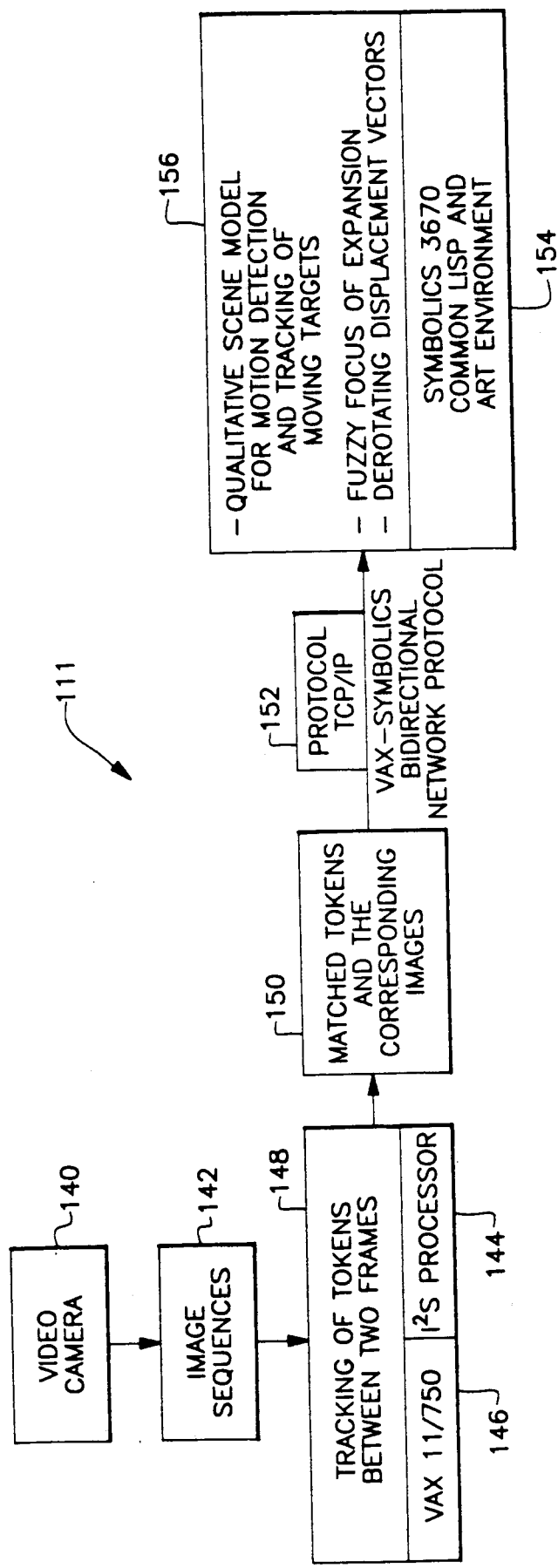
FIG. 10 shows the implementation of the system.

The preferred embodiment has been implemented using the ART expert system tool on a Symbolics 3670 computer (FIG. 10). FOE component 116 was programmed with "Common LISP" functions. Low-level processing (edge detection) was done on a VAX 11/750. The original image sequence was obtained from autonomous land vehicle (ALV) 124 (FIG. 3a) driving on a road at a test site. The sequence shown in FIGS. 6a-6p contains two moving objects: first car 24 that has passed ALV 124 and is barely visible in the distance, and second car 33 that is approaching in the opposite direction and is about to pass by ALV 124.

In FIG. 10, a Hitachi camera 140, having a 48° vertical field of view (FOV), a 50° horizontal FOV and a 16.3° depression angle below the horizon, senses image sequences 142 which are inputted to image processor 144 and VAX 11/750 computer 146 that function as means 148 for tracking of tokens between two frames. The output of means 148 goes to means 150 for matching of tokens and corresponding images. For the two different computers 146 and 154 in system 111, a VAX-Symbolics bidirectional network protocol means 152 is connected between means 150 and means 156 including Symbolics 3670 computer 154, though it is possible to use one computer thereby eliminating means 152. Computer 154 provides processing for obtaining fuzzy focus of expansion 118, derotated displacement vectors 138 and QSM 136 for motion detection and tracking of moving targets. The language environments used with computer 154 in obtaining items 118, 138 and 136, are Common LISP and ART.

In the following examples, the operations of QSM 136 (FIG. 1) and the associated rule base 132 and 134, are demonstrated on two instances of an image sequence. To obtain the original displacement vectors 120, point features were selected and tracked manually between successive frames. Binary edge images 130 and 131 were used (FIGS. 7a and 8a) to imitate the conditions for automatic point tracking, because some clues visible in the original grey-scale sequence are lost during edge detection. Consequently, the end points of the original displacement vectors 120 are not very accurate. Recent experiments on extended sequences show that similar results can be achieved with fully automatic feature tracking.

Figure 6A:
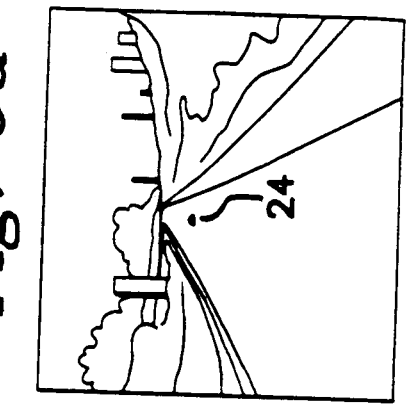
FIGS. 6a-6p illustrate the sequence used to demonstrate the development of the qualitative scene model.
Figure 6B:
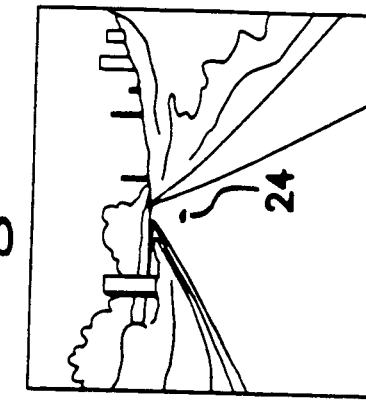
Figure 6C:
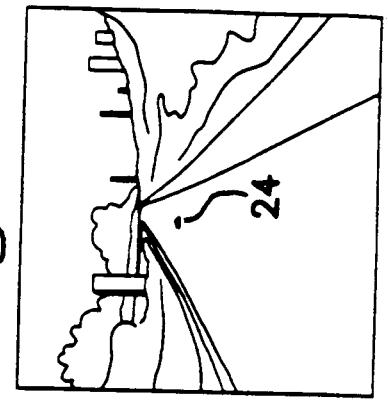
Figure 6D:
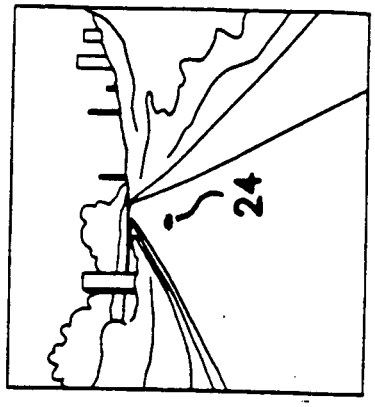
Figure 6E:
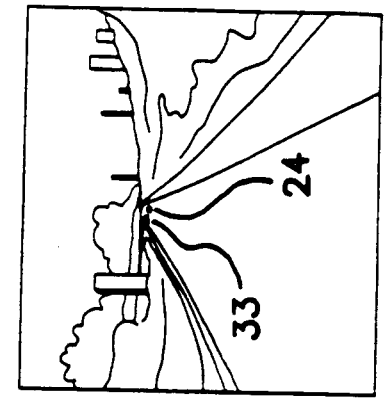
Figure 6F:
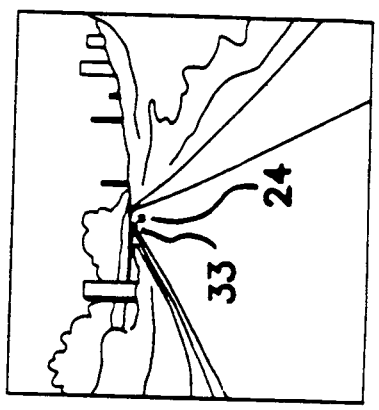
Figure 6G:
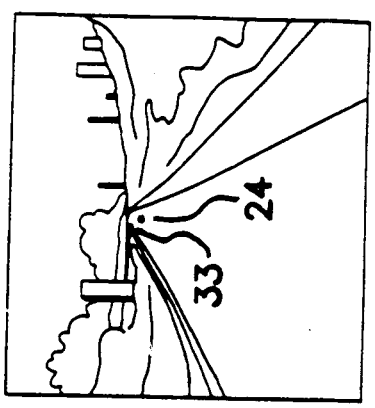
Figure 6H:
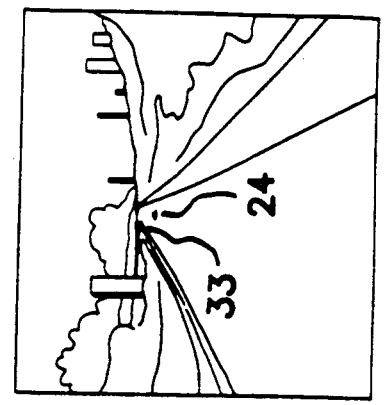
Figure 6I:
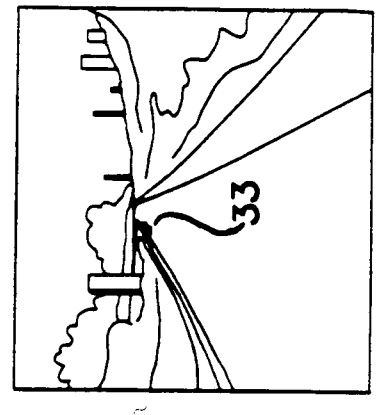
Figure 6J:
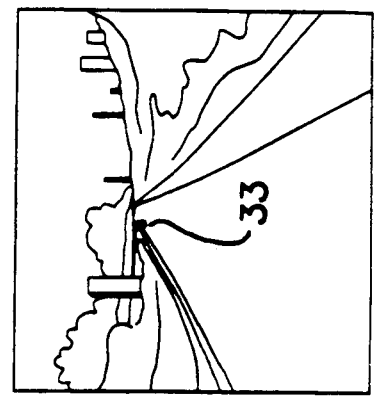
Figure 6K:
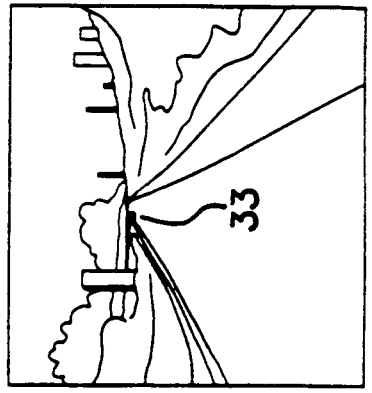
Figure 6L:
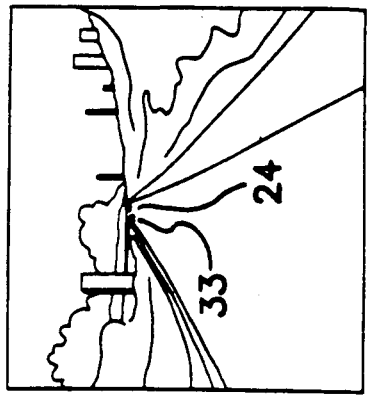
Figure 6M:
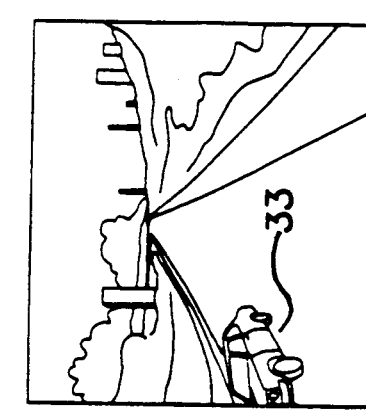
Figure 6N:
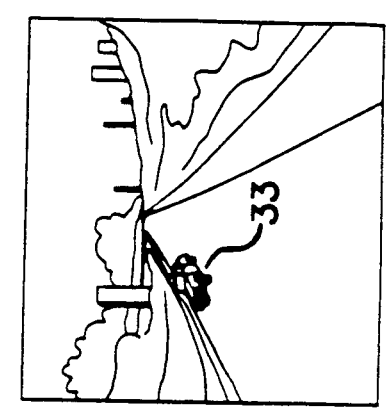

The first example of FIGS. 7a-7e reveals the state of QSM 136 in FIGS. 6a-6c for a receding object. Scene 130 of FIG. 7a, which is of an original edge image with selected point features, contains a number of stationary points 1-23 and 25-30 and one moving point 24 which belongs to another vehicle that has passed the ALV 124 and is moving away from camera 122. First, the parameters of the ALV's self motion are computed with respect to a set of environmental features believed to be stationary. This set is defined by the hypotheses currently contained in the qualitative scene 136 model and described above.

Figure 7B:
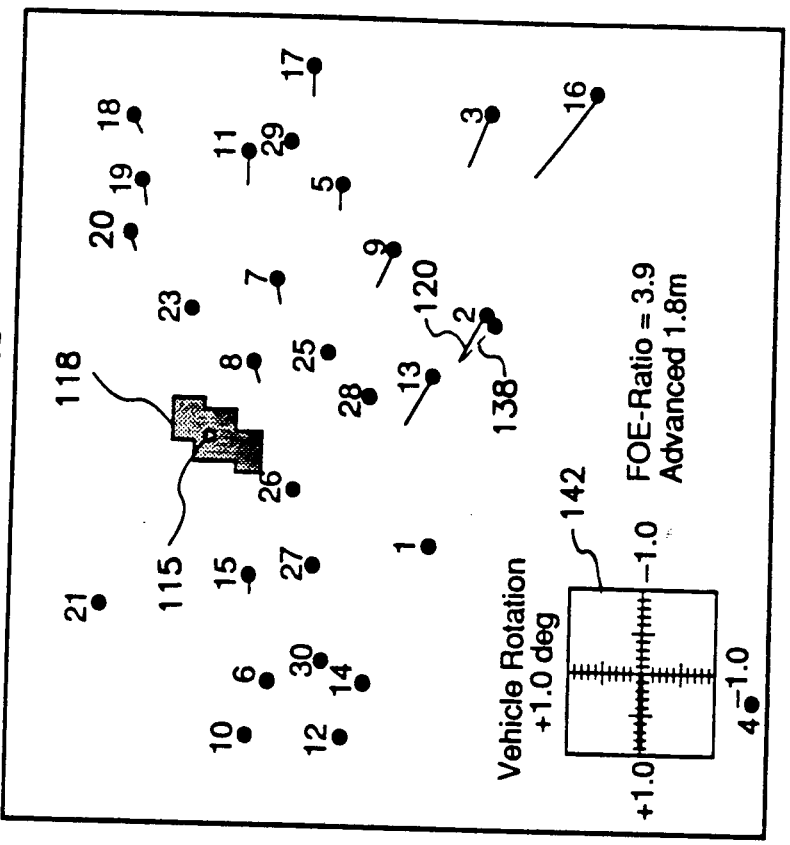
FIGS. 7a-7e illustrate the states of the qualitative scene model for a receding object.
Figure 7A:
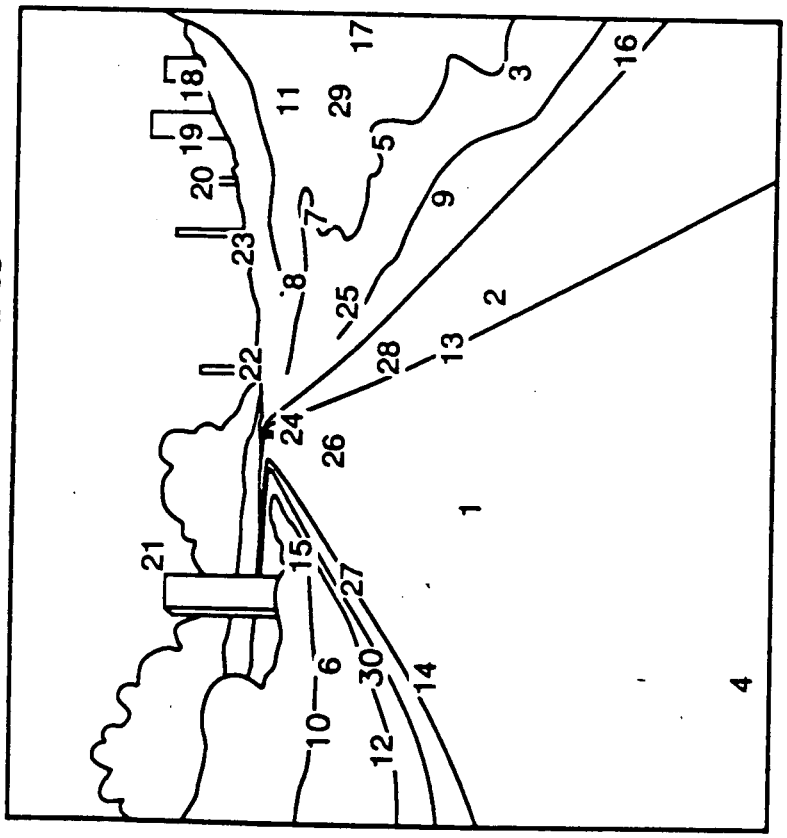

FIG. 7b reveals the basis for computation of self motion with the original set of displacement vectors 120 (solid lines) between FIGS. 6a and 6b, fuzzy FOE 118 (shaded area), and "derotated" displacement vectors 138 (dotted lines). The rotation scale 142 in the lower left-hand corner indicates a horizontal rotation angle $\theta$ (between the two frames) of almost 1° to the left. Vertical rotation $\phi$ is not significant.

Figure 7D:
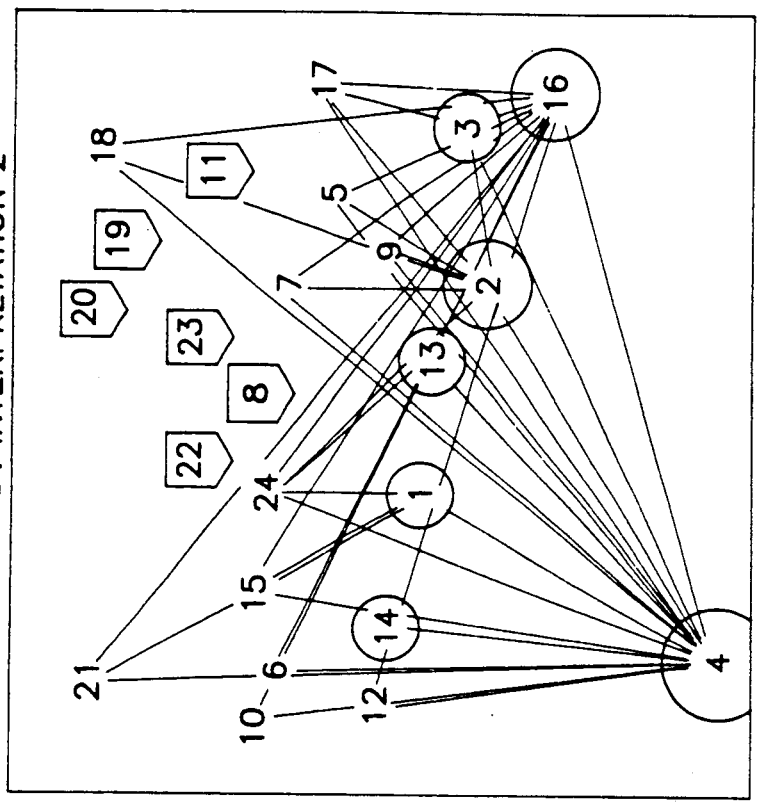
Figure 7C:
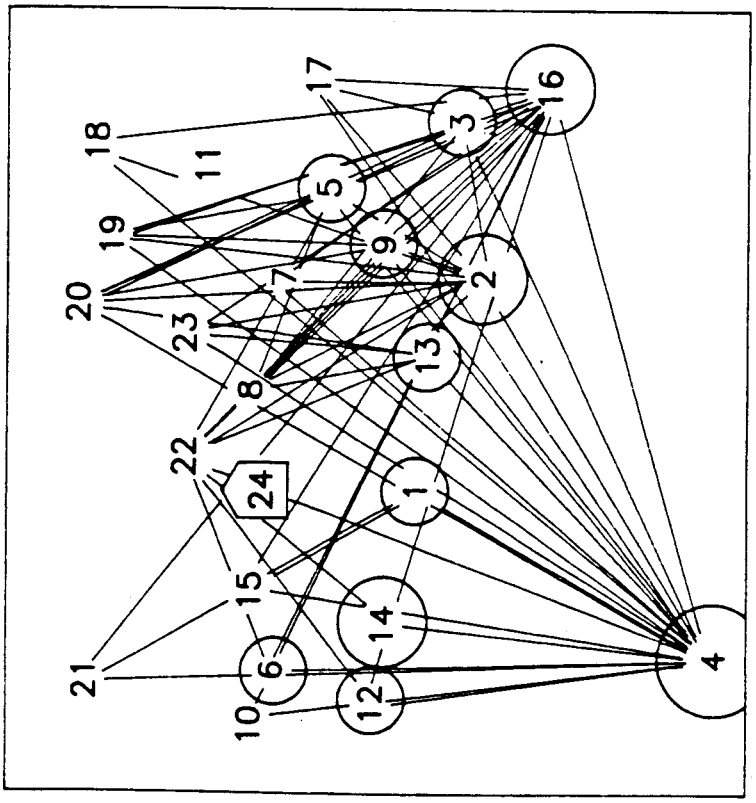

FIGS. 7c and 7d visualize two separate but feasible scene interpretations 1 and 2 for the situation in FIG. 6b. Entities which are considered stationary are marked with circles or plain labels. Arcs from a small circle (e.g., 1) or plain label to a larger circle (e.g., 4) indicate that a CLOSER-relationship has been established between the two entities. In these cases, the entity with the larger circle is considered closer to camera 122 (FIG. 2) in the 3-D scene 130. Mobile entities (i.e., 24 or 8, 11, 19, 20, 22 and 23) are marked with squares if they are thought to be in some motion, or with arrows if the direction of their current movement has been determined.

The existence of two interpretations is due to the movement of the receding car (point 24), that is, relative image motion across the FOE 115 (FIG. 7b). This movement was detected as 2-D motion "across the FOE" (see rule RELATIVE.MOTION above) between point 24 on one side of the FOE 115 and points 8,11,19,20,22,23 on the opposite side, which is illustrated in FIGS. 7c and 7d. Interpretation 1 of FIG. 7d considers all entities stationary, except point 24 which is considered mobile with upward motion (in the 3-D coordinate frame). This corresponds to the actual situation. However, interpretation 2 of FIG. 7d is also feasible, taking 24 as stationary and points 8,11,19,20,22,23 as moving downwards. Notice that CLOSER-relationships are only formed between stationary entities.

Figure 7E:
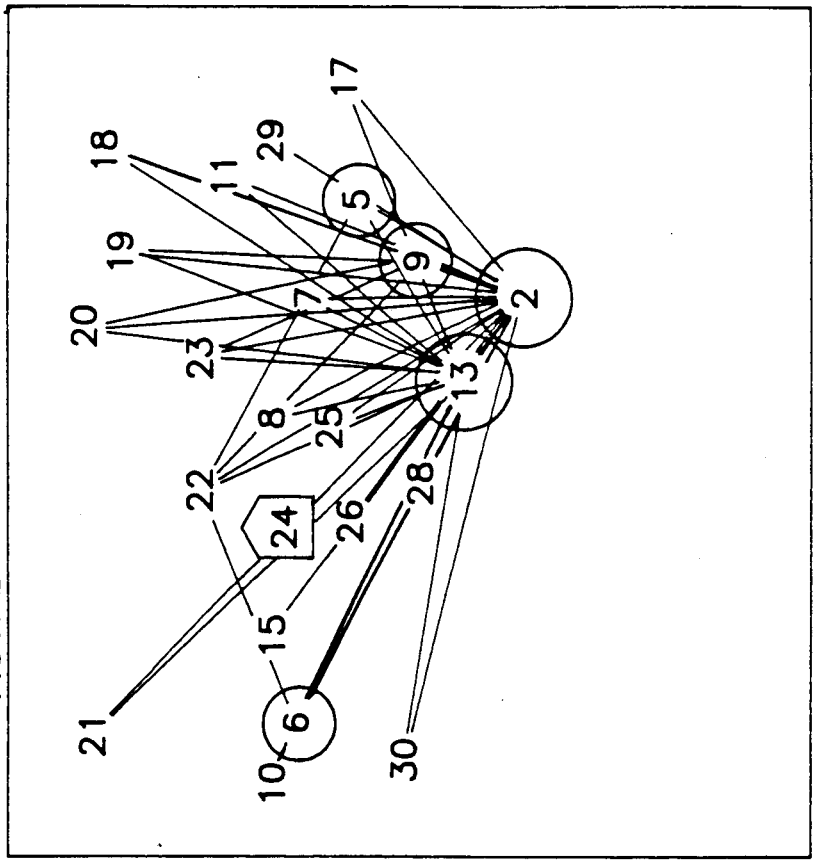

In the subsequent FIG. pair 6a-6c, point 24 is observed to move towards the FOE, which is a definite indicator for 3-D motion relative to camera 122 (FIG. 2) (rule DEFINITE-MOTION above). Any interpretation considering entity 24 as stationary (STATIONARY 24) is removed from the model, such that interpretation 2 does not survive. Consequently, only one (correct) interpretation (1) exists after FIG. 6c (FIG. 7e).

Figure 6O:
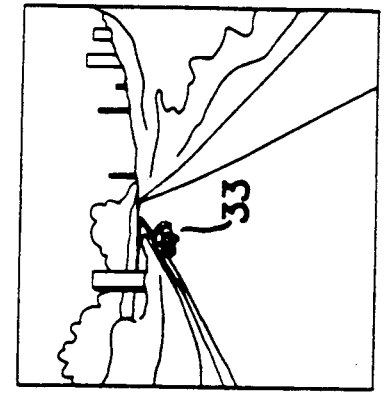
Figure 6P:
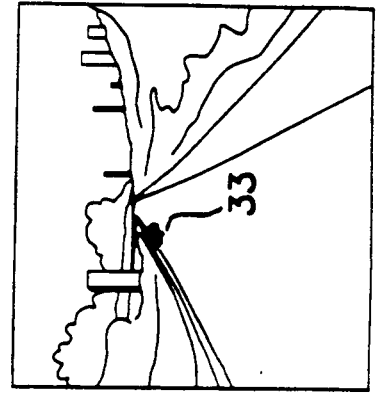
Figure 8B:
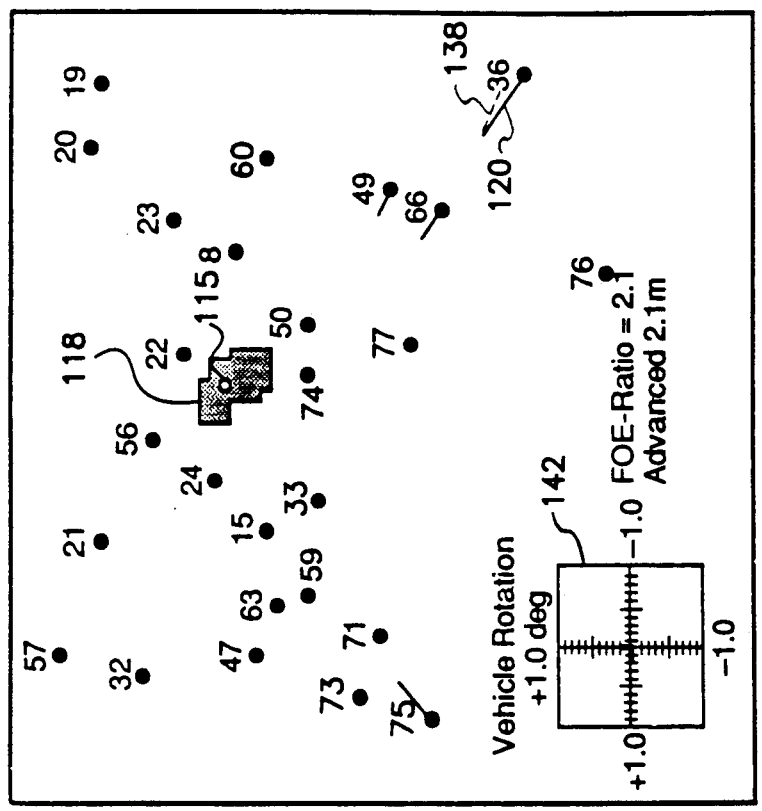
FIGS. 8a-8d illustrate the states of the qualitative scene model for an approaching object, resulting in two interpretations.
Figure 8A:
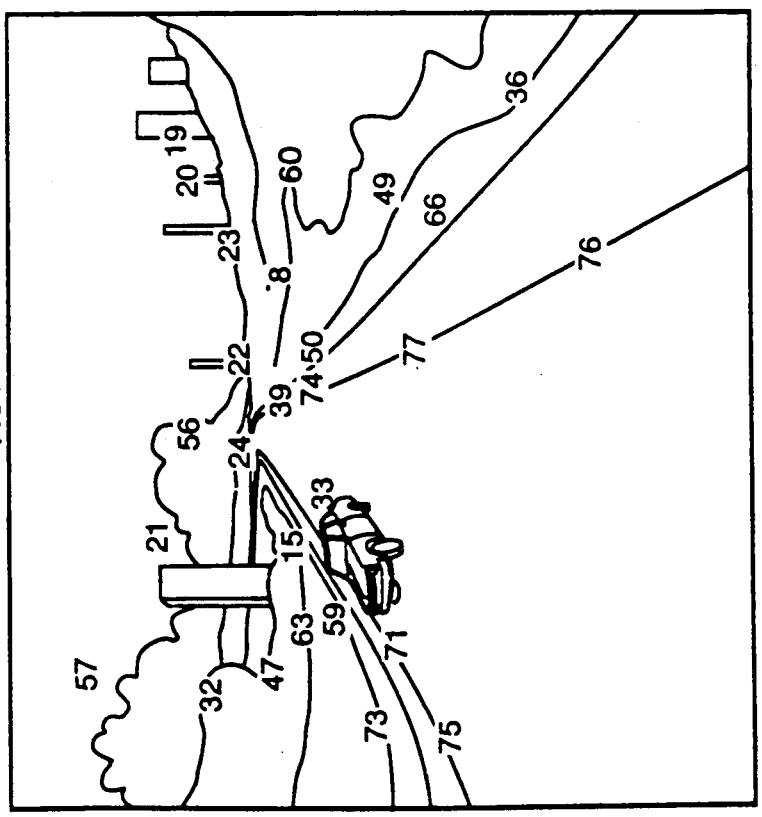

The second example of an approaching object, illustrated in FIGS. 8a-8d, 9a and 9b, is taken at FIG. 6o of the same image sequence as before. FIG. 8a shows the original edge image 131 with labeled points 8, 15, 19-24, 32, 33, 36, 39, 47, 49, 50, 56, 57, 59, 60, 63, 66, 71, and 73-77. FIG. 8b shows the results of the FOE computation 116 with original displacement vectors (solid lines) 120, the fuzzy FOE (shaded area) 118, camera rotations $\theta$ and $\phi$, and derotated displacement vectors (dotted lines) 138. As in the previous example, two feasible scene interpretations, in FIGS. 8c and 8d, respectively, are created, caused by the behavior of feature 33. This point belongs to another vehicle that is approaching the autonomous land vehicle (ALV) 124 having the camera on the same road. The first vehicle (point 24) is declared as mobile in both interpretations (from earlier conclusions), but the direction of movement is currently not known (indicated by a simple square as in FIG. 8c).

Figure 8D:
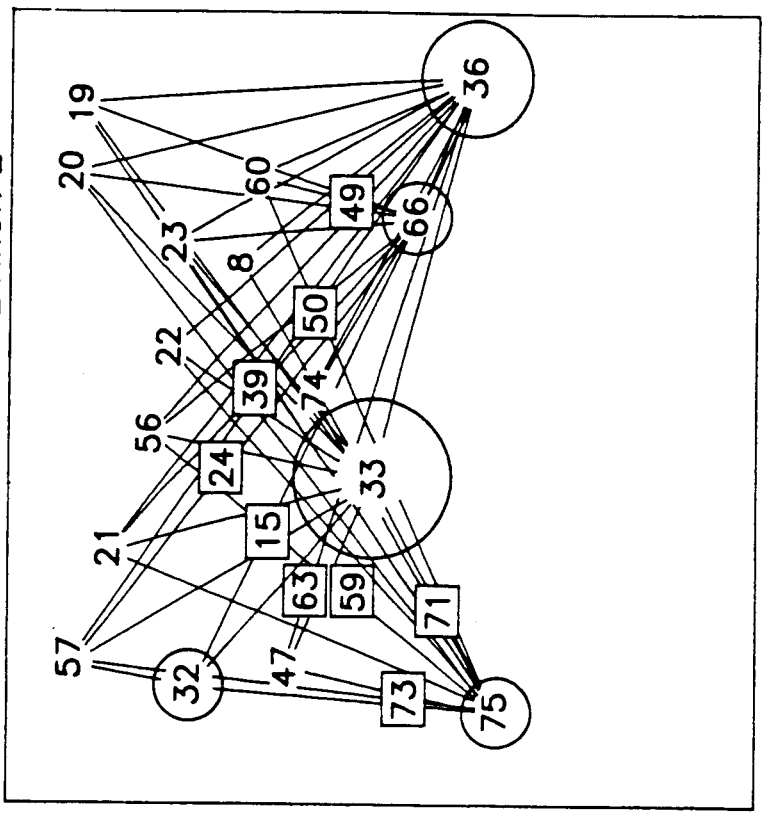
Figure 8C:
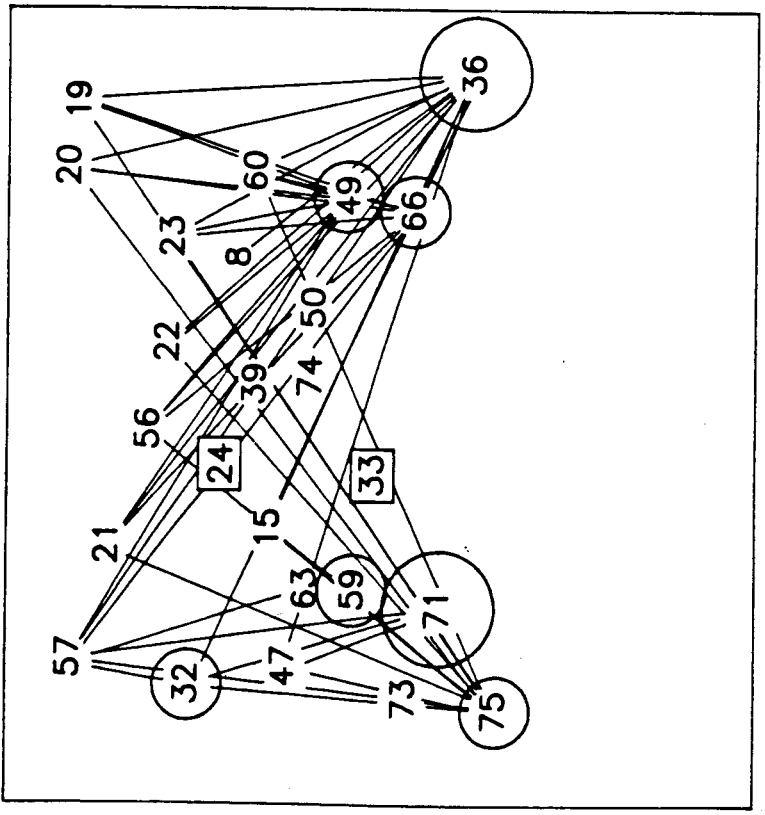

At FIG. 6o some movement between feature 33 and several other features (15, 39, 49, 50, 59, 63, 71, 73), has been detected (FIG. 8d). This time, however, the direction of motion can not be identified. Again two interpretations are created in FIGS. 8c and 8d. Interpretation 1 has entity 33 (square) labeled as mobile but with undetermined motion. Interpretation 2 has entities 15,39,49,50,59,63,71,73 (squares) which are mobile, 33 is stationary. None of these interpretations can currently be ruled out and are carried over to the next FIG. pair 6p of FIG. 9a and 9b, where two significant events happen.

Figure 9B:
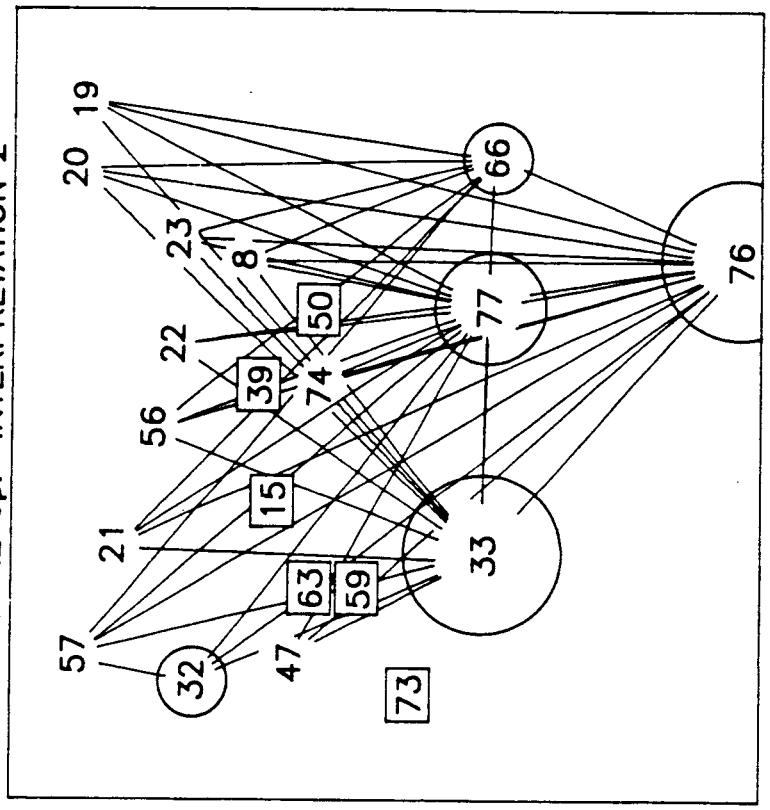
FIGS. 9a and 9b are a continuation of FIG. 8d and show the selection of one interpretation.
Figure 9A:
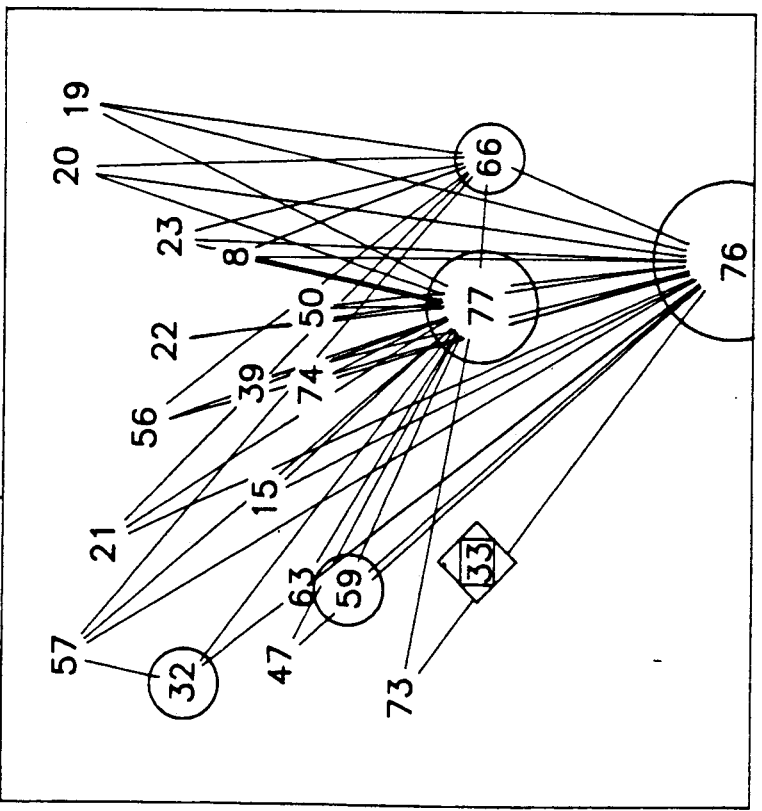

In interpretation 1 of FIG. 9a, entity 33 (indicated by an upright square) is concluded to be approaching the camera because of its relative position to stationary entities and its downward movement. Thus, interpretation 1 says that "if 33 is mobile, then it is approaching the ALV" 124.

In interpretation 2 of FIG. 9b, entity 33 is still explained as stationary, as was the case in interpretation 2 of the previous Figure of FIG. 8d. If this fact is true, however, then 33 must be quite close to the vehicle, even closer than entity 76 (at the bottom of the image), as indicated by the arc from 33 to 76 and the larger circle around 33. This situation would be very unlikely in that it contradicts the heuristic that things lower in the image are generally closer in 3-D space (LOWER-IS-CLOSER heuristic above) and therefore interpretation 2 can be ruled out. Only the correct interpretation of FIG. 9a remains.

The last example illustrates the fact that some forms of object motion are difficult or even impossible to detect from single point features. For example, an entity approaching camera 122 along a straight line parallel to the viewing direction cannot be distinguished from a stationary point when both camera 122 and the object move uniformly. Such a situation was given in the second example, where another car approached ALV 124. Here, heuristic reasoning about the general spatial layout of the scene was used to detect this motion indirectly.

Figure 11B:
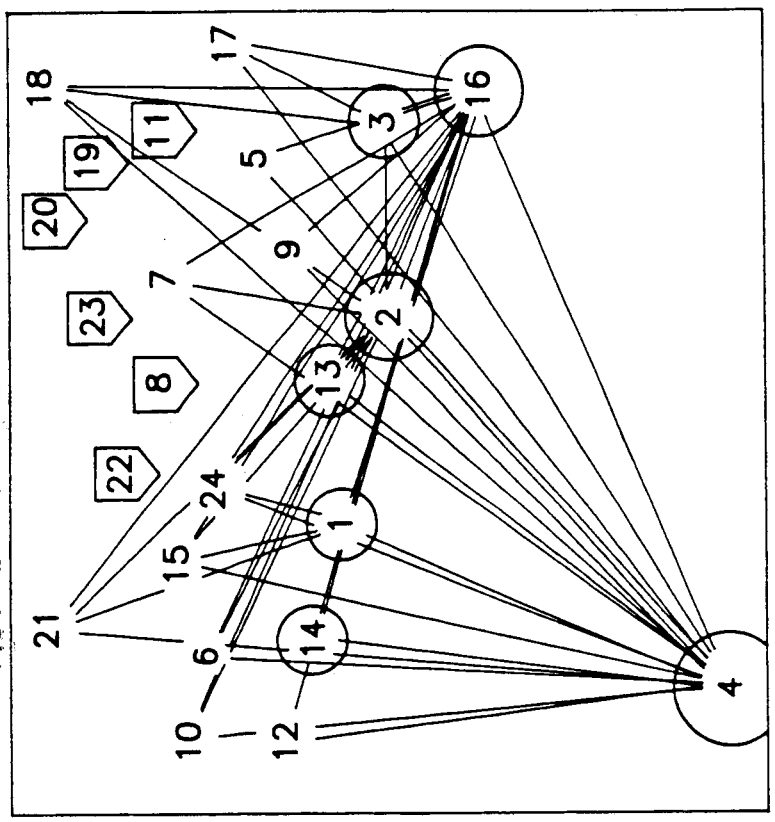
FIGS 11a-r indicate the development of the qualitative scene model.
Figure 11A:
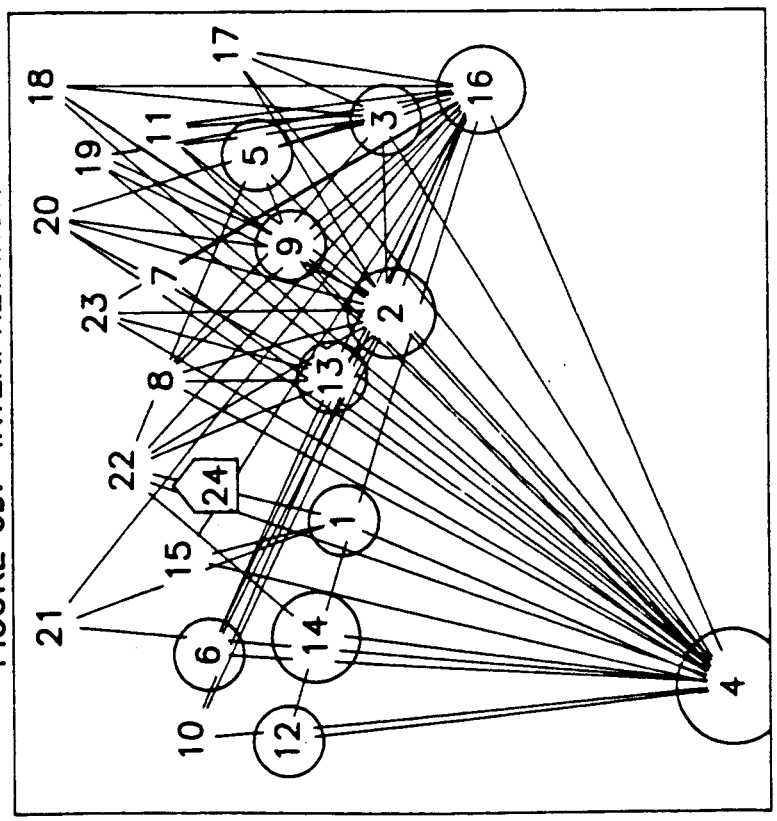
Figure 11D:
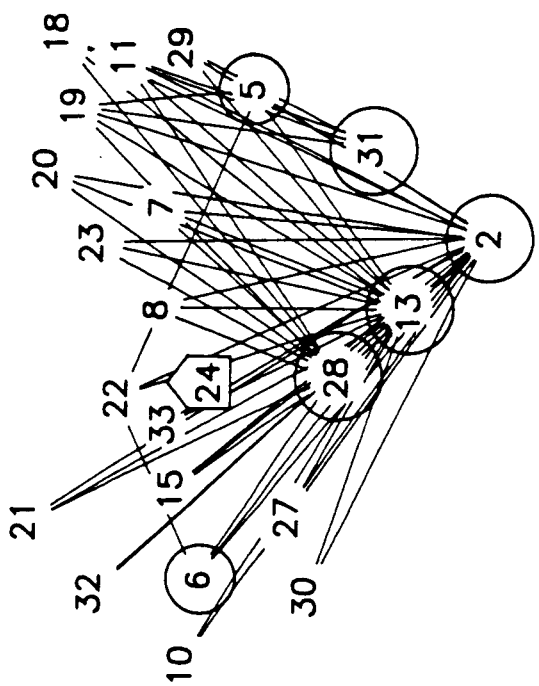
Figure 11C:
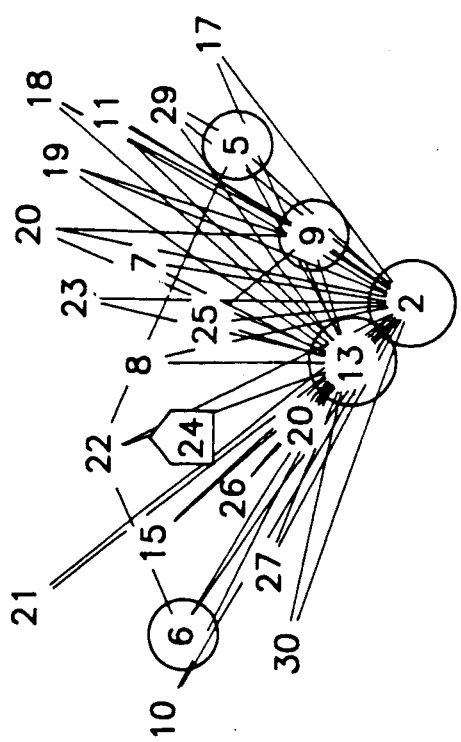
Figure 11F:
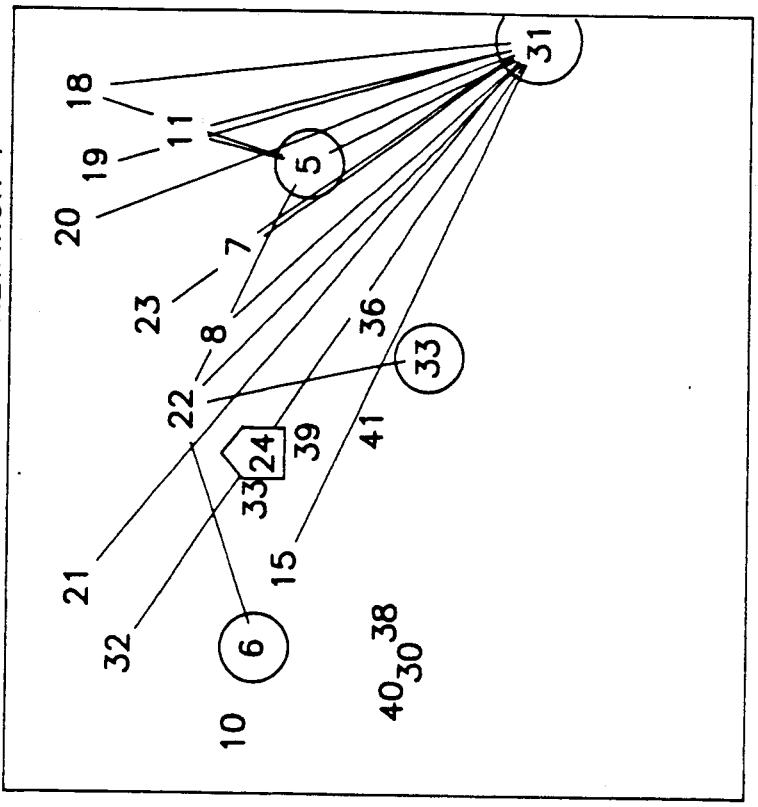
Figure 11E:
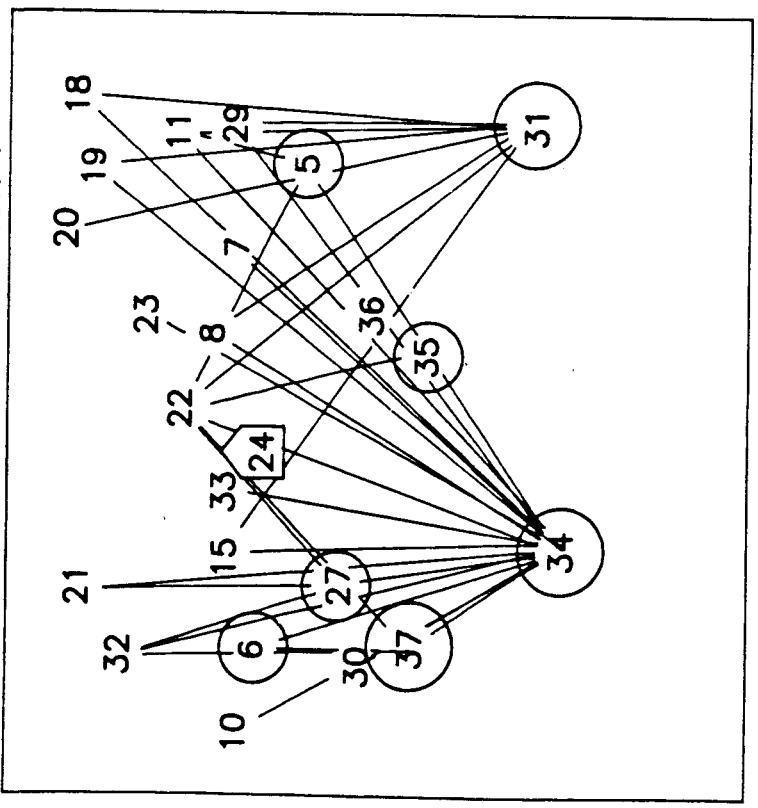
Figure 11H:
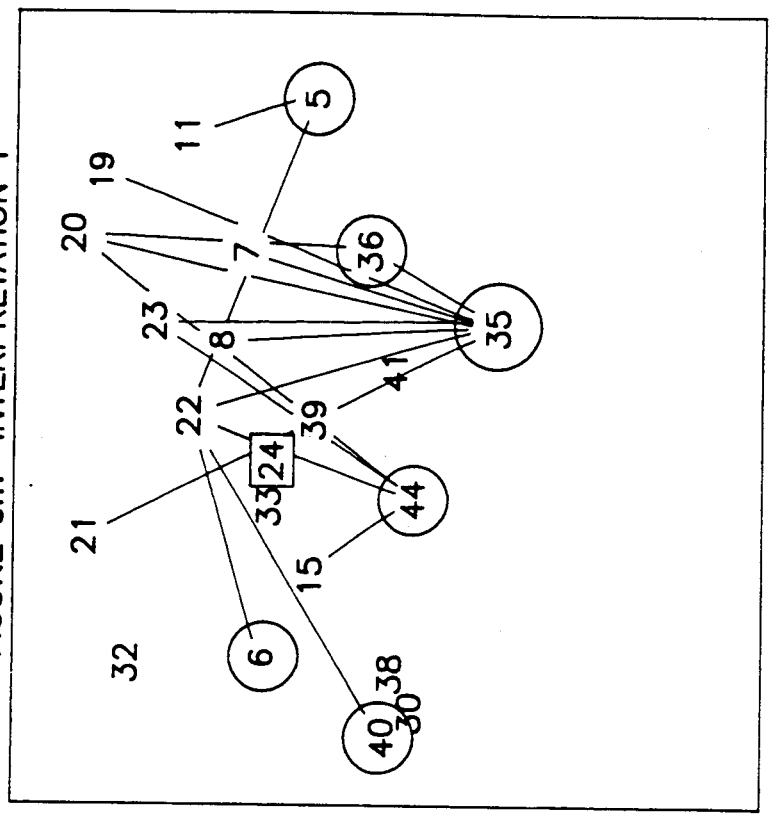
Figure 11G:
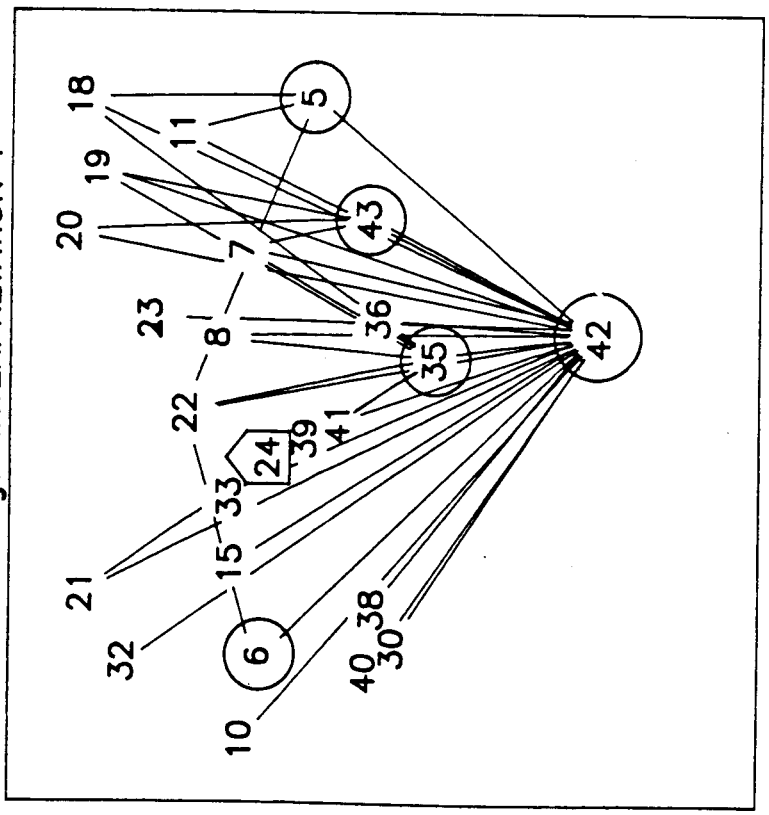
Figure 11J:
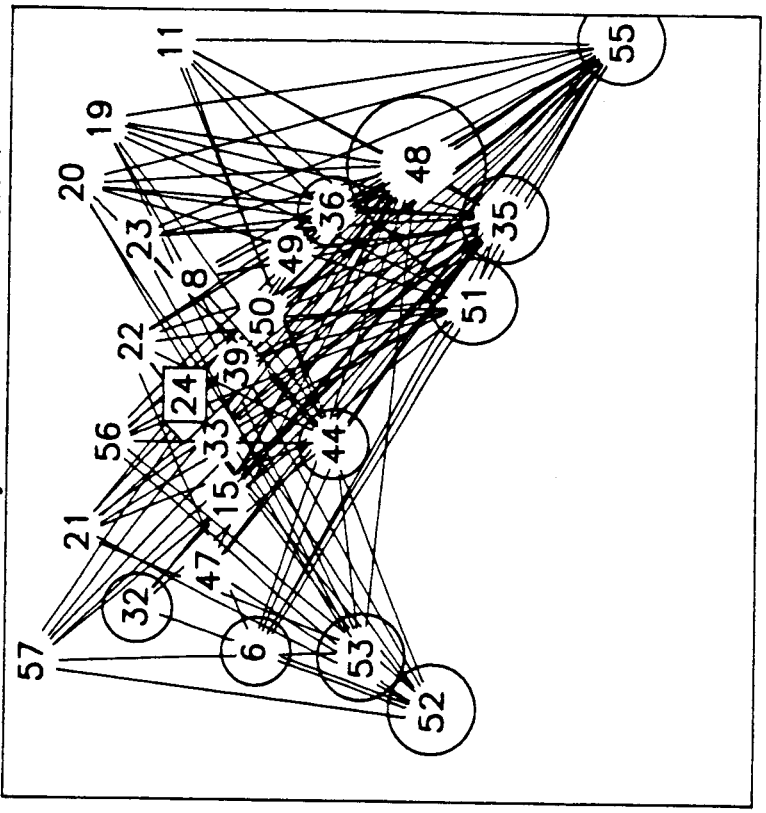
Figure 11I:
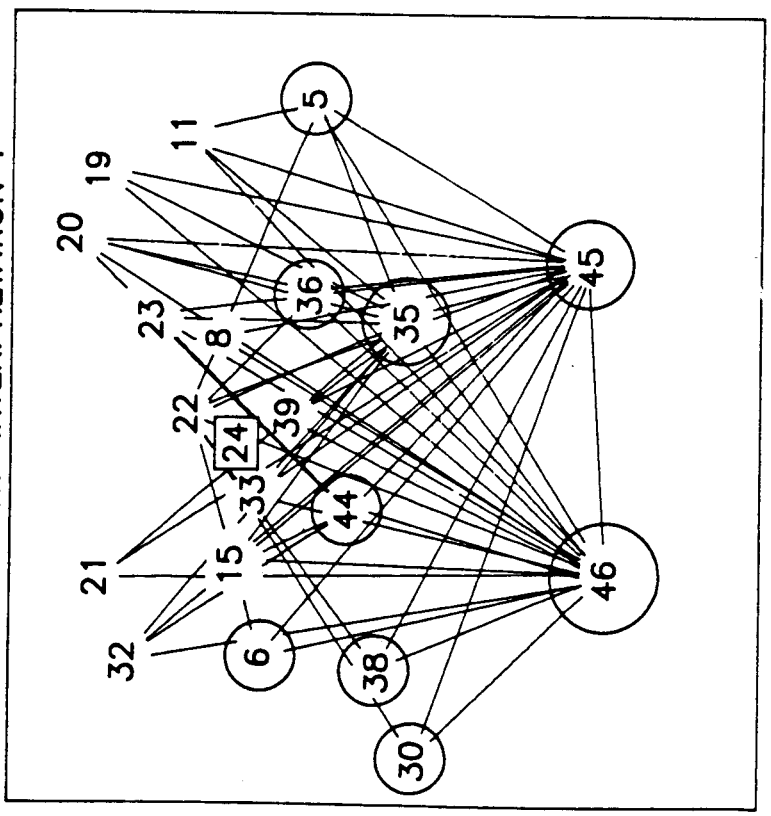
Figure 11L:
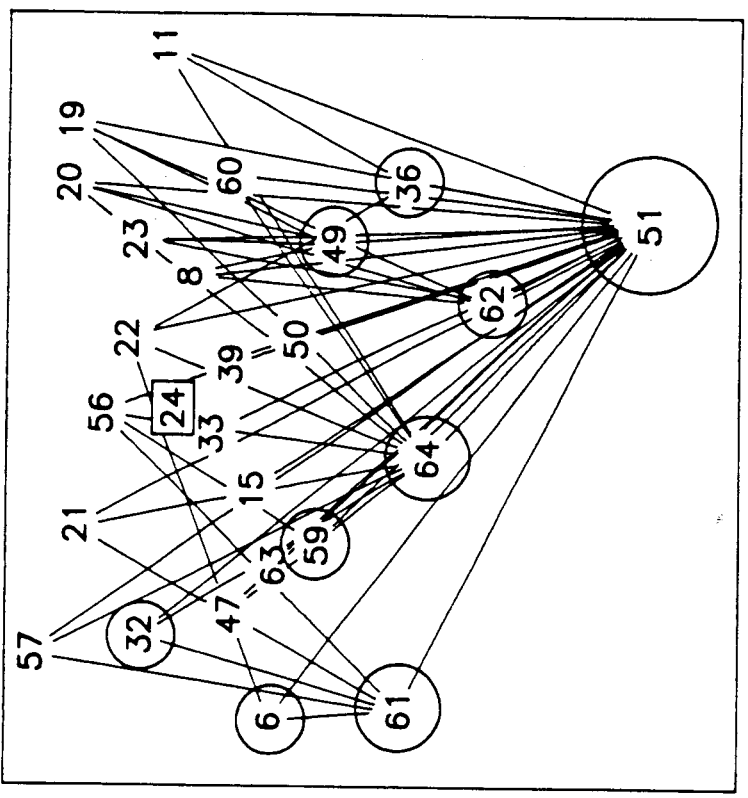
Figure 11K:
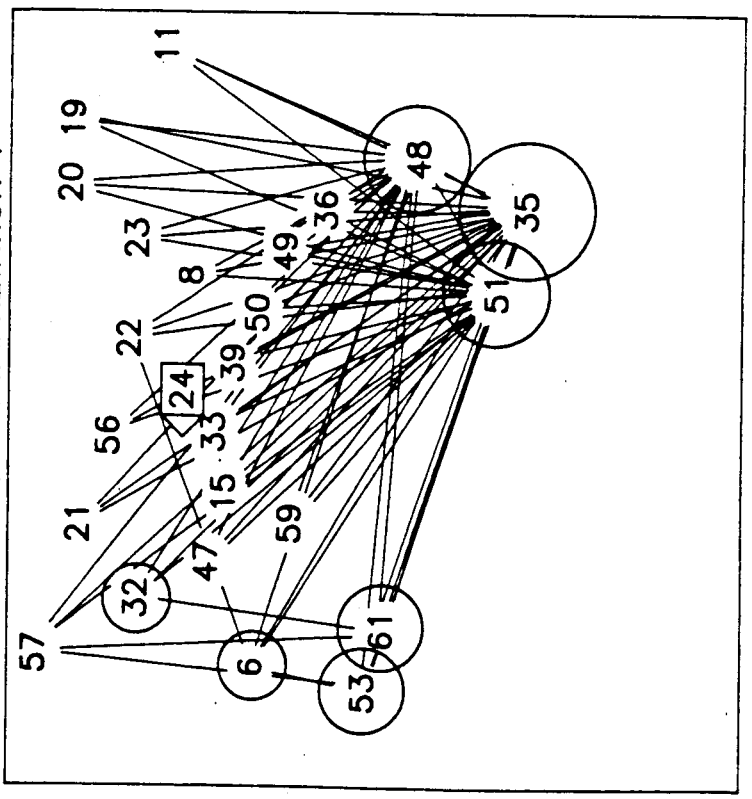
Figure 11N:
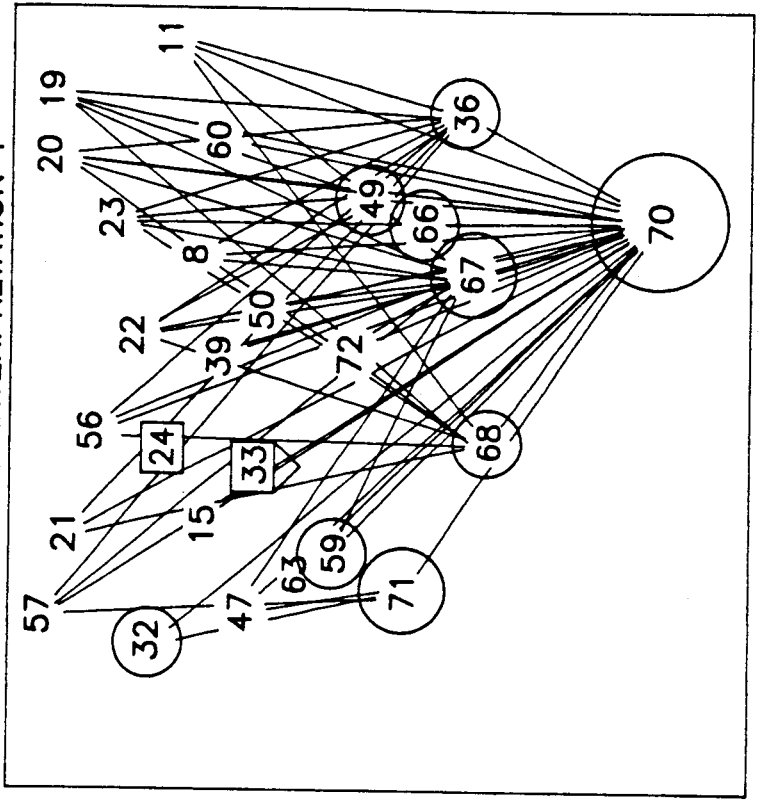
Figure 11M:
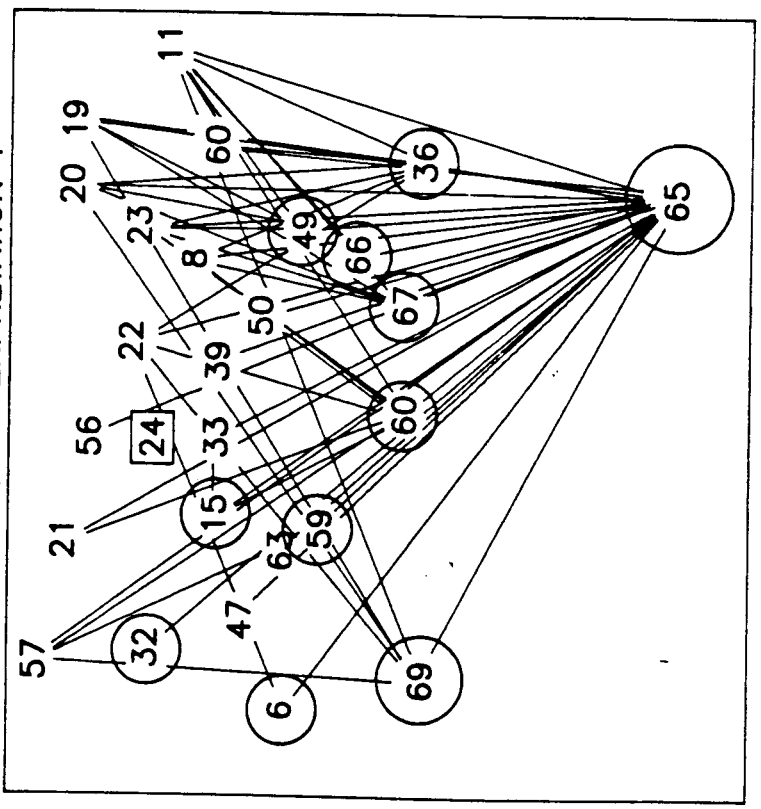
Figure 11P:
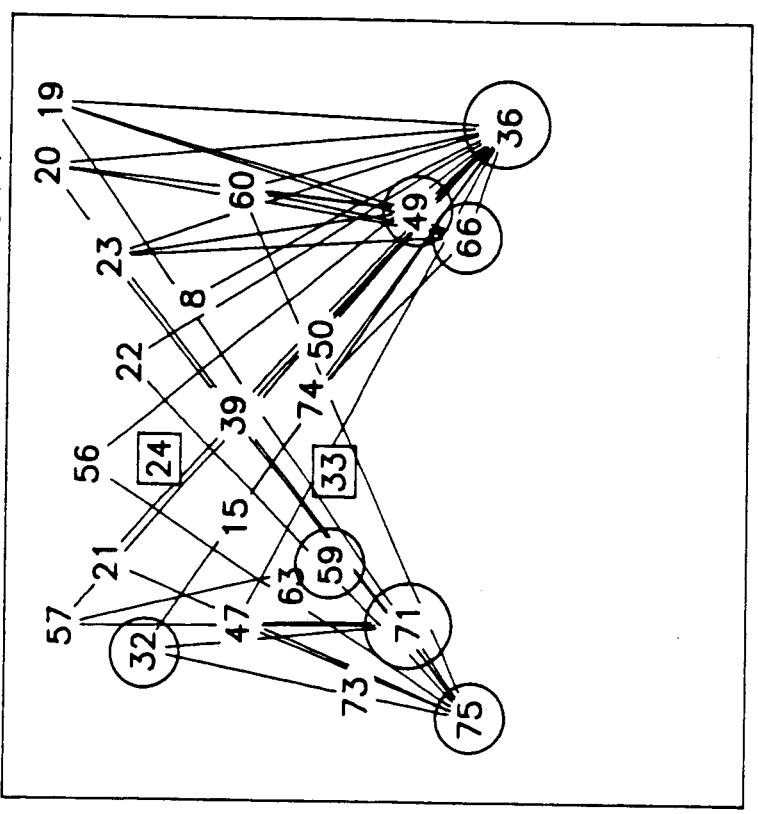
Figure 11O:
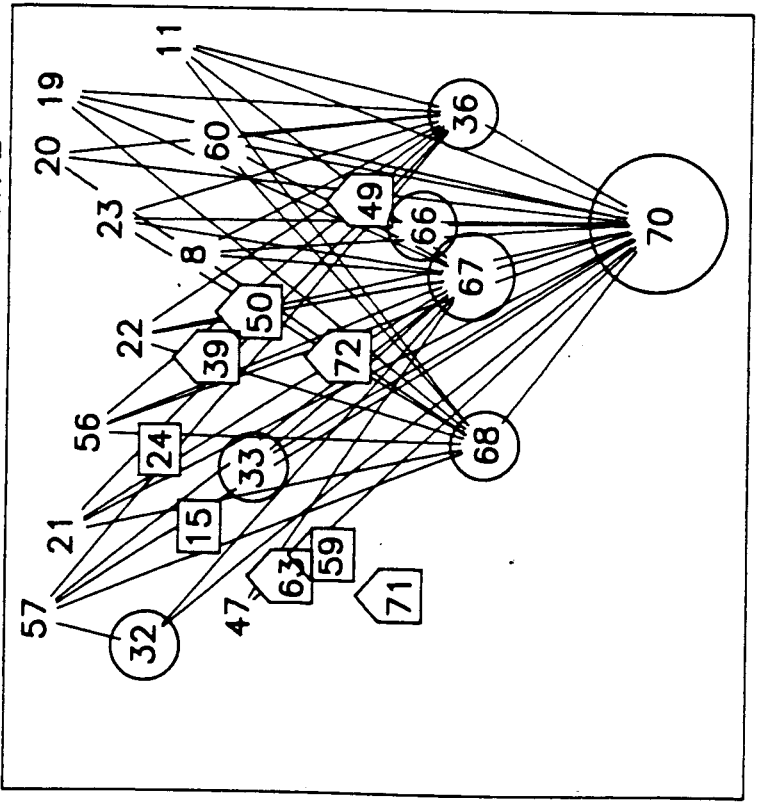
Figure 11R:
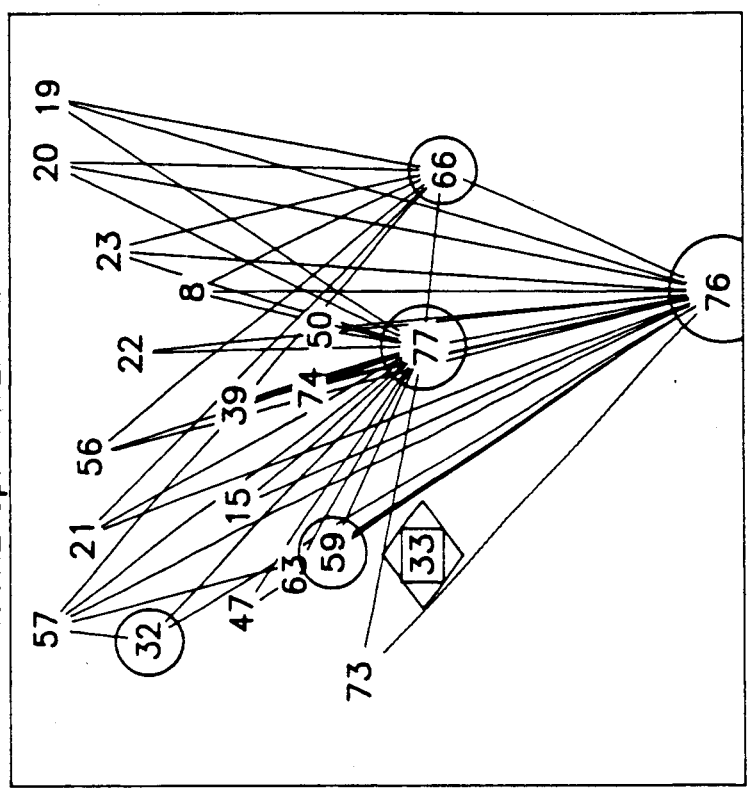
Figure 11Q:
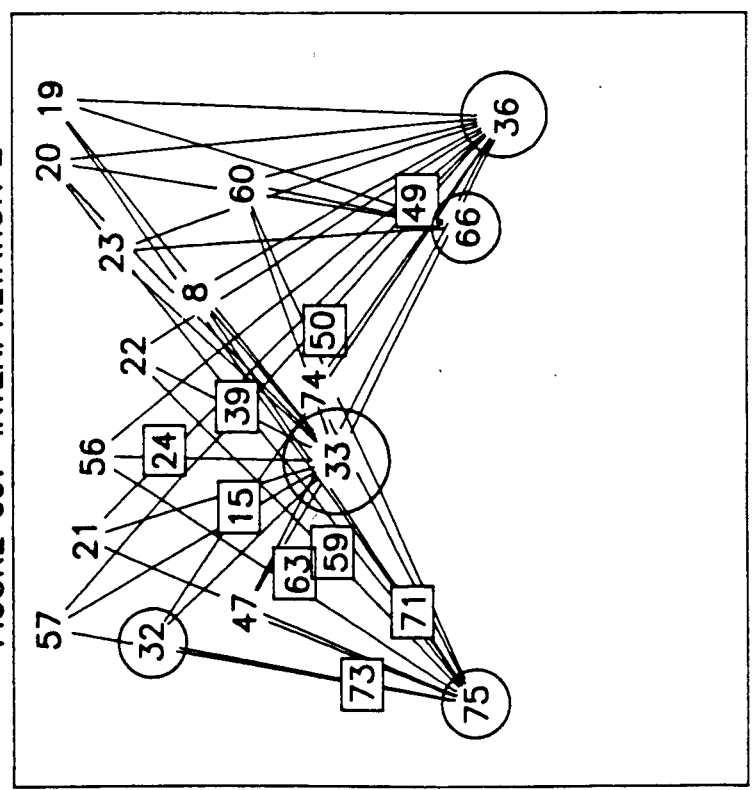

FIGS. 11a-11r show the continuous development of the qualitative scene model for the sequence shown in FIGS. 6a-6h. Note that from FIG. 6c to 6n (FIGS. 11c-11m) only one interpretation is presumed and the other is discarded. The final scene interpretation for a latter Figure of the sequence is interpretation 1 for FIG. 6(FIG. 11r). Interpretation 2 for FIG. 6p (FIG. 9b) is discarded.

In summary, qualitative motion detection and tracking system was successful in detecting and tracking moving targets in all the images.

The methods and processes in the embodiment of the present invention are implemented with the ensuing programming.

```
;;; -*- Mode: ART; Base: 10; Package: ART-USER; syntax: common-lisp; -*-
;;;
;;;
;;;##############################################################
;;;
      ;load GLOBALS
   (art-load ")sklee>DRIVE>globals.art")
;;;
;;;##############################################################
;;;
      ;load RELATIONS
   (art-load ")sklee>DRIVE>relations.art")
;;;
;;;##############################################################
;;;
      ;load UTILITY FUNCTIONS
#L(cl::load ")sklee>DRIVE>util-fun.bin")
;;;
;;;##############################################################
;;;
      ;load ZETALISP WINDOW FUNCTIONS
#L(zl::load ")sklee>DRIVE>z-windows.bin")
;;;
;;;##############################################################
;;;##############################################################
;;;
      ;load FOE FUNCTIONS
#L(cl::load ")sklee>DRIVE>create>foefun.bin")
;;;
;;;##############################################################
;;;
      ;load RULES
   (art-load ")sklee>DRIVE>create>rules.art")
```

```
;;;
;;;############################################################
;;;
(deffacts lets-get-started
    (cur-time 1 0)
)

;;;
;;;############################################################
;;;############################ S C H E D U L E R
;;;############################################################
;;;
(defrule scheduler
    (declare (salience (+ *minimum-salience* 1)))
    ?time <- (cur-time ?ct ?)
    (split
        (
            =>
            (assert (step read-data)))   ;*** get next image ( ?off <- (step read-data)
            (not (end-of-data ?))
            =>
            (retract ?off)

(assert (step display-data)))   ;*** big show ( ?off <- (step display-data)
            =>
            (retract ?off)
            (assert (step find-foe)))   ;*** derotation ( ?off <- (step find-foe)
            =>
            (retract ?off)
            (assert (step write-data)))   ;***

( ?off <- (step write-data)
            =>
            (retract ?off)
            (retract ?time)
            (assert (cur-time =(+ ?ct 1) ?ct))))
)
;;;
;;; -*- Mode: ART; Base: 10; Package: ART-USER -*-
;;;
;;;############################################################
;;;       RULES TO EVALUATE COMPLETE INTERPRETATIONS
;;;############################################################
;;;
;;;############################################################
;;;----------------------------------------------------------
;;;
(defglobal ?*rank12345* = 1
)
(defrule mark-interpretations
    "find those viewpoints which contain a lable for each point in the current
    set of points in the model"
    (declare (salience 2))
    (step evaluate)
    (viewpoint ?v
        (cur-time ?ct ?)
        (forall (member ?a ?)
            (stat | mob ?a)))              ;find (or create) a viewpoint, which
    =>                                      ;contains an attribute for every member
    (at ?v (assert (complete ?ct ?v)))
    (at ?root (assert (evaluating ?v)))
    #L(setq ?*stat-count* 0)
)
;;;
(defrule end-evaluating
    (declare (salience 3))
    ?finish <- (evaluating ?node)
```

```
    =>
    (assert (stat-count ?node ?*stat-count*))
    (retract ?finish)
)
;;;-----------------------------------------------------------------
;;;
(defrule count-stationary-members
    (declare (salience 5))
    (evaluating ?node)
    (viewpoint @?node (member ?a ?) (exists (stat ?a)))
    =>
    #L(setq ?*stat-count* (+ ?*stat-count* 1))
)
;;;-----------------------------------------------------------------
(defrule reset-ranks
    (declare (salience *maximum-salience*))
    (step evaluate)
    =>
    #L(setq ?*rank12345* 1)
)

;;;
(defrule rank-interpretations
    (declare (salience 0))
    (step evaluate)
    (not (evaluating ?))        ;wait till all are evaluated ?wag <- (stat-count ?node ?sc)
    (not (stat-count ?other-node ?sco&:(?sco > ?sc)))   ;make sure this is the max
    =>
    (retract ?wag)
    (assert (rank ?node ?*rank12345*))
    #L(setq ?*rank12345* (+ ?*rank12345* 1))
)
;;;-----------------------------------------------------------------
;;;-----------------------------------------------------------------
(defrule unmark-interpretations
    "remove interpretations that are not complete any more, due to new points
    being added to the model"
    (declare (salience *constraint-salience*))
    (step forget)
    ?skip <- (complete ? ?st)
    (member ?a ?)
    (not (mob | stat ?a))
    =>
    (retract ?skip)
;;; -*- Mode: ART; Base: 10; Package: ART-USER -*-
;;;
;;;################################################################
;;;         RULES TO CREATE & MODIFY INTERPRETATIONS
;;;################################################################
;;;
(defglobal
    ?*reasoning-salience* = 0
)
;;;
;;;
;;;################################################################
;;;
(defrule create-new-member
    (step assert)
    (cur-time ?ct ?)
    ?trigger-fact <- (new-feature ?a ?ct)
    =>
    (retract ?trigger-fact)
    (assert (member ?a ?ct))                    ;at I-root
)
;;;-----------------------------------------------------------------
;;;
(defrule make-default-assumption
    (declare (salience *maximum-salience*))
    ;(logical (member ?a ?ct))                  ;takes care of automatic withdrawal when I
```

```
ost
  (member ?a ?ct)
  =>
  (hypothesize (assert (stat ?a)))
)
;;;------------------------------------------------------------------
;;;
(defrule bridge-scheduler
  (declare (salience 1))
  (step assert)
  (cur-time ?ct ?)
  (lost-feature ?a ?ct)
  =>
  (assert (find-bridges ?ct ?a)))
;;;------------------------------------------------------------------
;;;
(defrule bridge-old-closer-friends
  ;make sure that existing closer-relationships are not lost when a member is removed
  (declare (salience 3))
  (step assert)
  (cur-time ?ct ?)
  (find-bridges ?ct ?a)
  (viewpoint ?v1
    (closer ?b ?a)
    (member ?b ?))
  (viewpoint ?v2
    (closer ?a ?c)
    (member ?c ?))
  (test (and (not (?b = ?c))
             (not (VP-EQUAL? ?v1 ?v2))))
  =>
  (merge (?v1 ?v2)
    (assert (closer ?b ?c)))
)
;;;------------------------------------------------------------------
;;;
(defrule kill-redundant
  (declare (salience *constraint-salience*))
  (cur-time ?ct ?)
  (viewpoint ?v1
    (closer ?b ?a)
    (member ?b ?))
  (viewpoint ?v2
    (closer ?a ?c)
    (member ?c ?))
  (viewpoint ?v3
    (closer ?b ?c))
  (viewpoint ?v4
    ($?))
  (viewpoint ?v5
    (closer ?b ?c))
  (test (and (not (?b = ?c))
             (not (VP-EQUAL? ?v1 ?v2))
             (not (VP-EQUAL? ?v1 ?v3))
             (not (VP-EQUAL? ?v1 ?v4))
             (not (VP-EQUAL? ?v1 ?v5))
             (not (VP-EQUAL? ?v2 ?v3))
             (not (VP-EQUAL? ?v2 ?v4))
             (not (VP-EQUAL? ?v2 ?v5))
             (not (VP-EQUAL? ?v3 ?v4))
             (not (VP-EQUAL? ?v3 ?v5))
             (not (VP-EQUAL? ?v4 ?v5))
             (VP-INHERITS-FROM? ?v4 ?v1)
             (VP-INHERITS-FROM? ?v5 ?v4)
             (VP-INHERITS-FROM? ?v3 ?v1)))
  =>
  (at ?v3 (poison " redundant spatial constraint")))
;;;------------------------------------------------------------------
;;;
(defrule remove-old-member
  (declare (salience 2))
  (step assert)
```

```
        (cur-time ?ct ?)
        ?trigger-fact <- (lost-feature ?a ?ct)
        ?timing-fact <- (find-bridges ?ct ?a)
        ?membership  <- (member ?a ?)
        =>
        (retract ?trigger-fact)
        (retract ?timing-fact)
        (retract ?membership)
)
;;;
;;;##############################################################################
(defrule absorb-moves-toward-foe
    (declare (salience (+ ?*reasoning-salience* 9)))
    (step assert)

(cur-time ?ct ?)
    ?trigger-fact <- (moving-tow-foe ?a ?lrup ?ct)
    (member ?a ?)
    =>
    (retract ?trigger-fact)
    (assert (mob ?a))              ;at root node
)
;;;
;;;-----------------------------------------------------------------------
;;;
(defrule resolve-movement-across-foe
    (declare (salience (+ ?*reasoning-salience* 6)))
    (step assert)
    (cur-time ?ct ?)
    (split
        (?trigger <- (move-across-foe ?a ?b H ?ct)    ;horizontal movement a is left
        (split
            ((stat ?a)
             =>
             (assert (mob ?b)) (assert (moves L ?b ?ct)))
            ((stat ?b)
             =>
             (assert (mob ?a)) (assert (moves R ?a ?ct)))))

(?trigger <- (move-across-foe ?a ?b V ?ct)    ;vertical movement a is above
        (split
            ((stat ?a)
             =>
             (assert (mob ?b)) (assert (moves U ?b ?ct)))
            ((stat ?b)
             =>
             (assert (mob ?a)) (assert (moves D ?a ?ct)))))
)
;;;-----------------------------------------------------------------------
(defrule absorb-passes
    (declare (salience 6))
    (step assert)
    (cur-time ?ct ?)
    (passing ?a ?b ?lrud ?ct)
    (stat ?a)                              ;in particular vp
    (stat ?b)
    =>
    (assert (closer ?a ?b))
)
;;;-----------------------------------------------------------------------
(defrule absorb-faster-expansion
    (declare (salience 5))
    (step assert)
    (cur-time ?ct ?)
    (div-faster ?a ?b ?ct)
    (stat ?a)                              ;in particular vp
    (stat ?b)
    =>
    (assert (closer ?a ?b))
)
;;;-----------------------------------------------------------------------
```

```
(defrule kill-them
    (declare (salience *constraint-salience*))
    (stat ?f)
    (mob ?f)
    =>
    (poison "moving/stationary contradiction")
FRODO:>sklee>DRIVE>create>rules.art.23

;;; -*- Mode: ART; Base: 10; Package: ART-USER; syntax: common-lisp; Fonts: CPTFONT; -*-
;;;
;;;
;;;##################################################################
;;;############################# R U L E S - INITIALIZATION ########
;;;##################################################################
;;;
;;;
(defrule create-single-frame-wdw
    (declare (salience *maximum-salience*))
 =>
  #L(progn (setq ?*frame-window-2* 'frame-window-2)
     (create-window ?*frame-window-2* 'graphics
        (+ ?*frame-origin-x* 15)
        (- ?*frame-origin-y* 100)
        (+ ?*frame-origin-x* ?*hor-size* 15)
        (+ ?*frame-origin-y* ?*ver-size* -100)
        "Image Plane 2" t)
     (setq ?*frame-wdw-stream-2* (window-stream ?*frame-window-2*))

(setq ?*frame-window-1* 'frame-window-1)
     (create-window ?*frame-window-1* 'graphics
        (+ ?*frame-origin-x* 15)
        (- ?*frame-origin-y* 100)
        (+ ?*frame-origin-x* ?*x-disp-size* 15)
        (+ ?*frame-origin-y* ?*y-disp-size* -100)
        "Image Plane 1" t)
     (setq ?*frame-wdw-stream-1* (window-stream ?*frame-window-1*))

(setq ?*frame-wdw-stream* ?*frame-wdw-stream-2*)
     (setq ?*frame-array* (create-shadow-array ?*frame-wdw-stream*))
     (setq ?*frame-wdw-stream* ?*frame-wdw-stream-1*
           ?*frame-window* ?*frame-window-1*)
     (setq ?*frame-array1* (create-shadow-array ?*frame-wdw-stream*))
     (clear-zl-window ?*frame-wdw-stream*))
)

;;
(defrule create-multiple-frame-wdws
    (declare (salience *maximum-salience*))
    (block)
 =>
    (bind ?x-step (+ ?*x-size* 28))
    (bind ?y-step (+ ?*y-size* 43))
    (for row from 0 to 2 do
      (for col from 0 to 3 do
        (bind ?wdw-nr (+ (* row 4) col))
        (bind ?wdw (aref ?*frame-array* ?wdw-nr))
        (if (<= ?wdw-nr ?*max-frame-number*) then
          (create-window ?wdw 'graphics
            (* col ?x-step) (* row ?y-step)
            (+ (* (+ col 1) ?x-step) 1) (+ (* (+ row 1) ?y-step 1))
            (format nil "t = ~,1F sec" (* ?wdw-nr 0.5)) nil)
          (line 0 0 ?*x-size* 0 1 7 ?wdw)
          (line 0 ?*y-size* ?*x-size* ?*y-size* 1 7 ?wdw)
          (line 0 0 0 ?*y-size* 1 7 ?wdw)
          (line ?*x-size* 0 ?*x-size* ?*y-size* 1 7 ?wdw))))
    ;make window for traces
    (create-window 'trace-window 'graphics
      (* 3 ?x-step) (* 2 ?y-step)
```

```
            (+ (* (+ 3 1) ?x-step) 1) (+ (* (+ 2 1) ?y-step 1))
      (format nil "Point Traces") t)
  (line 1 1 ?*x-size* 1 2 7 'trace-window)
  (line 1 ?*y-size* ?*x-size* ?*y-size* 2 7 'trace-window)
  (line 1 1 1 ?*y-size* 2 7 'trace-window)
  (line ?*x-size* 1 ?*x-size* ?*y-size* 2 7 'trace-window)
)
;;;
;;;##############################################################
;;;######################## R U L E S - READING DATA
;;;##############################################################
;;;
(defrule read-original-point-set
   (step read-data)
   (cur-time ?ct ?)
   =>
   $L(let ((file-name
               (make-snap-file-name ?ct)))
      (setq ?*points-list* (read-new-facts file-name)) ;returns nil if file nonexistant
      (cond ((null ?*points-list*) (assert (end-of-data ?ct)))
            (t  (eval ?*points-list*))))
)

;;;
;;;##############################################################
;;;######################## R U L E S - TRACING POINTS
;;;##############################################################
;;;
(defrule clear-displacement-list
   (declare (salience *maximum-salience*))
   (step read-data)
   =>
   $L(progn
      (setq ?*disp-orig* '())
      (setq ?*disp-stat* '())
      (setq ?*disp-mob* '()))
)
;;;
(defrule fill-displacement-list
   (step read-data)
   (cur-time ?ct ?pt)
   (ip ?label ?ct ?x2 ?y2)
   (ip ?label ?pt ?x1 ?y1)
   (case
      ((mob ?label)
      =>
      $L(push (list ?label
            (- ?x1 ?*offset-hor*)
            (- ?y1 ?*offset-ver*)

(- ?x2 ?*offset-hor*)
            (- ?y2 ?*offset-ver*))
          ?*disp-mob*))

(otherwise
      =>
      $L(push (list ?label
            (- ?x1 ?*offset-hor*)
            (- ?y1 ?*offset-ver*)
            (- ?x2 ?*offset-hor*)
            (- ?y2 ?*offset-ver*))
          ?*disp-stat*)))
   =>
   $L(push (list ?label
         (- ?x1 ?*offset-hor*)
         (- ?y1 ?*offset-ver*)
         (- ?x2 ?*offset-hor*)
         (- ?y2 ?*offset-ver*))
       ?*disp-orig*)
```

```
;;;
;;;##############################################################################
;;;############################## R U L E S - DISPLAYING THE IMAGE
;;;##############################################################################
;;;
(defrule SWITCH-WINDOW
   (declare (salience *maximum-salience*))
   (cur-time ?ct ?)
   (step display-data)
   =>
   #L(setq ?*frame-wdw-stream* ?*frame-wdw-stream-1*
           ?*frame-window* ?*frame-window-1*)
)
;;;
(defrule SHOW-DISPLACEMENT
   (declare (salience -1))
   (cur-time ?ct ?)
   (step display-data)
   =>
   (clear-zl-window ?*frame-wdw-stream*)
   (retrieve ?ct ?*frame-wdw-stream* ?*frame-array*)
   (label-window ?*frame-window* (format nil "FRAME ~D" ?ct))
   (mark-list-of-points (cdr ?*points-list*) ?ct ?*frame-wdw-stream*)
   (rectangle 0 0 (- ?*x-size* 2) (- ?*y-size* 1) 1 7 ?*frame-window*)
   (show-labeled-disp ?*disp-orig* ?*frame-wdw-stream* t)        ;dashed=nil solid=t
)
;;;
;;;##############################################################################
;;;############################## R U L E S - FINDING THE FOE
;;;##############################################################################
;;;
(defrule CLEAR-DEROTATED-DISPLACEMENTS
   (declare (salience *maximum-salience*))
   (step find-foe)
   =>
   #L(setq ?*disp-derot* '())
)
;;;
(defrule MAKE-INITIAL-FOE-GUESS
   (goal (foe-guess ? ? ?ct))
   (cur-time ?ct ?pt)
   (case
     ((foe-est ?xfp ?xyp ? ? ?pt)
      =>
      (assert (foe-guess ?xfp ?xyp ?ct)))       ;use previous FOE as new guess
     (otherwise
      =>
      (assert (foe-guess 0 -80 ?ct))))
)
;;;
(defrule FIND-THE-FOE-AND-DEROTATE
   (step find-foe)
   (cur-time ?ct ?)
   (foe-guess ?xfg ?yfg ?ct)
   =>
   #L(let ((theta 0.0) (phi 0.0) (advancement 0.0) (growstep 10))

(multiple-value-bind (foe-locations area error-ratio)
                                  (find-foe ?xfg ?yfg ?*disp-state* growstep)

(setq ?*foe-locations* foe-locations)

(unless (endp foe-locations)
            (multiple-value-bind (xf yf sx sy error) (values-list (car foe-locations))

(multiple-value-setq (theta phi) (actual-rot xf yf (+ xf sx) (+ yf sy)))

(setq ?*disp-derot* (derotate ?*disp-orig* theta phi))
              (setq ?*disp-state* (derotate ?*disp-state* theta phi))
```

```
(setq ?*disp-ext* (set-min-max-dist ?*disp-derot* foe-locations 10))
        ;add new information to the diplacement vectors (show-labeled-disp ?*disp-derot* ?*frame-wdw-stream* nil)             ;dashed lines (mark-foe-area foe-locations growstep ?*frame-wdw-stream*)            ;stepsize = 10
(mark-foe-specs area error-ratio 270 600 ?*frame-windows*)

(mark-rotation theta phi 50 80 400 ?*frame-windows*)

(multiple-value-setq
    (advancement ?*disp-references*)
        (speed-above-ground ?*disp-state* foe-locations 20))
(mark-speed-vectors ?*disp-references* ?*frame-windows*)
(mark-advancement advancement 270 660 ?*frame-windows*)

(assert (foe-est =(+ xf) =(+ yf) =(+ xf) =(+ yf) ?ct)
        (rot-est =(+ theta) =(+ phi) =(+ theta) =(+ phi) ?ct)
        (derotated ?ct))))))
;;;
;;;###############################################################################
;;;############################### R U L E S - WRITING RESULTS
;;;###############################################################################
;;;
(defrule write-results-to-file
   (step write-data)
   (cur-time ?ct ?)
   (derotated ?ct)
   (foe-est ?xf1 ?yf1 ?xf2 ?yf2 ?ct)
   (rot-est ?rx1 ?ry1 ?rx2 ?ry2 ?ct)
   =>
   #L(let
       ((file-name (make-disp-file-name ?ct))
        ;assert foe-est, rot-est, displacement-list (assert-list
          (append
            (list 'assert
              (list 'foe-est ?xf1 ?yf1 ?xf2 ?yf2 ?ct)              ;center foe
              (list 'rot-est ?rx1 ?ry1 ?rx2 ?ry2 ?ct)              ;estim rotation
              (list 'foe-locations ?ct ?*foe-locations*))          ;list of foe-locat
ions
            (mapcar #'(lambda (x) (cons 'dv (cons ?ct x)))
                                  ?*disp-ext*))))    ;displacement vectors (write-assertion assert-list file-name))
)

;;;
;;;###############################################################################
;;;############################### R U L E S - FORGETTING OLD STUFF
;;;###############################################################################
;;;
(defrule eliminate-old-points                        ;points (tracked)
   (declare (salience (+ *minimum-salience* 3))).
   (cur-time ? ?past)
   ?to-kill <- (point ? ? ? ?ti&:(< ?ti (- ?past 2)))
=>
   (retract ?to-kill)
)
;;;
D,#TD1PsT[Begin using 006 escapes](0 0 (NIL 0) (NIL NIL NIL) "CPTFONT")(1 0 (NIL 0)
(NIL :BOLD-EXTENDED NIL) "CPTFONTB")0;;; -*- Mode: LISP; Base: 10; Package: ART-USER; syn
tax: common-lisp; Fonts: CPTFONT,CPTFONTB; Tab-Width: 4; -*-
;;;
(defconstant
        ;neighborhood offsets, contains x/y-offsets for 8 neighbors
        ;
        ;  |3|2|1|           |
        ;  |4| |0| -> +x     V +y
        ;  |5|6|7|
```

```
     1*nb-off*0 (make-array '(8 2) :initial-contents
              '((1 0) (1 -1) (0 -1) (-1 -1) (-1 0) (-1 1) (0 1) (1 1)))
)
;;;
;;;------------------------------------------------------------
;;;
(defun 1find-foe 0(xf-guess yf-guess disp-list growstep)
   (let
     ((bigstep 10) (smallstep 5) (disp-for-foe) (foe-locations nil)
        (final-size 16) (error-ratio 1))

(unless (endp disp-list)
       (setq disp-for-foe (select-guide-vector disp-list 100))

(initialize-search)          ;restart the hash-table for quick references

;(show-error-grid xf-guess yf-guess step disp-for-foe)

(multiple-value-bind (found stuck xc yc err-c)
           (search-pool xf-guess yf-guess -1.0 bigstep smallstep disp-for-foe)    ;search for minimum (multiple-value-setq (foe-locations final-size error-ratio)
             (grow-foe-area-2 xc yc final-size growstep disp-for-foe))))
;expand area (values foe-locations final-size error-ratio))   ;return list of foe-locations (centers first)
)
;;;
;;;------------------------------------------------------------
;;;------------------------------------------------------------
;;;
(defun 1select-guide-vector 0(disp-list N)
   ;sort for lowest starting point vector
   (let ((disp-list-copy (copy-list disp-list)))
      (keep-n-elements (cl:sort disp-list-copy #'> :key #'third) N))
)
;;;
(defun keep-n-elements (a-list n)
   ;return only the first n elements of a-list
   (cond
       ((and (consp a-list) (> n 0))
           (cons (car a-list) (keep-n-elements (cdr a-list) (- n 1))))
       (t nil))
;;;------------------------------------------------------------
;;;
(defun show-error-grid (xf-guess yf-guess step disp-for-foe)
     ;
     (do ((yf (- yf-guess 100) (+ yf step))) ((> yf (+ yf-guess 100)))
        (do ((xf (- xf-guess 100) (+ xf step))) ((> xf (+ xf-guess 100)))

(multiple-value-bind (status x-shift y-shift error feasible)
                 (find-opt-shift xf yf disp-for-foe)
            (setq error (* 1.0 (sqrt error)))   ;(sqrt error)
            (cond
              ((>= 8.0 error)
                        (circle (+ ?*offset-hor* xf) (+ ?*offset-ver* yf)
                             error 1 7 'frame-window))
                 (t
                        (circle (+ ?*offset-hor* xf) (+ ?*offset-ver* yf)
                             8 2 7 'frame-window)))
            (unless feasible
                (line (+ ?*offset-hor* xf -4) (+ ?*offset-ver* yf)
                     (+ ?*offset-hor* xf  4) (+ ?*offset-ver* yf) 1 7 'frame-window)
                (line (+ ?*offset-hor* xf) (+ ?*offset-ver* yf -4)
                     (+ ?*offset-hor* xf) (+ ?*offset-ver* yf  4) 1 7 'frame-window)))))
```

```
;;;
;;;------------------------------------------------------------------------
;;;
(defun lactual-rot0 (x1 y1 x2 y2)   ;disp-vector vertex)
  ;; determine the hor/vertical rotation necessary to move (x1 y1) into (x2 y2)
  ;;"disp-vector"= (xc yc xd yd)
  ;;"vertex" = (xrot yrot xpos ypos tag)
  (let ((xyf) (f-2 (float (* ?*focal-length* ?*focal-length*)))
        (y10-2) (x20-2)           ;displacement on the axes
        (xc) (yc)
        (x1-2) (y1-2) (x2-2) (y2-2))

(setq
        x1-2 (* x1 x1)    y1-2 (* y1 y1)
        x2-2 (* x2 x2)    y2-2 (* y2 y2))
    (setq
        y10-2 (float (/ (* f-2 y1-2) (+ f-2 x1-2)))
        x20-2 (float (/ (* f-2 x2-2) (+ f-2 y2-2))))
    (setq xyf   (/ (* x20-2 y10-2) f-2))
    ;;find intersection of the two hyperbolae (setq xc (sqrt (/ (+ x20-2 xyf) (- 1.0 (/ xyf f-2)))))
    (setq yc (sqrt (/ (* y10-2 (+ f-2 (* xc xc))) f-2)))
    (write-line (format nil "~% ~F   ~F" xc yc))
    (cond ((< x2 0)
           (setq xc (- xc))))
    (cond ((< y1 0)
           (setq yc (- yc))))
    (values (zl::/ (round (* 100.0 57.29578
           (atan (* ?*focal-length*
                   (/ (- xc x1)
                      (+ f-2 (* xc x1))))))) 100.0)
        (zl::/ (round (* 100.0 57.29578
           (atan (* ?*focal-length*
                   (/ (- y2 yc)
                      (+ f-2 (* yc y2))))))) 100.0) xc yc))
)
;;;------------------------------------------------------------------------
(defun lactual-ro0 (x1 y1 x2 y2)   ;disp-vector vertex)
  ;; determine the hor/vertical rotation necessary to move (x1 y1) into (x2 y2)
  ;;"disp-vector"= (xc yc xd yd)
  ;;"vertex" = (xrot yrot xpos ypos tag)
  (let ((xyf) (f-2 (float (* ?*focal-length* ?*focal-length*)))
        (y10-2) (x20-2)           ;displacement on the axes
        (xc 0.0) (yc 0.0)
        (x1-2) (y1-2) (x2-2) (y2-2))

(setq
        x1-2 (* x1 x1)    y1-2 (* y1 y1)
        x2-2 (* x2 x2)    y2-2 (* y2 y2))
    (setq
        y10-2 (float (/ (* f-2 y1-2) (+ f-2 x1-2)))
        x20-2 (float (/ (* f-2 x2-2) (+ f-2 y2-2))))
    (setq xyf   (/ (* x20-2 y10-2) f-2))
    ;;find intersection of the two hyperbolae
    (setq xc (* ?*focal-length* x2
                                (sqrt (/ (+ f-2 x1-2 y1-2) (- (* (+ f-2 x1-2) (+ f-2 y2-2)
) (* x2-2 y2-2))))))
    (setq yc (* ?*focal-length* y1
                                (sqrt (/ (+ f-2 y2-2 x2-2) (- (* (+ f-2 y2-2) (+ f-2 x1-2)
) (* y1-2 x1-2))))))

(write-line (format nil "~% ~F   ~F" xc yc))
    (cond ((< x2 0)
           (setq xc (- xc))))
    (cond ((< y1 0)
           (setq yc (- yc))))
    (values
        (zl::/ (round (* 100.0 57.29578
           (atan (* ?*focal-length*
```

```
                        (/ (- xc x1)
                            (+ f-2 (* xc x1)))))))  100.0)
            (zl::/ (round (* 100.0 57.29578
                (atan (* ?*focal-length*
                    (/ (- y2 yc)
                        (+ f-2 (* yc y2))))))) 100.0) xc yc))
)
;;;------------------------------------------------------------
(defun lactual0 (x1 y1 x2 y2)   ;disp-vector vertex)
   ;; determine the hor/vertical rotation necessary to move (x1 y1) into (x2 y2)
   ;;"disp-vector"= (xc yc xd yd)
   ;;"vertex" = (xrot yrot xpos ypos tag)
   (let ((xyf) (f-2 (float (* ?*focal-length* ?*focal-length*)))
        (y10-2) (x20-2)             ;displacement on the axes
        (xc 0.0) (yc 0.0)
        (x1-2) (y1-2) (x2-2) (y2-2) (A) (B))

(setq
        x1-2 (* x1 x1)    y1-2 (* y1 y1)
        x2-2 (* x2 x2)    y2-2 (* y2 y2))
     (setq A (/ x2-2 (+ f-2 y2-2)))
     (setq B (/ y1-2 (+ f-2 x1-2)))
     (setq xc (sqrt
                  (* f-2 x2-2 (/ (+ f-2 x1-2 y1-2)
                      (- (* (+ f-2 y2-2) (+ f-2 x1-2)) (* x2-2 y1-2)
)))))
     (setq yc (sqrt
                  (* f-2 y1-2 (/ (+ f-2 y2-2 x2-2)
                      (- (* (+ f-2 x1-2) (+ f-2 y2-2)) (* y1-2 x2-2)
)))))

(write-line (format nil "~%  ~F   ~F" xc yc))

(setq xc (sqrt (* A f-2 (/ (+ 1.0 B) (- 1.0 (* A B))))))
     (setq yc (sqrt (* B f-2 (/ (+ 1.0 A) (- 1.0 (* A B))))))

(write-line (format nil "~%  ~F   ~F" xc yc))
     (cond ((< x2 0)
            (setq xc (- xc))))
     (cond ((< y1 0)
            (setq yc (- yc))))
     (values
        (zl::/ (round (* 100.0 57.29578
            (atan (* ?*focal-length*
                (/ (- xc x1)
                    (+ f-2 (* xc x1))))))) 100.0)
        (zl::/ (round (* 100.0 57.29578
            (atan (* ?*focal-length*
                (/ (- y2 yc)
                    (+ f-2 (* yc y2))))))) 100.0) xc yc))
)
;;;------------------------------------------------------------
(defun real-rot (x2 y2 theta phi)
   ;;apply the rotation specified by theta/phi to the image point x2 y2
   (let
     ( (xr) (yr) (finv (/ 1.0 ?*focal-length*))
       (hsin 0.0) (hcos 0.0) (vsin 0.0) (vcos 0.0)
       (denom 0.0))
     (setq
       hsin (sin (* ?*deg-rad* theta))
       hcos (cos (* ?*deg-rad* theta))
       vsin (sin (* ?*deg-rad* (- phi)))
       vcos (cos (* ?*deg-rad* (- phi))))
     (setq denom (+ (- (* finv x2 hsin vcos)) (* finv y2 vsin) (* hcos vcos)))
     (setq
        xr (/ (+ (* x2 hcos) (* ?*focal-length* hsin)) denom)
        yr (/ (+ (* x2 hsin vsin) (* y2 vcos) (- (* ?*focal-length* hcos vsin)))
               denom))
```

```
           (list xr yr))
)
;;;
;;;------------------------------------------------------------------
;;;
(defun shift (disp-orig x-shift y-shift)
   (let ((label) (x1) (y1) (x2) (y2)
         (hsin) (hcos) (vsin) (vcos) (denom) (disp-derot '()))
      ;;
   (dolist (disp-vec disp-orig)          ;disp-vec =(x1 y1 x2 y2)
      (multiple-value-setq (label x1 y1 x2 y2) (values-list disp-vec))
      (push
        (list label x1 y1 (+ x2 x-shift) (+ y2 y-shift)) disp-derot))
    disp-derot)
)

;;;;
(defun derotate (disp-orig theta phi)   ;theta,phi in DEGREES (not 10 * deg)
   (let
         ((hsin) (hcos) (vsin) (vcos) (denom) (disp-derot '()))
      ;;
   (dolist (disp-vec disp-orig)          ;disp-vec =(x1 y1 x2 y2)
     (multiple-value-bind (label x1 y1 x2 y2) (values-list disp-vec)
      (setq
        hsin (sin (* ?*deg-rad* theta))
        hcos (cos (* ?*deg-rad* theta))
        vsin (sin (* ?*deg-rad* (- phi)))
        vcos (cos (* ?*deg-rad* (- phi))))
      (setq denom
         (+ (- (* ?*finv* x2 hsin vcos)) (* ?*finv* y2 vsin) (* hcos vcos)))

(push
         (list label x1 y1
                 (zl::/ (round (* 10.0
                     (/ (+ (* x2 hcos) (* ?*focal-length* hsin)) denom))) 10.0)
                 (zl::/ (round (* 10.0
                     (/ (+ (* x2 hsin vsin) (* y2 vcos) (- (* ?*focal-length* hcos vsin)))
                        denom))) 10.0))
               disp-derot)))
      disp-derot)
)

;;;##############################################################################
;;;############################# FUNCTIONS FOR OPTIMUM SHIFT
;;;##############################################################################
;;;
(defvar
        *foe-hash* (make-hash-table :test #'equal :size 200)
)
;;;
(defun initialize-search ()
    (clrhash *foe-hash*)
)
;;;
(defun add-to-map (member x y sx sy err feasible)
    (setf (gethash (format nil "~4D-~4D" x y) *foe-hash*)
                (list member x y sx sy err feasible))
)
;;;
(defun get-from-map (x y)
        (let ((entry (gethash (format nil "~4D-~4D" x y) *foe-hash*)))
              (cond ((consp entry) (values-list entry))
                    (t nil)))
)
;;;
;;;------------------------------------------------------------------
;;;
(defun find-opt-shift (xf yf disp-list)
   (let ((mu) (m) (x) (y) (sx) (sy) (error) (feasible))

;first try to find (xf,yf) in hash-table
        (multiple-value-setq (m x y sx sy error feasible) (get-from-map xf yf))
```

```
            (when (null m)  ;NOT in table
              (multiple-value-setq (sx sy mu error) (compute-opt-shift xf yf disp-list))
              (setq feasible (check-feasible xf yf sx sy disp-list))
                  (setq m 'P)
                  (add-to-map m xf yf sx sy error feasible))          ;memorize as "probed"

(values m sx sy error feasible))
  )
  ;;;
  (defun compute-opt-shift (xf yf disp-list)
    ;first element in displacement list contains
    ;guide = (xg yg xg' yg')
    (let ((A2-sum 0) (B2-sum 0) (C2-sum 0)
          (AB-sum 0) (AC-sum 0) (BC-sum 0) (N 1) (label)
          (xg1) (yg1) (xg2) (yg2)                              ;guide displacement vector
          (xgf) (ygf)
          (xe) (ye) (length) (mu)
          (x-shift) (y-shift) (error)
          (Ai) (Bi) (Ci))
      (multiple-value-setq (label xg1 yg1 xg2 yg2) (values-list (car disp-list)))
      ;(circle (+ ?*offset-hor* xg2) (+ ?*offset-ver* yg2) 3 2 7 'frame-window)
      (setq
         xgf (- xg1 xf)   ygf (- yg1 yf))
      ;
      (dolist (disp-vector (cdr disp-list))

(multiple-value-bind (label x1 y1 x2 y2) (values-list disp-vector)
            (setq
                xe (- x1 xf) ye (- y1 yf)
                length (sqrt (+ (* xe xe) (* ye ye))))
            (unless (zerop length)
              (setq
                xe (/ xe length)
                ye (/ ye length)                ;(xe,ye) unit vector from FOE to Pi Ai (- (* ye xgf) (* xe ygf))
                Bi (* ye (- x2 xg2))
                Ci (* xe (- y2 yg2))
                A2-sum (+ A2-sum (* Ai Ai))
                B2-sum (+ B2-sum (* Bi Bi))
                C2-sum (+ C2-sum (* Ci Ci))
                AB-sum (+ AB-sum (* Ai Bi))
                AC-sum (+ AC-sum (* Ai Ci))
                BC-sum (+ BC-sum (* Bi Ci))
                N (+ N 1)))))

;evaluate sums
      (setq
        mu (/ (- AC-sum AB-sum) A2-sum)
        x-shift (zl::/ (round (* 10.0 (+ (- xf xg2) (* mu xgf)))) 10.0)
        y-shift (zl::/ (round (* 10.0 (+ (- yf yg2) (* mu ygf)))) 10.0)
        error   (zl::/ (round (* 10.0
                                  (/ (+ (* mu mu A2-sum)
                (* 2.0 mu (- AB-sum AC-sum))
                (* -2.0 BC-sum)
                B2-sum C2-sum)
             N))) 10.0))
      (values x-shift y-shift mu (max 0.0 error)))  ;return multiple values
  )

;;;
  (defun check-feasible (xf yf x-shift y-shift disp-list)
    ;checks if this FOE (xf,yf) with the shift applied (x-shift,y-shift)
    ;is a feasible one
    ;
    (let ((dx1) (dy1) (dx2) (dy2) (x1) (x2) (y1) (y2) (label)
                (tolerance 4) (min-shift -50) (max-shift 50))

;
    (cond
    ;((or (> xf 200) (< xf -200) (> yf 200) (< yf -200)) nil)
```

```
;
;((or () x-shift max-shift) (< x-shift min-shift)
;       (> y-shift max-shift) (< y-shift min-shift)) nil)
;
(t
    (dolist (disp-vector disp-list t)                    ;returns t if passes through
      (multiple-value-setq (label x1 y1 x2 y2) (values-list disp-vector))
      (setq
        dx1 (- x1 xf)
        dy1 (- y1 yf)
        dx2 (- (+ x2 x-shift ) xf)
        dy2 (- (+ y2 y-shift ) yf))
      (setq                                                                          ;make dx2/dy2 longer
        dx2 (cond ((plusp dx2) (+ dx2 tolerance)) (t (- dx2 tolerance)))
        dy2 (cond ((plusp dy2) (+ dy2 tolerance)) (t (- dy2 tolerance))))
      (when
        (> (+ (* dx1 dx1) (* dy1 dy1)) (+ (* dx2 dx2) (* dy2 dy2)))
        (return nil))))))                                 ;if still larger => impossible shift
)
;;;-----------------------------------------------------------------
;;;
(defun search-pool (x-guess y-guess threshold bigstep smallstep disp-list)
   ;starting from (x-guess,y-guess) the minimum of the foe-area is searched (let ((xc x-guess) (yc y-guess) (xn) (yn)
         (err-c) (err-n) (xs) (ys) (ll) (S) (S-from) (S-to)
         (stuck nil) (found nil) (feasible) (m)
         (xold nil) (yold nil))
   ;;;
   ;probe 1st point
   (multiple-value-setq (m xs ys err-c feasible) (find-opt-shift xc yc disp-list))

(do ((step bigstep (/ step 2))) ((< step smallstep))    ;reduce step-size when stuck (setq xold xc yold yc)
     (setq S-from 0 S-to 7)                                ;first probe all around
     (setq stuck nil)

(do ((it 1 (+ it 1))) (stuck)

(multiple-value-setq (S xn yn err-n feasible)      ;S..direction in which min was fnd
          (min-neighbor xc yc err-c S-from S-to step feasible disp-list))
        (cond
          ((< err-n err-c)                                 ;new minimum found
            (setq
                  xc xn  yc yn  err-c err-n)
            (when ?*show-foe-search*
              (line (+ ?*offset-hor* xold) (+ ?*offset-ver* yold)
                    (+ ?*offset-hor* xc)   (+ ?*offset-ver* yc) 4 7 'frame-window
              ))
            (setq xold xc yold yc)

(cond
              ((<= err-c threshold)
                  (setq found t))                          ;we are inside the pool!
              (t
                 (cond
                   ((evenp S)
                      (setq
                            S-from (mod (+ S 7) 8)        ;search S+-1
                            S-to   (mod (+ S 1) 8)))
                   (t
                      (setq
                            S-from (mod (+ S 6) 8)        ;search S+-2
                            S-to   (mod (+ S 2) 8))))))))  ;from corn
```

```
er
                 (t
;NO new minimum found!
                         (setq stuck t)))))                                    ;STUCK outside the
pool!
      (values found stuck xc yc err-c))
)
;;;------------------------------------------------------------------------
;;;
(defun min-neighbor (xc yc err-c S-from S-to step feasible disp-list)
         ;probe the error-function at neighbors S-from including S-to
    ;if feasible = true (xc/yc was in a feasible area)
    ;       then if none of the neighbors are feasible then take min-neighbor
    ;                      else take the min-neigbor among the feasible
    ;          else
    ;                  take the min-neighbor among the feasible
    ;
     (let ((err-min 9999) (x-min) (y-min) (S-min) (m))
   ;
     (do ((n S-from (mod (+ n 1) 8)) (done nil)) (done)
       (let
                      ((xn (+ xc (* step (aref *nb-off* n 0))))
                       (yn (+ yc (* step (aref *nb-off* n 1)))))
           ;get neighbors error
        (multiple-value-bind (m xs ys err-n n-feasible) (find-opt-shift xn yn disp-list)
             (cond
                 ((and (not feasible) n-feasible)                              ;t
ransition into feasible region
                  (setq
                          feasible t
                          S-min    n
                          err-min err-n
                          x-min    xn
                       y-min      yn))
                 (t
                          (when (< err-n err-min)
                              (setq
                                    S-min    n
                                    err-min err-n
                                    x-min    xn
                                 y-min      yn)))))
        (setq done (= n S-to))))
     (values S-min x-min y-min err-min feasible))
;;;------------------------------------------------------------------------
;;;
(defun outline (x-start y-start threshold step disp-list)
       ;outline the area with error<=threshold using raster-width "step"
       ;(x-start,y-start) is inside this area and one of its neighbors must
    ;be outside
       ;(1) set initial direction S
       ;(2) until back at the starting-point (x-start,y-start)
       ;       (2a) step in direction S
       ;       (2b) set new direction S
    ;
    (let ((S) (xc) (yc) (err-c))
    ;
    (multiple-value-setq (S xc yc err-c)       ;set initial direction & new point
           (init-outline x-start y-start threshold step disp-list))
    (filled-circle (+ ?*offset-hor* xc) (+ ?*offset-ver* yc)
           2 7 'frame-window)

(do ((iter 1 (+ iter 1))) ((or (and (= xc x-start) (= yc y-start))))
           (multiple-value-setq (S xc yc err-c)
                  (continue-outline S xc yc threshold step disp-list))
           (filled-circle (+ ?*offset-hor* xc) (+ ?*offset-ver* yc)
                  2 7 'frame-window)))
)
;;;--------
```

```
;;;
(defun init-outline (x-start y-start threshold step disp-list)
        ;assumes that for at least one neighbor of (x-start,y-start) is > threshold
    ;searches neighbors for (= threshold to start outline in counter-clockwise
        ;order
        ;(1) probe neigbors in CCW order until one with error > threshold is found
        ;(2) from this neighbor find next in CCW order whose error is <= threshold
        ;         if none does exist, return (x-start,y-start).
        (let ((xc) (yc) (sx) (sy) (failure nil) (m))
        ;
        ;(1) find point OUTSIDE the area
        ;
        (unless                                                      ;if not fo
und during iteration
            (do ((n 0 (+ n 1)) (found nil)) ((or found (> n 7)) found)
            (let
                        ((xn (+ x-start (* step (aref *nb-off* n 0))))
                         (yn (+ y-start (* step (aref *nb-off* n 1))))
                         (ll) (err-n))
            ;get neighbors error
            (multiple-value-setq (m sx sy err-n) (find-opt-shift xn yn disp-list))
                    (cond
                    ((> err-n threshold)                             ;point OUTSIDE area found
                        (setq
                            found t
                            S  n))
                    (t (unless (check-feasible xn yn sx sy disp-list)    ;not feasible
                         (setq
;= outside
                            found t
                            S  n))))))

(return-from init-outline (values nil nil nil nil)))    ;failure
        ;
        ;(2) find first point CCW inside area
        ;
        (unless
            (do ((i 0 (+ i 1))
                 (n (mod (+ S 1) 8) (mod (+ n 1) 8))
                 (found nil))
                        ((or found (> i 7)) found)
            (let
                        ((xn (+ x-start (* step (aref *nb-off* n 0))))
                         (yn (+ y-start (* step (aref *nb-off* n 1))))
                         (ll) (err-n))
            ;get neighbors error
            (multiple-value-setq (m sx sy err-n) (find-opt-shift xn yn disp-list))
                (when ((= err-n threshold)                           ;point OUTSIDE are
a found
                    (when (check-feasible xn yn sx sy disp-list)     ;feasible
                        (setq
                            found t
                            S  n
                            xc xn
                            yc yn
                            err-c err-n))))))

(return-from init-outline (values nil nil nil nil)))    ;failure (values S xc yc err-c))
)
;;;--------
;;;
(defun continue-outline (S-prev x-start y-start threshold step disp-list)
        ;assumes that for at least one neighbor of (x-start,y-start) is > threshold
    ;searches neighbors for (= threshold to start outline in counter-clockwise
        ;order
        ;
        (let ((xc) (yc) (sx) (sy) (failure nil) (m))
        ;
        ;S-prev is the search direction which lead to (x-start,y-start)
```

```
;
(unless
   (do ((i 0 (+ i 1))
        (n (mod (+ S-prev 7) 8) (mod (+ n 1) 8))
        (found nil))
       ((or found (> i 6)) found)
    (let
        ((xn (+ x-start (* step (aref *nb-off* n 0))))
         (yn (+ y-start (* step (aref *nb-off* n 1))))
         (ll) (err-n))
      ;get neighbors error
      (multiple-value-setq (m sx sy ll err-n) (find-opt-shift xn yn disp-list))
      (when ((<= err-n threshold)                                ;point OUTSIDE are
a found
         (when (check-feasible xn yn sx sy disp-list)   ;feasible
             (setq
                found t
                S n
                xc xn
                yc yn
                err-c err-n)))))

(return-from continue-outline (values nil nil nil nil)))       ;failure (values S xc yc err-c))
)

;;;------------------------------------------------------------
;;;
(defun grow-foe-area (x-start y-start size step disp-list)
   ;from the starting point grow the FOE area in the direction of smalles error
   ;until the nuber of raster points in "size" is reached
   ;
   (let ((xc) (yc) (sx) (sy) (m) (feasible)
         (err-c) (err-n) (pending-foes '()) (foe-locations '()) (N 1))
      ;
      (multiple-value-setq (m sx sy err-c feasible)
                          (find-opt-shift x-start y-start disp-list))

(push (list err-c x-start y-start sx sy feasible) pending-foes)

;
      (do ((i 1 (+ i 1)))                            ;until the desired number of membe
rs
          ((or (> i size) (endp pending-foes)))
          (multiple-value-setq (err-c xc yc sx sy feasible)
                              (values-list (pop pending-foes)))

(add-to-map 'M xc yc sx sy err-c feasible)         ;mark as MEMBER in
 hash-table
          (push (list xc yc sx sy err-c) foe-locations)      ;add to foe-locati
ons
          ;(circle (+ ?*offset-hor* xc) (+ ?*offset-ver* yc)
          ;        step 1 7 'frame-window)

;
          ;get error-values of neigbors
          (do ((nb 0 (+ nb 1))) ((> nb 7))
             (let
                ((xn (+ xc (* step (aref *nb-off* nb 0))))
                 (yn (+ yc (* step (aref *nb-off* nb 1))))) (x) (y) (m))

;try to find (xn,yn) in hash-table
                (multiple-value-setq (m sx sy err-n feasible)
                                    (find-opt-shift xn yn disp-list))
                (unless (or (equal m 'M) (equal m 'R))
                                                   ;(xn,yn) has not been in t
he pending-foes
                   (add-to-map 'R xn yn sx sy err-n feasible)  ;mark as REMEMBER
ED
                   (setq N (+ N 1))
```

```lisp
                          (setq pending-foes                                        ;i
nsert-in-order into list
                                    (cl:merge 'list
                                              pending-foes
                                              (list (list err-n xn yn sx sy feasible))
                                              #'< :key 'car))))))
        (reverse foe-locations))     ;return list of foe-locations with center-point in first p
os.
)
(defun 1grow-foe-area-20 (x-start y-start size step disp-list)
        ;;from the starting point grow the FOE area in the direction of smallest error
        ;;the neighbors of the point with the lowest error on the xisting boundary are
        ;;added to the boundary
        ;
        (let ((xc) (yc) (sx) (sy) (m) (feasible)
              (N) (min-error) (max-error) (error-ratio)
              (error-limit)
              (err-c) (err-n) (pending-foes '()) (foe-locations '()) )
        ;
        (multiple-value-setq (m sx sy err-c feasible)
                             (find-opt-shift x-start y-start disp-list))
        (setq foe-locations (list (list x-start y-start sx sy err-c))
              pending-foes  (list (list err-c x-start y-start sx sy feasible))
              N 1
              min-error err-c
              max-error err-c
              error-limit  (* 4.0 err-c))                                           ;s
et error limit ;(circle (+ ?*offset-hor* x-start) (+ ?*offset-ver* y-start)
        ;        step 1 7 'frame-window)

;grow until either:
                ;(a) the maximum area is reached (> size)
                ;(b) no more points could be added because the surrounding locations are p
rohibited
                ;(c) a sufficient error level has been reached by the border points (do ()                                                          ;until the desired number
of members
               ((or (>= N size) (endp pending-foes)))
            (multiple-value-setq (err-c xc yc sx sy feasible)
                                 (values-list (pop pending-foes)))
;get one at the boundary ;
            ;get error-values of neigbors
            (do ((nb 0 (+ nb 1))) ((> nb 7))
                (let
                    ((xn (+ xc (* step (aref *nb-off* nb 0))))                      ;d
etermine where neighbor is
                     (yn (+ yc (* step (aref *nb-off* nb 1))))) (x) (y) (m))

(multiple-value-setq (m sx sy err-n feasible)
                                         (find-opt-shift xn yn disp-list))
                    (unless (or
                                (not feasible)           ;point is not feasible
                                (equal m 'M)             ;point is already in the set
                                (> err-n error-limit))
                        (push (list xn yn sx sy err-n) foe-locations)               ;add neigh
bor to foe-locations
                        ;(circle (+ ?*offset-hor* xn) (+ ?*offset-ver* yn)
                        ;        step 1 7 'frame-window)

;(write-line (format nil "~%adding ~D ~D" xn yn))
                        (add-to-map 'M xn yn sx sy err-n feasible)                  ;m
ark as MEMBER (setq min-error (min min-error err-n)
                              max-error (max max-error err-n)
                              N (+ N 1))
```

```
                              (setq pending-foes                                       ;i
nsert-in-order into list
                                     (cl:merge 'list
                                               pending-foes
                                               (list (list err-n xn yn sx sy feasible))
                                               #'( :key 'car))))))

(setq foe-locations (reverse foe-locations))
                        ;return list of foe-locations with center-point in first pos.
       (setq error-ratio (/ max-error min-error))
       (values foe-locations N error-ratio))

)
;;;
;;;------------------------------------------------------------------------
(defun 1mark-foe-0area (foe-locations step wdw)
   (let ((half-step (floor (* 0.5 step))))

(dolist (foe foe-locations)
         (multiple-value-bind (xn yn sx sy err-c) (values-list foe)
           (shade-rectangle 2 (floor (* step ?*scale-hor*)) (floor (* step ?*scale-ve
r*))
              (floor (* (+ ?*offset-hor* (- xn half-step)) ?*scale-hor*))
              (floor (* (+ ?*offset-ver* (- yn half-step)) ?*scale-ver*)) 7 wdw)))

(unless (null foe-locations)                          ;mark center FOE
         (multiple-value-bind (xc yc sx sy err-c) (values-list (car foe-locations))
           (zl::send wdw :draw-filled-in-circle
                   (floor (* (+ ?*offset-hor* xc) ?*scale-hor*))
                   (floor (* (+ ?*offset-ver* yc) ?*scale-ver*)) 3 2)
           (zl::send wdw :draw-circle
                   (floor (* (+ ?*offset-hor* xc) ?*scale-hor*))
                   (floor (* (+ ?*offset-ver* yc) ?*scale-ver*))  3 7))))
)

(defun 1mark-rotation 0(theta phi scale xc yc wdw-name)
   (let ((xcs (floor (* xc ?*scale-hor*))) (ycs (floor (* yc ?*scale-ver*))))
     (let ((xll (- xcs 50)) (yll (- ycs 50)) (xrr (+ xcs 50)) (yrr (+ ycs 50)))

(filled-rectangle xll yll xrr yrr 2 wdw-name)
     (rectangle xll yll xrr yrr 1 7 wdw-name)
     (text (format nil "VEHICLE ROTATION") (- xcs 65) (- yll 15) xrr (- yll 15) 7 'TR10B
nil wdw-name)

(line xll ycs xrr ycs 1 7 wdw-name)
     (do ((x xll (+ x 5))) ((> x xrr))                       ;draw x-scale
         (line x (- ycs 3) x (+ ycs 3) 1 7 wdw-name))
     (do ((x xll (+ x 25))) ((> x xrr))
         (line x (- ycs 6) x (+ ycs 6) 1 7 wdw-name))
     (text "+1.0" (- xll 23) (+ ycs 3) xrr (+ ycs 3) 7 'TR10 nil wdw-name)
     (text "-1.0" (+ xrr 3) (+ ycs 3) (+ xrr 100) (+ ycs 3) 7 'TR10 nil wdw-name)

(line xcs yll xcs yrr 1 7 wdw-name)
     (do ((y yll (+ y 5))) ((> y yrr))                       ;draw y-scale
         (line (- xcs 3) y (+ xcs 3) y 1 7 wdw-name))
     (do ((y yll (+ y 25))) ((> y yrr))
         (line (- xcs 6) y (+ xcs 6) y 1 7 wdw-name))
     (text "+1.0 deg" (- xcs 22) (- yll 4) xrr (- yll 4) 7 'TR10 nil wdw-name)
     (text "-1.0" (- xcs 8) (+ yrr 15) xrr (+ yrr 15) 7 'TR10 nil wdw-name)

(line xcs ycs (+ xcs (round (* theta scale))) ycs 5 7 wdw-name)
     (line xcs ycs xcs (+ ycs (round (* phi scale))) 5 7 wdw-name))
     )
)
;;;
(defun 1mark-foe-specs 0(area error-ratio xc yc wdw-name)
    ;(text (format nil "FOE-LOCATIONS: ~D" area)
             ;xc yc (+ xc 100) yc 6 'TR12B nil wdw-name)
    (text (format nil "FOE-RATIO = ~,1F" error-ratio)
             xc (+ yc 20) (+ xc 100) (+ yc 20) 6 'TR12B nil wdw-name)
```

```
;;;
(defun 1mark-advancement 0(advance xc yc wdw-name)
   (if (null advance)

(text (format nil "ADVANCED ----")
                           xc yc (+ xc 100) yc 6 'TR12B nil wdw-name)

(text (format nil "ADVANCED ",1F m" advance)
                           xc yc (+ xc 100) yc 6 'TR12B nil wdw-name))
)
;;;
(defun 1SET-MIN-MAX-DIST 0(disp-orig foe-locations step)
       ;add useful information to displacement data
       ;(locations and expansion with respect to the FOE-locations)
       (let* ((ext-list '()) (label) (x1) (y1) (x2) (y2) (d1) (d2) (N)
                   (dx1) (dy1) (dx2) (dy2)
                   (min-exp 3)
                   (min-con 3)
                   (margin (* step 0.5))
                   (xf1 (first  (car foe-locations)))
                   (yf1 (second (car foe-locations))))

(dolist (dv disp-orig)                                        ;got through list
of displacement vectors
               (let ((dmin most-positive-fixnum) (dmax most-negative-fixnum)
                     (above 'A) (below 'B) (left 'L) (right 'R) (expands 'E) (contrac
ts 'X)
                     (xf-min nil) (xf-max nil) (yf-min nil) (yf-max nil))

(multiple-value-setq (label x1 y1 x2 y2) (values-list dv))

(setq N 1)
           (dolist (foe foe-locations)                    ;go through all FOE-locati
ons
                   (multiple-value-bind (xf yf sx sy error) (values-list foe)

(setq dx1 (- x1 xf)                           ;dist foe -> X1
                             dy1 (- y1 yf)
                             dx2 (- x2 xf)                           ;dist foe -> X2
                             dy2 (- y2 yf))

(when (< x1 (+ xf margin)) (setq right 'X))   ;determine relativ
e
                       (when (> x1 (- xf margin)) (setq left  'X))   ;location to FOE-a
res
                       (when (< y1 (+ yf margin)) (setq below 'X))
                       (when (> y1 (- yf margin)) (setq above 'X))

(setq d1 (sqrt (+ (* dx1 dx1) (* dy1 dy1)))
                             d2 (sqrt (+ (* dx2 dx2) (* dy2 dy2))))

(when (and (<= N 1) (< d2 (- d1 min-con))) (setq contracts 'C)
                       (write-line (format nil "contracts ~D ~F ~F ~F ~F ~D ~D ~F ~F"
                       label x1 y1 x2 y2  d1 d2 )))
                                                            ;needs only to contract towards ON
E foe
           (setq N (+ N 1))
                       (cond
                           ((or (< (abs dx1) margin) (< (abs dy1) margin))  ;too close
 to FOE-region
                                      (setq dmin 0  dmax 9999
                                            expands 'X))
                         (t
                               (when (< d1 dmin )
;determine min/max dist of X1
                                      (setq dmin d1
                                            xf-min xf
;closest FOE to x1/y1
                                            yf-min yf))
                               (when (> d1 dmax )
;determine min/max dist of X1
                                      (setq dmax d1
```

```
;closest FOE to x1/y1
                                                    xf-max xf
                                                    yf-max yf))

(when (< d2 (+ d1 min-exp)) (setq expands 'X))))))
                                                            ;must expand from every foe
                 (push
                    (list label left right above below expands contracts
                                         x1 y1 x2 y2 xf-min yf-min xf-max yf-max)
                          ext-list)))
        ext-list)
)
;;;
(defun 1speed-above-ground0 (disp-list foe-locations min-length)
        ;1st element of disp-list is the guiding vector
        ;1st element of foe-locations is the most trustworthy FOE ;(1) align camera coordinate system with world coordinate system such that the FOE
        ;points in the direction of the world's Z-axis (multiple-value-bind (xf yf) (values-list (car foe-locations))
    (let* ((focal-length 549)   ;40 mm lens ?
                   (disp-for-speed (select-speed-vectors disp-list xf yf min-length)))
            (cond
               ((consp disp-for-speed)
;some disp-vectors suit
                    (multiple-value-bind (theta phi) (actual-rot xf yf 0 0)           ;a
lign foe with Z-axis
                        (let*
                             ((hsin (sin (* ?*deg-rad* theta)))
                              (hcos (cos (* ?*deg-rad* theta)))
                              (vsin (sin (* ?*deg-rad* phi)))
                              (vcos (cos (* ?*deg-rad* phi)))
                                 (Z1) (Z2) (dZ-sum 0.0) (W-sum 0.0))
                           (dolist (dv disp-for-speed)           ;loop to evaluate more tha
n one vector later
                              (multiple-value-bind (label x1 y1 x2 y2 length) (values-li
st dv)
                                (setq Z1 (/ (+ (* x1 hsin) (- (* y1 hcos vsin)) (* focal-l
ength hcos vcos))
                                             (+ (* y1 vcos) (* focal-length vsi
n))))
                                (setq Z2 (/ (+ (* x2 hsin) (- (* y2 hcos vsin)) (* focal-l
ength hcos vcos))
                                             (+ (* y2 vcos) (* focal-length vsi
n))))
))
                                (setq dz-sum (+ dz-sum (* length ?*above-ground* (- Z1 Z2)
                                      W-sum (+ W-sum length))))
                              (values (/ dz-sum W-sum) disp-for-speed))))        ;return estimated
distance traveled
               (t nil))))
;and disp-vectors used
)
;;;
(defun 1select-speed-vectors 0(disp-list xf yf min-length)
    (let ((speed-list '()))
       (setq min-length (* min-length min-length))
       (dolist (dv disp-list)
           (multiple-value-bind (label x1 y1 x2 y2) (values-list dv)
              (let ((length (+ (* (- x2 x1) (- x2 x1)) (* (- y2 y1) (- y2 y1)))))
                  (when (and (>= length min-length) (> y1 (+ yf 50)))
))
                      (push (list label x1 y1 x2 y2 (sqrt length)) speed-list)))
)
        (sort speed-list #'> :key #'car))          ;sort for longest vectors
)
;;;
```

```
(defun 1mark-speed-vectors0 (disp-reference wdw-name)
   (dolist (dv disp-reference)
         (multiple-value-bind (label x1 y1 x2 y2) (values-list dv)
            (filled-circle (round (* (+ x2 ?*offset-hor*) ?*scale-hor*))
                           (round (* (+ y2 ?*offset-ver*) ?*scale-ver*)) 3 7 wdw-name)))
)

;;;------------------------------------------------------------------
   ;#L(zl::load "FRODO:>burger>DRIVE>create>foefun.lisp" 'au nil)
(defun doit ()
   (let ((disp '((1 91 -36 135 -6) (2 135 -6 263 80)) )
         (foe '((29 -97 0 0 0))))
      (1speed-above-ground0 disp foe))
)

FRODO:>sklee>DRIVE>reason>getdata.art.7

;;; -*- Mode: ART; Base: 10; Package: ART-USER; syntax: common-lisp; Fonts: CPTFONT; -*-
;;;

;;;################################################################
;;;################################ R U L E S - READING DATA
;;;################################################################
;;;
(defrule read-displacement-data
   (step read-data)
   (cur-time ?ct ?)
   =>
   #L(let ((data (read-new-facts (make-disp-file-name ?ct))))

(cond ((null data) (assert (end-of-data ?ct)))   ;file was not found
            (t (eval data))))                          ;assert those facts
)
;;;
;;;################################################################
;;;################################ R U L E S - REMOVING DATA
;;;################################################################
;;;
(defrule forget-displacement-data
   (declare (salience 10))
   (step read-data)
   (cur-time ?ct ?past)
   (split
       (?to-delete <- (dv ?past $?))

(?to-delete <- (foe-est $? ?past))

(?to-delete <- (rot-est $? ?past))

(?to-delete <- (foe-locations ?past $?)))
   =>
   (retract ?to-delete)
)

FRODO:>sklee>DRIVE>reason>interpret.art.21

;;; -*- Mode: ART; Base: 10; Package: ART-USER -*-
;;;
;;;################################################################
;;;         RULES TO DISPLAY CURENT INTERPRETATIONS
;;;################################################################
;;;
(defglobal ?*interpretation-number* = 0
)
;;;
(defrule create-interpretation-windows
   (declare (salience *maximum-salience*))
```

```
    =>
    (for itp from 1 to ?*num-of-interpretations* do
    #L(let ((wdw-name (aref ?*wdw-names* itp))
            (x-off (* 40 (- itp 1)))
            (y-off (* -30 (- itp 1))))
       (create-window wdw-name 'graphics
           (+ ?*frame-origin-x* 15)
           (- ?*frame-origin-y* 100)
           (+ ?*frame-origin-x* ?*x-size* 15)
           (+ ?*frame-origin-y* ?*y-size* -100)
           (format nil "Interpretation ~D" itp) nil)       ;not exposed
       (clear-art-window wdw-name)
       (setf (aref ?*wdw-streams* itp) (window-stream wdw-name)))))
)

;;;
(defrule reset-interpretation-counter
    (declare (salience *maximum-salience*))
    (cur-time ? ?)
    (step interpret)
    =>
    #L(setq ?*interpretation-number* 0)
)
;;;----------------------------------------------------------------
;;;
(defrule arrest-one-interpretation
    (declare (salience -2))
    (step interpret)
    (cur-time ?ct ?)
    (test (< ?*interpretation-number* ?*num-of-interpretations*))
    ?weg <- (rank ?node ?rk)
    (not (rank ?other-node ?rko&:(?rko < ?rk)))
    =>
    #L(progn
       (setq ?*interpretation-number* (+ ?*interpretation-number* 1))
       (let ((wdw (aref ?*wdw-names* ?*interpretation-number*)))
          (expose-window wdw)
          (clear-art-window wdw)
          (label-window wdw
               (format nil "FRAME ~D: Interpretation ~D" ?ct ?*interpretation-number*))))
    (at ?root (assert (showing ?node ?*interpretation-number*)))
    (retract ?weg)
)
;;;
(defrule free-one-interpretation
    (declare (salience -1))
    ?end <- (showing ?node ?)
    =>
    (retract ?end)
)
;;;----------------------------------------------------------------
;;;
(defrule extract-the-stationary
    (declare (salience 10))
    (showing ?node ?)
    (cur-time ?ct ?)
    (member ?a ?)
    (viewpoint @?node (exists (stat ?a)))
    =>
    (at ?root (assert (display-stat ?a 6)))
)
;;;
(defrule extract-the-mobile
    (declare (salience 10))
    (showing ?node ?)
    (cur-time ?ct ?)
    (member ?a ?)
    (viewpoint @?node (exists (mob ?a)))
    (case
        ((viewpoint @?node (moves ?dir ?a ?ct))
         =>
```

```
        (at ?root (assert (display-mob ?a ?dir))))
      (otherwise
       =>
       (at ?root (assert (display-mob ?a X)))))
)
;;;
;;;------------------------------------------------------------
;;;
(defrule get-the-closer         ;determine the size of the circle for stationary object
    (declare (salience 5))
    (showing ?node ?)
    (viewpoint ?node (closer ?a ?b))
    =>
    (at ?root (assert (display-closer ?a ?b)))
)
;;;
(defrule set-size-of-stat       ;determine the size of the circle for stationary object
    (declare (salience 4))
    (display-closer ?a ?b)
    ?clo <- (display-stat ?a ?ra)
    (display-stat ?b ?a ?rb)
    (test (and (<= ?ra ?rb) (<= ?ra 40)))

=>
    (retract ?clo)
    (at ?root (assert (display-stat ?a =(min 60 (+ ?ra 10)))))
)
;;;
(defrule display-closer
    (declare (salience 3))
    (step interpret)
    (cur-time ?ct ?)
    (showing ?node ?itp)
    ?done <- (display-closer ?a ?b)
    (dv ?ct ?a ? ? ? ? ? ? ?xa1 ?ya1 ?xa2 ?ya2 $?)
    (dv ?ct ?b ? ? ? ? ? ? ?xb1 ?yb1 ?xb2 ?yb2 $?)
    =>
    (retract ?done)
    (bind ?wdw (aref ?*wdw-names* ?itp))
    (bind ?xa (floor (* (+ ?*offset-hor* ?xa2) ?*scale-hor* )))
    (bind ?ya (floor (* (+ ?*offset-ver* ?ya2) ?*scale-ver* )))
    (bind ?xb (floor (* (+ ?*offset-hor* ?xb2) ?*scale-hor* )))
    (bind ?yb (floor (* (+ ?*offset-ver* ?yb2) ?*scale-ver* )))
    (line ?xa ?ya ?xb ?yb 1 7 ?wdw)
)
;;;
;;;------------------------------------------------------------
;;;
(defrule display-stationary
    (declare (salience 2))
    (step interpret)
    (cur-time ?ct ?)
    (showing ?node ?itp)
    ?done <- (display-stat ?a ?rad)
    (dv ?ct ?a ? ? ? ? ? ? ?x1 ?y1 ?x2 ?y2 $?)
    =>
    (retract ?done)
    (bind ?wdw (aref ?*wdw-names* ?itp))
    (bind ?wdw-stream (aref ?*wdw-streams* ?itp))
    (bind ?x (floor (* (+ ?*offset-hor* ?x2) ?*scale-hor* )))
    (bind ?y (floor (* (+ ?*offset-ver* ?y2) ?*scale-ver* )))
#L(multiple-value-bind (label lx ly)
      (center-text (- ?x 20) (- ?y 12) (+ ?x 20) (+ ?y 10)
                   (format nil "~A" ?a) 'cptfontb)
;     (filled-circle ?x ?y 15 2 ?wdw)
    (cond ((< ?a 10) (zl::send ?wdw-stream ':draw-rectangle 10 12 (- ?x 5) (- ?y 6) tv:alu-andca))
          ((< ?a 100) (zl::send ?wdw-stream ':draw-rectangle 20 12 (- ?x 10) (- ?y 6) tv:alu-andca))
          ((< ?a 1000) (zl::send ?wdw-stream ':draw-rectangle 30 12 (- ?x 15) (- ?y 6) tv:alu-andca))
          ((< ?a 10000) (zl::send ?wdw-stream ':draw-rectangle 40 12 (- ?x 20) (- ?y 6) t
```

```
v:alu-andca))
         ( T ()))
    (text label lx ly (+ lx 30) ly 7 'cptfontb nil ?wdw)
    (when (> ?rad 10) (circle ?x ?y ?rad 1 7 ?wdw)))
)
;;;;;;--------------------------------------------------------------------
;;;
(defrule display-mobile
    (declare (salience 1))
    (step interpret)
    (cur-time ?ct ?)
    (showing ?node ?itp)
    ?done <- (display-mob ?a ?dir)
    (dv ?ct ?a ? ? ? ? ? ? ?x1 ?y1 ?x2 ?y2 $?)
    =>
    (retract ?done)
    (bind ?wdw (aref ?*wdw-names* ?itp))
    (bind ?wdw-stream (aref ?*wdw-streams* ?itp))
    (bind ?x (floor (* (+ ?*offset-hor* ?x2) ?*scale-hor*)))
    (bind ?y (floor (* (+ ?*offset-ver* ?y2) ?*scale-ver*)))
    #L(multiple-value-bind (label lx ly)
        (center-text (- ?x 20) (- ?y 12) (+ ?x 20) (+ ?y 10)
                     (format nil "~A" ?a) 'cptfontb)
;       (filled-circle ?x ?y 15 2 ?wdw)
        (cond ((< ?a 10) (zl::send ?wdw-stream ':draw-rectangle 10 12 (- ?x 5) (- ?y 6) tv:al
u-andca))
              ((< ?a 100) (zl::send ?wdw-stream ':draw-rectangle 20 12 (- ?x 10) (- ?y 6) tv:
alu-andca))
              ((< ?a 1000) (zl::send ?wdw-stream ':draw-rectangle 30 12 (- ?x 15) (- ?y 6) tv
:alu-andca))
              ((< ?a 10000) (zl::send ?wdw-stream ':draw-rectangle 40 12 (- ?x 20) (- ?y 6) t
v:alu-andca))
              ( T ()))
    (text label lx ly (+ lx 30) ly 7 'cptfontb nil ?wdw)
    (draw-motion-pointer ?dir ?x ?y ?a ?wdw))
    ;(rectangle (- ?x 8) (- ?y 8)(+ ?x 6) (+ ?y 8) 2 7 ?wdw))
)
;;;-----------------------------------------------------------------------

FRODO:>sklee>DRIVE>reason>verify.art.6

;;; -*- Mode: ART; Base: 10; Package: ART-USER -*-
;;;
;;;##############################################################################
;;;         RULES TO VERIFY THE STRUCTURE OF EXISTING INTERPRETATIONS
;;;##############################################################################
;;;
;;;-----------------------------------------------------------------------
;;;
(defrule detect-closer-conflict
    (declare (salience 100))
    (cur-time ?ct ?)
    (viewpoint ?v1
        (closer ?a ?b)
        (closer ?b ?a))
    =>
    (at ?root (assert (movement-between ?a ?b ?ct)))
)
;;;
(defrule resolve-closer-conflict.
    (declare (salience 101))
    ?trigger <- (movement-between ?a ?b ?ct)
    (split
        ((stat ?a)
        =>
        (assert (mob ?b)) (assert (moves X ?b ?ct)))
        ((stat ?b)
        =>
        (assert (mob ?a)) (assert (moves X ?a ?ct))))
)
```

```
;;;
;;;---------------------------------------------------------------------
(defrule lower-is-closer-heuristics
    "looks at existing closer-relationships in the model and checks them
     against the heuristic assumption, that features which are lower in the
     image are generally closer to the camera"
    (declare (salience 0))
    (block)
    (step verify)
    (cur-time ?ct ?)
    (viewpoint ?v (closer ?a ?b))                       ;found in the model
    (viewpoint @?root (below-foe ?a ?ct)
                      (below-foe ?b ?ct)
                      (below ?b ?a ?ct))
    =>
    (at ?root (assert (low-close-conflict ?a ?b ?ct)))
)
;;;
(defrule resolve-low-close-conflict
    (declare (salience *maximum-salience*))
    ?done <- (low-close-conflict ?a ?b ?ct)
    (viewpoint ?v2 (stat ?a))           ;find the most general vp with (stat ?a)
    (viewpoint ?v3 (stat ?b))           ;find the most general vp with (stat ?b)
    =>
    (at ?v2 (assert (mob ?b))
            (assert (moves U ?b ?ct)))
    (at ?v3 (assert (mob ?a))
            (assert (moves D ?a ?ct)))
    (retract ?done)
)
;;;
;;;---------------------------------------------------------------------
(defrule find-approaching-guy
    (declare (salience 0))
    (step verify)
    (cur-time ?ct ?)
    (viewpoint ?v (moves D ?a ?ct))     ;moving downwards -> could be approaching
    (below-foe ?a ?ct)
    =>
    (at ?v (assert (moves A ?a ?ct)))
)
;;;
;;;---------------------------------------------------------------------
(defrule check-a-receding-point
    (declare (salience ?*reasoning-salience*))
    (block)
    (step verify)
    (viewpoint ?v1 (receding ?a))
    (cur-time ?ct ?)
    (expanding down ?a ?ct)   ;*****************
    (split
     ((test (upper-viewpoints ?v1))             ;not at the root
      =>
      (at ?v1 (poison "you should move upwards")))
     ((test (not (upper-viewpoints ?v1)))       ;at the ROOT
      =>
      (at ?v1 (assert (I found you))))))
)
;;;---------------------------------------------------------------------

FRODO:>sklee>DRIVE>reason>reason.art.8

;;; -*- Mode: ART; Base: 10; Package: ART-USER;  -*-
;;;
;;;    ANALYZE
;;;
;;;---------------------------------------------------------------------
(def-viewpoint-levels (I)          ;Interpretation
)
;;;---------------------------------------------------------------------
```

```
;;;################################################################
;;;
   ;load GLOBALS
   (art-load ">sklee>DRIVE>globals.art")
;;;
;;;################################################################
;;;
   ;load RELATIONS
   (art-load ">sklee>DRIVE>relations.art")
;;;
;;;################################################################
;;;
   ;load UTILITY FUNCTIONS
#L(cl::load ">sklee>DRIVE>util-fun.bin")
;;;
;;;################################################################
;;;
   ;load ZETALISP WINDOW FUNCTIONS
#L(zl::load ">sklee>DRIVE>z-windows.bin")
;;;
;;;################################################################
;;;
   (art-load ">sklee>DRIVE>reason>getdata.art")
;;;
   (art-load ">sklee>DRIVE>reason>observe.art")
;;;
   (art-load ">sklee>DRIVE>reason>assert.art")
;;;
   ;(art-load ">sklee>DRIVE>reason>verify.art")
;;;;
   (art-load ">sklee>DRIVE>reason>evaluate.art")
;;;
   (art-load ">sklee>DRIVE>reason>interpret.art")

;;;################################################################
;;;
(deffacts lets-go
   (cur-time 183 182))
;;;################################################################
(defrule scheduler                            ;
   (declare (salience (+ *minimum-salience* 1)))
   ?time <- (cur-time ?ct ?)
   (split
     (
      =>
     ;---------------------------------------------------------------
      (assert (step read-data)))              ;*** get next image
    ( ?off <- (step read-data)
      (not (end-of-data ?))
      =>
      (retract ?off)
     ;---------------------------------------------------------------
      (assert (step display-data)))           ;*** big slow
    ( ?off <- (step display-data)
      =>
      (retract ?off)
     ;---------------------------------------------------------------
      (assert (step observe)))                ;*** abstract image observations
    ( ?off <- (step observe)
      =>
      (retract ?off)
     ;---------------------------------------------------------------
      (assert (step assert)))                 ;*** enable assertion rules
    ( ?off <- (step assert)
      =>
      (retract ?off)
     ;---------------------------------------------------------------
      (assert (step verify)))                 ;*** enable verification rules
    ( ?off <- (step verify)
      =>
      (retract ?off)
     ;---------------------------------------------------------------
```

```
            (assert (step evaluate)))          ;*** evaluate results
     ( ?off <- (step evaluate)
       =>
       (retract ?off)
     ;----------------------------------------------------------------
            (assert (step interpret)))         ;*** show interpretations
     ( ?off <- (step interpret)
       =>
       (retract ?off)
     ;----------------------------------------------------------------
            (assert (step forget)))            ;*** forget
     ( ?off <- (step forget)
       =>
       (retract ?off)
     ;----------------------------------------------------------------
       (retract ?time)
       (assert (cur-time =(+ ?ct 1) ?ct))))
)

FRODO:>sklee>DRIVE>reason>observe.art.14

;;; -*- Mode: ART; Base: 10; Package: ART-USER ; -*-
;;;################################################################
;;;################################ R U L E S - IMAGE-BASED CONCLUSIONS ##########
;;;################################################################
;;;
;;;
;;;################################################################
(defrule observe-scheduler
   (declare (salience -1))
   (step observe)
   (split
     (
       =>
       (assert (step check-new-lost)))
     ( ?off <- (step check-new-lost)
       =>
       (retract ?off)

(assert (step observe-across1)))
     ( ?off <- (step observe-across1)
       =>
       (retract ?off)

(assert (step observe-towards)))
     ( ?off <- (step observe-towards)
       =>
       (retract ?off)

(assert (step observe-passes)))
     ( ?off <- (step observe-passes)
       =>
       (retract ?off)))
)
;;;
;;;BACKWARD-CHAINING-RULES
;;;
;;;----------------------------------------------------------------
(defrule get-center-FOE
   (declare (salience *maximum-salience*))
   (step observe)
   (cur-time ?ct ?)
   (foe-locations ?ct ?foe-list)
   =>
   #L(multiple-value-bind (xf yf) (values-list (list$ (car (list$ ?foe-list))))
        (assert (center-foe ?ct =(+ xf) =(+ yf))))
)
;;;
(defglobal ?*lrab-thrsh* = 20
)
```

```
;;;
(defrule determine-left
    (goal (left-of ?a ?b ?ti))
    (dv ?ti ?a ? ? ? ? ? ?xa1 ?ya1 ?xa2 ?ya2 $?)
    (dv ?ti ?b ? ? ? ? ? ?xb1 ?yb1 ?xb2 ?yb2 $?)
    (test (< (+ ?xa1 ?*lrab-thrsh*) ?xb1))
    =>
    (assert (left-of ?a ?b ?ti))
)
(defrule determine-right
    (goal (right-of ?a ?b ?ti))
    ;(not (left-of ?a ?b ?ti))
    (dv ?ti ?a ? ? ? ? ? ?xa1 ?ya1 ?xa2 ?ya2 $?)
    (dv ?ti ?b ? ? ? ? ? ?xb1 ?yb1 ?xb2 ?yb2 $?)
    (test (< (+ ?xb1 ?*lrab-thrsh*) ?xa1))
    =>
    (assert (right-of ?a ?b ?ti))
)
(defrule determine-above
    (goal (above ?a ?b ?ti))
    ;(not (below ?a ?b ?ti))
    (dv ?ti ?a ? ? ? ? ? ?xa1 ?ya1 ?xa2 ?ya2 $?)
    (dv ?ti ?b ? ? ? ? ? ?xb1 ?yb1 ?xb2 ?yb2 $?)
    (test (< (+ ?ya1 ?*lrab-thrsh*) ?yb1))
    =>
    (assert (above ?a ?b ?ti))
)
(defrule determine-below
    (goal (below ?a ?b ?ti))
    ;(not (above ?a ?b ?ti))
    (dv ?ti ?a ? ? ? ? ? ?xa1 ?ya1 ?xa2 ?ya2 $?)
    (dv ?ti ?b ? ? ? ? ? ?xb1 ?yb1 ?xb2 ?yb2 $?)
    (test (< (+ ?yb1 ?*lrab-thrsh*) ?ya1))
    =>
    (assert (below ?a ?b ?ti))
)
;;;
;;;
;;;----------------------------------------------------------------
(defrule dermine-left-of-foe
    (goal (left-foe ?a ?ti))
    ;(not (right-foe ?a ?ti))
    (dv ?ti ?a L $?)
    =>
    (assert (left-foe ?a ?ti))
)
;;;----------------------------------------------------------------
(defrule dermine-right-of-foe
    (goal (right-foe ?a ?ti))
    ;(not (left-foe ?a ?ti))
    (dv ?ti ?a ? R $?)
    =>
    (assert (right-foe ?a ?ti))
)
;;;----------------------------------------------------------------
(defrule dermine-above-foe
    (goal (above-foe ?a ?ti))
    ;(not (below-foe ?a ?ti))
    (dv ?ti ?a ? ? A $?)
    =>
    (assert (above-foe ?a ?ti))
)
;;;----------------------------------------------------------------
(defrule dermine-below-foe
    (goal (below-foe ?a ?ti))
    ;(not (above-foe ?a ?ti))
    (dv ?ti ?a ? ? ? B $?)
    =>
    (assert (below-foe ?a ?ti))
)
;;;----------------------------------------------------------------
(defrule determine-opposite-foe
```

```
    (goal (opposite-foe ?a ?b ? ?ti))
    (split
        ((left-foe ?a ?ti)
         (right-foe ?b ?ti)
         =>
         (assert (opposite-foe ?a ?b H ?ti) (opposite-foe ?b ?a H ?ti)))

((right-foe ?a ?ti)
         (left-foe ?b ?ti)
         =>
         (assert (opposite-foe ?a ?b H ?ti) (opposite-foe ?b ?a H ?ti)))

((above-foe ?a ?ti)
         (below-foe ?b ?ti)
         =>
         (assert (opposite-foe ?a ?b V ?ti) (opposite-foe ?b ?a V ?ti)))

((below-foe ?a ?ti)
         (above-foe ?b ?ti)
         =>
         (assert (opposite-foe ?a ?b V ?ti) (opposite-foe ?b ?a V ?ti))))
)
;;;---------------------------------------------------------------------

;;;###################################################################
;;;############################ TRIGGER EVENTS ######################
;;;###################################################################
;;;
(defglobal ?*motion-across-th* = 4
)

(defrule motion-accross-foe
    "checks if two point are getting closer accross the FOE in horizontal
    direction"
    (step observe-across1)
    (cur-time ?ct ?past)                    ;get current time
    (split
        ((dv ?ct ?a ?   ~R ? ? ? ? ?xa1 ?ya1 ?xa2 ?ya2 $?)
         (dv ?ct ?b&~?a ~L ? ? ? ? ?xb1 ?yb1 ?xb2 ?yb2 $?)
         (case
            ((test (> ?xa1 ?xb1))            ;a is right of b
             (test (> (- ?xa1 ?xb1 ?*motion-across-th*) (- ?xa2 ?xb2)))
             =>
             (assert (move-across-foe ?b ?a H ?ct)))

(otherwise                       ;a is left of b
             (test (> (- ?xa2 ?xb2 ?*motion-across-th*) (- ?xa1 ?xb1)))
             =>
             (assert (move-across-foe ?a ?b H ?ct)))))

((dv ?ct ?a     ? ? ? ~B ? ? ?xa1 ?ya1 ?xa2 ?ya2 $?)
         (dv ?ct ?b&~?a ? ? ~A ? ? ? ?xb1 ?yb1 ?xb2 ?yb2 $?)
         (case
            ((test (> ?ya1 ?yb1))            ;a is below b
             (test (> (- ?ya1 ?yb1 ?*motion-across-th*) (- ?ya2 ?yb2)))
             =>
             (assert (move-across-foe ?b ?a V ?ct)))

(otherwise                       ;a is above b
             (test (> (- ?ya2 ?yb2 ?*motion-across-th*) (- ?ya1 ?yb1)))
             =>
             (assert (move-across-foe ?a ?b V ?ct)))))))
)
;;;
(defrule forget-across
    (step forget)
    ?weg <- (move-across-foe $?)
    =>
    (retract ?weg)
)

;;;---------------------------------------------------------------------
```

```
(defrule motion-towards-foe
   "checks if any single point is moving towards the FOE"
   (step observe-towards)
   (cur-time ?ct ?past)
   (dv ?ct ?a ? ? ? ? ? C $?)    ;C for "contracts"
 =>
   (assert (moving-tow-foe ?a X ?ct))
)
;;;
(defrule forget-towards
   (step forget)
   ?weg <- (moving-tow-foe $?)
 =>
   (retract ?weg)
)

;;;-----------------------------------------------------------------
(defglobal ?*pass-th* = 6
)
;;;
(defrule determine-passes
   (step observe-passes)
   (cur-time ?ct ?past)                           ;get current time
   (split
      ((dv ?ct ?a L ? ? ? ? ?xa1 ?ya1 ?xa2 ?ya2 $?)         ;both left
       (dv ?ct ?b L ? ? ? ? ?xb1 ?yb1 ?xb2 ?yb2 $?)
       (test (> ?xa1 ?xb1))                                 ;a inside b (at time 1)
       (test (> (- (- ?xa1 ?xb1) (- ?xa2 ?xb2)) ?*pass-th*)) ;getting closer or passed
     =>
       (assert (passing ?a ?b L ?ct)))
      ((dv ?ct ?a ? R ? ? ? ?xa1 ?ya1 ?xa2 ?ya2 $?)         ;both right
       (dv ?ct ?b ? R ? ? ? ?xb1 ?yb1 ?xb2 ?yb2 $?)
       (test (> ?xb1 ?xa1))                                 ;a inside b (at time 1)
       (test (> (- (- ?xb1 ?xa1) (- ?xb2 ?xa2)) ?*pass-th*)) ;getting closer or passed
     =>
       (assert (passing ?a ?b R ?ct)))

((dv ?ct ?a L ? ? ? ? ?xa1 ?ya1 ?xa2 ?ya2 $?)         ;both above
       (dv ?ct ?b L ? ? ? ? ?xb1 ?yb1 ?xb2 ?yb2 $?)
       (test (> ?ya1 ?yb1))                                 ;a inside b (at time 1)
       (test (> (- (- ?ya1 ?yb1) (- ?ya2 ?yb2)) ?*pass-th*)) ;getting closer or passed
     =>
       (assert (passing ?a ?b U ?ct)))

((dv ?ct ?a ? R ? ? ? ?xa1 ?ya1 ?xa2 ?ya2 $?)         ;both below
       (dv ?ct ?b ? R ? ? ? ?xb1 ?yb1 ?xb2 ?yb2 $?)
       (test (> ?yb1 ?ya1))                                 ;a inside b (at time 1)
       (test (> (- (- ?yb1 ?ya1) (- ?yb2 ?ya2)) ?*pass-th*)) ;getting closer or passed
     =>
       (assert (passing ?a ?b D ?ct))))
)
;;;
(defrule forget-passes
   (step forget)
   ?weg <- (passing $?)
 =>
   (retract ?weg)
)
;;;-----------------------------------------------------------------
(defrule signal-new-feature
   (step check-new-lost)
   (cur-time ?ct ?)
   (dv ?ct ?a $?)
   (not (member ?a ?))
 =>
   (assert (new-feature ?a ?ct))
)
;;;
(defrule signal-lost-feature
   (step check-new-lost)
   (cur-time ?ct ?)
   (member ?a ?)
```

```
     (not (dv ?ct ?a $?))
   =>
   (assert (lost-feature ?a ?ct))
)
;;;----------------------------------------------------------------
(defglobal ?*min-exp-ratio* = 0.3
)
;;;
(defrule determine-expansion
    (step observe-across1)
    (cur-time ?ct ?)
    (center-foe ?ct ?xf ?yf)
    (dv ?ct ?a     ? ? ? ? E  ? ?xa1 ?ya1 ?xa2 ?ya2 $?)
    (dv ?ct ?b&~?a ? ? ? ? ? ~C ?xb1 ?yb1 ?xb2 ?yb2 $?)
    (test (diverging-faster ?xa1 ?ya1 ?xa2 ?ya2 ?xb1 ?yb1 ?xb2 ?yb2 ?xf ?yf ?*min-exp-ratio
*))
    =>
    ;#L(multiple-value-bind (pred r1 r2)
    ;    (diverging-faster ?xa1 ?ya1 ?xa2 ?ya2 ?xb1 ?yb1 ?xb2 ?yb2 ?xf ?yf ?*min-exp-ratio*)
    ;    (printout t t pred r1 r2))
    (assert (div-faster ?a ?b ?ct))
)

FRODO:>sklee>DRIVE>globals.art.42

;;; -*- Mode: ART; Base: 10; Package: ART-USER; syntax: common-lisp; -*-
;;;
;;;
;;;----------------------------------------------------------------
(defconstant *edge-directory* "FRODO:>ob_detec>pr1")
(defconstant *snap-directory* "FRODO:>ob_detec>pr1")
(defconstant *disp-directory* "FRODO:>ob_detec>pr1")
;;;
(defglobal
    ?*points-list*  = '()
    ?*points-list-2* = '()
    ?*disp-orig* = '()           ;original (observed) displacement vectors
    ?*disp-derot* = '()          ;derotated displacement vectors
    ?*disp-ext* = '()
    ?*disp-perfect* = '()
    ?*disp-stat* = '()
    ?*disp-mob* = '()
    ?*disp-reference* = '()      ;displacement vectors used for measuring speed overe groun
d
    ?*foe-locations* = '()
)
;;;
(defglobal
    ;single frame window
    ?*frame-window* = nil
    ?*frame-window-1* = nil
    ?*frame-window-2* = nil
    ?*frame-wdw-stream* = nil
    ?*frame-wdw-stream-1* = nil
    ?*frame-wdw-stream-2* = nil
    ?*frame-array* = nil
    ?*frame-array1* = nil
    ?*frame-origin-x* = 10
    ?*frame-origin-y* = 100

?*hor-max* = 512
    ?*ver-max* = 442 ;448

?*hor-size* = (+ ?*hor-max* 0)    ;512
    ?*ver-size* = (+ ?*ver-max* 42)   ;490

)
;;;
(defglobal
    ?*show-foe-search* = nil
```

```
)
;;;
(defglobal
    ;multiple frame windows
    ?*num-of-interpretations* = 9
    ?*wdw-names*  = #L(make-array '(15) :initial-contents
                            '( frame-0 frame-1 frame-2 frame-3 frame-4
                               frame-5 frame-6 frame-7 frame-8 frame-9
                               frame-10 frame-11 frame-12 frame-13 frame-14))
    ?*wdw-streams* = #L(make-array '(15))
    ?*wdw* = nil
    ?*x-size* = 768        ;for 1.5x scale images
    ?*y-size* = 663
    ?*x-disp-size* = (+ ?*x-size* 0) ; 768
    ?*y-disp-size* = (+ ?*y-size* 42) ; 714
    ?*scale-hor* = (/ ?*x-size* 512.0)
    ?*scale-ver* = (/ ?*y-size* 442.0)
    ?*max-frame-number* = 50
    ?*end-of-simulation* = ?*max-frame-number*
)
;;;
(defglobal
    ;vehicle data
    ?*above-ground* = 3.94        ;meters
    ?*focal-length* = 505.3       ;in pixels
    ?*finv* = #L(/ 1.0 ?*focal-length*)
    ?*offset-hor* = 247           ;center of the image plane
    ?*offset-ver* = 201
    ?*hor-rot* = 0.0              ;pan
    ?*ver-rot* = 0.511            ;tilt
)
;;;
(defglobal
    ;constants for perspective transformation
    ?*deg-rad* = 0.01745329252
    ?*rad-ded* = 57.2957795
    ?*sin-hor* = (sin (* (/ pi 180.0) ?*hor-rot*))    ;horizontal sine
    ?*cos-hor* = (cos (* (/ pi 180.0) ?*hor-rot*))    ;horizontal cosine
    ?*sin-ver* = (sin (* (/ pi 180.0) ?*ver-rot*))    ;vertical sine
    ?*cos-ver* = (cos (* (/ pi 180.0) ?*ver-rot*))    ;vertical cosine
)
;;;
(defglobal
    ;retention time
    ?*retention-time* = 2

;graphic details
    ?*mark-radius* = 5
)
;;;
(defglobal
    ?*stat-count* = 0
)
;;;

FRODO:>sklee>DRIVE>relations.art.1

;;; -*- Mode: ART; Base: 10; Package: ART-USER; syntax: common-lisp; -*-
;;;
;;;
;;;###############################################################
;;;############################ RELATIONS ########################
;;;###############################################################
;;;
;;;TIME
    (defrelation cur-time (?current-time ?previous-time))
;;;
;;;VEHICLE
    (defrelation vehicle-pos (?xw ?yw ?zw ?xor ?yor ?time))
    (defrelation vehicle-mot (?tr-x ?tr-y ?tr-z ?rot-x ?rot-y ?start ?end))
```

```
;;;
;;;MOVING OBJECTS
  (defrelation obj-mot (?oid ?tr-x ?tr-y ?tr-z ?rot-x ?rot-y ?start ?end))
  (defrelation links (?object ?sequence-of-point-pairs))
  (defrelation mov-obj (?oid ?generic-object ?xi ?yi ?zi ?xor ?yor ?time))
;;;
;;;STATIONARY OBJECTS
  (defrelation stat-obj (?oid ?generic-object ?xi ?yi ?zi))
;;;
;;;2-D CORRESPONDENCE FACTS
  (defrelation occluded (?point-id ?at-time))

(defrelation foe-est (?xf ?yf ?dummy1 ?dummy2 ?time))
;
  (defrelation rot-est (?theta ?phi ?dummy1 ?dummy2 ?time))
;
  (defrelation foe-locations (?time ?list-of-locations))
        ;?list-of-locations = ( xf yf shift-x shift-y normalized error )

(defrelation dv         ;displacement vector
        (?time ?label ?left ?right ?above ?below ?expands ?contracts
        ?x1 ?y1 ?x2 ?y2 ?xf-min ?yf-min ?xf-max ?yf-max))

(defrelation gone (?object ?point))   ;points permanently off view
;;;

;;;IMAGE-BASED OBSERVATIONS
    ;static - single points
  (defrelation left-foe  (?point-at-left  ?time))
  (defrelation right-foe (?point-at-right ?time))
  (defrelation above-foe (?point-at-above ?time))
  (defrelation below-foe (?point-at-below ?time))

;static - pairs of points
  (defrelation left-of   (?point-a ?point-b ?time))
  (defrelation right-of  (?point-a ?point-b ?time))
  (defrelation above     (?point-a ?point-b ?time))
  (defrelation below     (?point-a ?point-b ?time))

(defrelation distx (?point-a ?point-b ?dy ?time))
  (defrelation disty (?point-a ?point-b ?dy ?time))

(defrelation opposite-foe (?a ?b ?direction ?time))
  (defrelation inside    (?a ?b ?time))

;dynamic - single points
  (defrelation new-feature (?feature ?time-first-observed))
  (defrelation lost-feature (?feature ?time-lost))
  (defrelation moving-tow-foe (?point ?left-right-up-down ?time))

;dynamic - pairs of points
  (defrelation move-across-foe (?point-a ?point-b ?left-right-up-down ?time))
  (defrelation converging (?point-a ?point-b ?left-right-up-down ?time))
  (defrelation div-faster (?point-a ?point-b ?time))
  (defrelation passing (?inner-point ?outer-point ?left-right-up-down ?time))
;;;
;;;MISCELLANEOUS
  (defrelation step (?step-name))
  (defrelation end-of-data (?time))

;;;QUALITATIVE SCENE MODEL
  (defrelation member  (?entity ?time-of-entry))
  (defrelation stat    (?entity))
  (defrelation mob     (?entity))
;
  (defrelation moves   (?LRUD ?entity ?time))
;
  (defrelation closer  (?a ?b)) ;transitive
;(defrelation closerp (?a ?b) (closure-of closer transitive))
;
  (defrelation complete (?time ?interpretation-label))
;
```

```
;;;
;;;
```

FRODO:>sklee>DRIVE>util-fun.lisp.18

```
;;; -*- Mode: ART; Base: 10; Package: ART-USER; syntax: common-lisp; Fonts: CPTFONT,CPTFON
TB; tab-width: 4; -*-
;;;
;;;
;;;##################################################################################
;;;
;;;MANIPULATING WINDOWS
;;;
(defun lclear-art-window0 (wdw)
    (clear-window wdw)
    (line 0 0 (- ?*x-size* 3) 0 1 7 wdw)
    (line 0 (- ?*y-size* 3) (- ?*x-size* 3) (- ?*y-size* 3) 1 7 wdw)
    (line 0 0 0 (- ?*y-size* 3) 1 7 wdw)
    (line (- ?*x-size* 3) 0 (- ?*x-size* 3) (- ?*y-size* 3) 1 7 wdw)
)
;;;
;;;##################################################################################
;;;
;;;READ AND WRITE FACT-DATA
;;;
(defun lwrite-assertion 0(facts-list filena)
    (let ((fn (format nil "~A" filena)))
    (with-open-file (outfile fn :direction :output
                                                                    :if-exists :new-version)
        (write facts-list :stream outfile)))
)
;;;
(defun lread-new-facts 0(filena)
    (let ((fn (probe-file (format nil "~A" filena))))
    (cond
        ((null fn) nil)
        (t
            (with-open-file
                (infile (pathname fn) :direction :input)
                (read infile)))))
)
;;;
;;;##################################################################################
;;;
;;;PERSPECTIVE TRANSFORMATION
;;;
(defun lpersp-xy 0(xi yi zi xc yc zc theta phi)
    ;compute the perspective transformation for xi yi zi with the current vehicle
    ; coordinates xc yc zc and orientation theta and phi
    (let*
        ((sin-hor (sin (* ?*deg-rad* theta)))    ;horizontal sine
         (cos-hor (cos (* ?*deg-rad* theta)))    ;horizontal cosine
        (sin-ver (sin (* ?*deg-rad* phi)))    ;vertical sine
        (cos-ver (cos (* ?*deg-rad* phi)))    ;vertical cosine (denom (+ (- (* (- xi xc) cos-ver sin-hor))
                    -         (* (- zi zc) cos-ver cos-hor)
                        (* (- yi yc) sin-ver))))
    (list
        (+ 0                                                                                            ;?
*offset-hor*
            (round (* ?*focal-length*

(/ (+ (* (- xi xc) cos-hor) (* (- zi zc) sin-hor))
                    denom))))
        (- 0                                                                                            ;?
*offset-ver*
            (round (* ?*focal-length*
                (/ (+ (* (- xi xc) sin-ver sin-hor)
                        (- (* (- zi zc) sin-ver cos-hor))
```

```
                    (* (- yi yc) cos-ver))
              denom))))))
)
;;;###############################################################
;;;
;;;CONVERT IMAGE-COORDINATES
;;;
(defun 1x-image0 (xo)                              ;xo centered around (0,0)
        ;convert old image co-ordinates to smaller window size
     (+ ?*offset-hor* (* ?*scale-hor* xo ))
)
(defun 1y-image0 (yo)                              ;yo centered around (0,0)
        ;convert old image co-ordinates to smaller window size
     (+ ?*offset-ver* (* ?*scale-ver* yo ))
)
;;;###############################################################
;;;
(defun dist2 (x1 y1 x2 y2)
        (let ((dx (- x1 x2)) (dy (- y1 y2)))
           (sqrt (+ (* dx dx) (* dy dy))))
)
;;;
(defun dist1 (x1 x2)
   (write-line (format nil "~%d1: ~F ~F -> ~F" x1 x2 (abs (- x1 x2))))
        (abs (- x1 x2))
)
;;;
(defun convergep (xa1 ya1 xb1 yb1 xa2 ya2 xb2 yb2 thrs) ;getting closer ?
    (let (
                (dx1 (- xa1 xb1))
                (dy1 (- ya1 yb1))
                (dx2 (- xa2 xa2))
                (dy2 (- ya2 yb2)))
          (or (cond
                   ((> xa1 xb1) (> (- xa1 xb1 thrs) (- xa2 xb2)))
                   (t           (> (- xa2 xb2 thrs) (- xa1 xb1))))
              (cond
                   ((> ya1 yb1) (> (- ya1 yb1 thrs) (- ya2 yb2)))
                   (t           (> (- ya2 yb2 thrs) (- ya1 yb1))))))
)
(defun doit ()
   ;convergep (xa1 ya1 xb1 yb1 xa2 ya2 xb2 yb2 thrs) ;getting closer ?
   (convergep   4   0   2   0   4   0   5   0   2   ) ;getting closer ?
)
;;;
(defun DRAW-MOTION-POINTER (dir xc yc label wdw)
   (let ((x-list) (y-list) (r 15) (p 30))
   (when (eq dir 'X)
              (setq x-list (list (- xc r) (+ xc r) (+ xc r) (- xc r) (- xc r))
                    y-list (list (- yc r) (- yc r) (+ yc r) (+ yc r) (- yc r
)))
              (polyline 5 (seq$ x-list) (seq$ y-list) 3 7 wdw))
    (when (eq dir 'R)
              (setq x-list (list (- xc r) (+ xc r) (+ xc r) (- xc r) (- xc r))
                    y-list (list (- yc r) (- yc r) (+ yc r) (+ yc r) (- yc r
)))
              (polyline 5 (seq$ x-list) (seq$ y-list) 1 7 wdw))
    (when (or (eq dir 'L) (eq dir 'A))
              (setq x-list (list (- xc r) (+ xc r) (+ xc r) (- xc r) (- xc p) (-
 xc r))
                    y-list (list (- yc r) (- yc r) (+ yc r) (+ yc r)     yc
 (- yc r)))
              (polyline 6 (seq$ x-list) (seq$ y-list) 3 7 wdw))
    (when (or (eq dir 'R) (eq dir 'A))
              (setq x-list (list (- xc r) (+ xc r) (+ xc p) (+ xc r) (- xc r) (-
 xc r))
                    y-list (list (- yc r) (- yc r)    yc     (+ yc r) (+ yc
 r) (- yc r)))
              (polyline 6 (seq$ x-list) (seq$ y-list) 3 7 wdw))
    (when (or (eq dir 'U) (eq dir 'A))
              (setq x-list (list (- xc r) xc (+ xc r) (+ xc r) (- xc r) (- xc r)
)
```

```
                            y-list (list (- yc r) (- yc p) (- yc r) (+ yc r) (+ yc r
) (- yc r)))
                      (polyline 6 (seq$ x-list) (seq$ y-list) 3 7 wdw))
     (when (or (eq dir 'D) (eq dir 'A))
)                      (setq x-list (list (- xc r) (+ xc r) (+ xc r) xc (- xc r) (- xc r)
                            y-list (list (- yc r) (- yc r) (+ yc r) (+ yc p) (+ yc r
) (- yc r)))
                      (polyline 6 (seq$ x-list) (seq$ y-list) 3 7 wdw))
     (when (or (eq dir 'A) (eq dir 'A))
                      (setq x-list (list (- xc r) xc (+ xc r) (+ xc 17) (+ xc r) xc
                                         (- xc r) (- xc 17) (- xc r))
                            y-list (list (- yc r) (- yc 17) (- yc r) yc (+ yc r)
)                                        (+ yc 17) (+ yc r) yc (- yc r))
)                      (polyline 9 (seq$ x-list) (seq$ y-list) 3 7 wdw))
)
)
;;;;----------
(defun diverging-faster (xa1 ya1 xa2 ya2 xb1 yb1 xb2 yb2 xf yf thrsh)
    (let* (
              (dxa1 (- xa1 xf))
              (dxa2 (- xa2 xf))
              (dya1 (- ya1 yf))
              (dya2 (- ya2 yf))
              (dxb1 (- xb1 xf))
              (dxb2 (- xb2 xf))
              (dyb1 (- yb1 yf))
              (dyb2 (- yb2 yf))
              (ra1 (float (+ (* dxa1 dxa1) (* dya1 dya1))))
              (ra2 (float (+ (* dxa2 dxa2) (* dya2 dya2))))
              (rb1 (float (+ (* dxb1 dxb1) (* dyb1 dyb1))))
              (rb2 (float (+ (* dxb2 dxb2) (* dyb2 dyb2)))))
         (values (> (- (/ ra2 ra1) (/ rb2 rb1)) thrsh) (/ ra2 ra1) (/ rb2 rb1)))
)
(defun doit ()

FRODO:>sklee>DRIVE>z-windows.lisp.32

;;; -*- Mode: LISP; Syntax: zetalisp; Fonts: CPTFONT,CPTFONTB; Package: au; Base: 10;
-*-
;;;
;;;
;;;
(defvar *frame-wdw* nil
)
;;;
(defvar *frame-bit-arr* nil
)
;;;
(defvar *frarr347689654334* nil
)
;;;
(defvar *arr* nil
)
(defun 1make-edge-file-name 0(frame)
     (zl::format nil "~A>edge>f~D.wdw" *edge-directory* frame)
)
;;;
(defun 1make-snap-file-name 0(frame)
     (zl::format nil "~A>snap>f~D.art" *snap-directory* frame)
)
;;;
(defun 1make-disp-file-name 0(frame)
     (zl::format nil "~A>disp>f~D.art" *disp-directory* frame)
)
;;;
```

```
;;;
(defun lcreate-frame-window 0(label h-pos v-pos h-size v-size)
    ;creates a graphics window and returns it as an object
    ;label must be a string
    (let ((wdw
           (tv:make-window
                  'tv:window
                  ':position (list h-pos v-pos)
                  ':inside-size (list h-size v-size)
                  ':label (list ':string label)
                  ':blinker-p nil
                  ':save-bits t
                  ':expose-p t)))
      wdw)
)
;;;
(defun lcreate-shadow-array 0(wdw)
    ;creates an array which can hold the entire window
    (multiple-value-bind (h-size v-size)
            (zl::send wdw :inside-size)
        (tv:make-sheet-bit-array wdw h-size v-size))
)
;;;
(defun lcopy-window-to-array0 (wdw arr)
    ;copies the contents of wdw to arr
    (zl::send wdw :expose)
    (multiple-value-bind (h-size v-size)
            (zl::send wdw :inside-size)
        (zl:send wdw
            :bitblt-from-sheet
                tv:alu-seta
                h-size v-size 0 0 arr 0 0))
)
;;;
(defun lcopy-array-to-window 0(wdw arr)
    ;copies the contents of arr to wdw
    (zl::send wdw :expose)
    (multiple-value-bind (h-size v-size)
            (zl::send wdw :inside-size)
        (zl:send wdw
            :bitblt
                tv:alu-seta
                h-size v-size arr 0 0 0 0))
)
;;;
(defun zoom1-array-to-window 0(wdw arr)
    ;zooms the contents of arr to wdw
    (zl::send wdw :expose)
    (let ((a arr) (b ?*frame-array1*))
        (declare (sys:array-register-1d a b))
        (do ((i 0 (+ i 1))) ((>= i ?*y-size*))
            (let ((k (* i ?*x-size*))
                  (l (* (floor (// i ?*scale-ver*)) ?*hor-max*)))
                (do ((j 0 (+ j 1))) ((>= j ?*x-size*))
                    (setf (sys:%1d-aref b (+ j k))
                          (sys:%1d-aref a (+ (floor (// j ?*scale-hor*)) l)))))))
    (multiple-value-bind ( h-size v-size )
        (zl::send wdw :inside-size)
        (zl:send wdw
            :bitblt
                tv:alu-seta
                h-size v-size ?*frame-array1* 0 0 0 0))
)
;;;
(defun ldump-shadow-array0 (arr file-name)
    (sys:dump-forms-to-file file-name
        (list
            (list 'setq '*frarr347689654334* arr)))
)
;;;
(defun lload-shadow-array0 (filename)
    (zl::load filename)
```

```
*frarr347689654334*
)
;;;
(defun 1clear-zl-window0 (wdw)
    (zl::send wdw :expose)
    (zl::send wdw :clear-window)
)
;;;
(defun 1shade-rectangle 0(spacing width height x0 y0 alu wdw)
    (zl::send wdw :draw-rectangle width height x0 y0 7)  ;clear to black (do ((x x0 (+ x 1)) (w 0 (+ w 1))) ((> w width))
        (unless (zerop (mod x spacing))
          (zl::send wdw :draw-line x y0 x (+ y0 height) 2)))   ;erase vertical line (do ((y y0 (+ y 1)) (h 0 (+ h 1))) ((> h height))
        (unless (zerop (mod y spacing))
          (zl::send wdw :draw-line x0 y (+ x0 width) y 2 )))   ;erase horizontal line
)
;;;
(defun 1store 0(wdw arr)
    (copy-window-to-array wdw arr)
    (dump-shadow-array arr "FRODO:>burger>drive>data>sequ2>edge.wdw")
)
;;;
(defun 1retrieve 0(frame wdw arr)
    (setq arr
        (load-shadow-array (make-edge-file-name frame)))
    (zl::send wdw :expose)
    (zoom-array-to-window wdw arr)
)
;;;
(defun 1show-labeled-disp 0(disp-list wdw-stream solid)
    ;
    (dolist (d disp-list)
        (multiple-value-bind (label x1 y1 x2 y2) (values-list d)
          (setq x1 (round (* (+ ?*offset-hor* x1) ?*scale-hor*))
                y1 (round (* (+ ?*offset-ver* y1) ?*scale-ver*))
                x2 (round (* (+ ?*offset-hor* x2) ?*scale-hor*))
                y2 (round (* (+ ?*offset-ver* y2) ?*scale-ver*))))
        (zl::send wdw-stream :draw-filled-in-circle x2 y2 2 2)    ;erase circle area
        (zl::send wdw-stream :draw-circle x2 y2 2 7)              ;draw outer circle
        (cond (solid
                (zl::send wdw-stream :draw-line x1 y1 x2 y2 7))
              (t (zl::send wdw-stream :draw-dashed-line x1 y1 x2 y2 7 5)))))
)

;;;
;;;
;;;
(defun 1ascii-to-window0 (filename wdw n)
    ;
    (let ((instring (make-string 100)) (pix) (x))
        (zl::send wdw :expose)
        (with-open-file (infile filename)

(do ((i 0 (+ i 1))) ((or (null instring) (>= i n)))
                (setq instring (read-line infile nil nil nil)
                      pix 0)

(do ((j 0 (+ j 1))) ((or (>= j 86) (null instring)))
                    (setq x (- (char-code (char instring j)) 48))

(do ((b 0 (+ b 1))) ((>= b 6))
                        (when (logbitp b x)
                          ;(point (+ b (* j 6)) i 1 7 wdw))

(zl::send wdw :draw-point (+ b (* j 6)) i
                                    tv:alu-seta )))))))
```

```
)
;
;;;
(defun transfer-edge-images (first last)
   (let ((wdw) (arr)
         (help-file
            (format nil "FRODO:>burger>DRIVE>data>sequ2>edge>fxxx.txt")))
              ;"frodo:>hatem>edge-test.txt")))

;create window
      (setq wdw (create-frame-window "TWO-CAR SEQUENCE" 0 0 512 512))
      (setq arr (create-shadow-array wdw))

(do ((i first (+ i 1))) ((> i last))
         (let
            ((srcsip-file
               (format nil
                  ;"srcsip://dyno1//drive//data//twocar//time2100//f~D//edge.txt"
                  ;"altura://mnt1//users//burger//edge"
                     "isavax://n//altura//mnt1//users//jming//temp.asc"
                  ))
             (local-file
                (format nil "FRODO:>jming>temp.wdw"))
             (label
                (format nil "TEST IMAGE")))

(clear-zl-window wdw)
            (zl::send wdw ':draw-string
                  (zl::string (format nil "TEST IMAGE")) 60 40)

;get edge-file from SRCSIP
            (zl::copyf srcsip-file help-file)

;(zl::send wdw ':set-label
            ;   (list ':string
            ;      (zl::string (format nil "SEQUENCE 2    FRAME ~D" i))))

;display it in window
            (ascii-to-window help-file wdw 512)

;dump window to local edge.wdw file
            (copy-window-to-array wdw arr)
            (dump-shadow-array arr local-file)

;delete help-file
            ;(zl::deletef help-file)
            )))
)
;;;
(defun redisplay-edge-images (first last)
   (let ((wdw) (arr))

;create window
      (setq wdw (create-frame-window "TWO-CAR SEQUENCE" 0 0 512 512))
      (setq arr (create-shadow-array wdw))

(do ((i first (+ i 1))) ((> i last))
         (let
            ((local-file (make-edge-file-name i)))
               ;(format nil "FRODO:>burger>DRIVE>data>sequ2>edge>f~D.wdw" i)))

;retrieve image from local edge.wdw file
            (setq arr (load-shadow-array local-file))
            (copy-array-to-window wdw arr)
            )))
)
;;;
(defun redisplay-marked-edge-images (first last)
   (let ((wdw1) (wdw2) (arr) (snapshot) (local-file))

;create window
```

```
      (setq wdw1 (create-frame-window "TWO-CAR SEQUENCE" 10 10 512 512))
      (setq wdw2 (create-frame-window "TWO-CAR SEQUENCE" 540 10 512 512))
      (setq arr (create-shadow-array wdw1))

(do ((i first (+ i 1))) ((> i last))
        (let ((wdw
                    (cond ((oddp i) wdw1) (t wdw2))))
           (setq local-file (make-edge-file-name i))
           ;retrieve image from local edge.wdw file
           (setq arr (load-shadow-array local-file))
           (copy-array-to-window wdw arr)
           (setq snapshot
                 (read-back-snapshot i))
           (mark-list-of-points snapshot i wdw))
        ))
)
;;;
;;;========================================
;;;
(defun trace-points (start end first-point)
    (zl::pkg-goto 'au)
    (let ((wdw) (arr) (image-file)
          (frame)
          (point-list '()) (snapshot '()))

(setq wdw (create-frame-window "TWO-CAR SEQUENCE" 0 0 512 512)
              arr (create-shadow-array wdw))
        (zl::send wdw :expose)
        (tv:with-mouse-and-buttons-grabbed-on-sheet (wdw)
           (tv:mouse-set-blinker-definition
               ':character 2 6 ':on ':set-character 20 'fonts:mouse)
           (setq tv:who-line-mouse-grabbed-documentation
                    "IMAGE: L:forward  M:skip  R:backward      CORNER: L:next point  M:exit  R:delete this point")
   ;trace point after point (do ((point first-point (+ point 1)) (done nil)) (done)           ;loop thru points
       (setq point-list '())
       (setq frame start)

(do ((new-point nil))
             ((or done new-point))                  ;loop through frames ;retrieve image from local edge.wdw file
         (setq image-file
             (make-edge-file-name frame))
              ;(zl::string-append
              ;*edge-directory* "f"(zl::format nil ""D" frame) ".wdw"))

(setq arr (load-shadow-array image-file))
         (copy-array-to-window wdw arr)
         (display-point-number wdw point)

;retrieve previous point marks in this frame
         (setq snapshot
            (read-back-snapshot frame))

;display previous point marks
         (mark-list-of-points snapshot frame wdw)
         ;display current marks (if any)
         (mark-list-of-points point-list frame wdw)

(multiple-value-bind (code x y) (tv:wait-for-mouse-button-down)
              (case tv:mouse-last-buttons
                 ((1)  ;left button
                  (cond
                    ((in-number-field x y)              ;clicked inside point-number
                      (cond ((endp point-list)
                              (write-line (format nil "*** NO TRACE SO FAR ***"))))
                     (t
```

```
                              ;forward to new point
                              (write-out-list-of-points point-list)
                              (setq new-point t))))
                  (t
                     (unless (endp point-list)
                        (when (= (third (car point-list)) frame)
                           (pop point-list)))        ;remove point for previous mark
                     ;mark point
                     (push (list 'ip point frame x y) point-list)
                     (mark-single-point point x y wdw)
                     (write-line (format nil "~A" point-list))
                     (cond ((< frame end)
                            ;go forward to next frame
                            (setq frame (+ frame 1)))
                           (t
                            (write-out-list-of-points point-list)
                            (setq new-point t))))))))

((2)   ;middle button
               (cond
                  ((in-number-field x y)              ;clicked inside point-number
                     ;terminate from point-tracking
                     (unless (endp point-list)        ;first save last point
                        (write-out-list-of-points point-list))
                     (setq done t))
                  (t
                     ;if point has not been marked yet, just go forward
                     (cond ((and (endp point-list) (< frame end))
                            (setq frame (+ frame 1)))
                           ;else give error message
                           (t (write-line (format nil "*** NO SKIPPING NOW ***")))))))

((4)   ;right button
               (cond
                  ((in-number-field x y)              ;clicked inside point-number
                     ;delete this point
                     (setq point-list '())
                     (setq frame start))
                  (t
                     ;step one frame back
                     (unless (<= frame start)
                        (setq frame (- frame 1))))))

))))))
)
(defun in-number-field (x y)
       (and (> x 470) (< y 30))
)
;;;
(defun display-point-number (wdw pn)
   (let ((xl 40) (yl 30))
      (zl::send wdw ':draw-rectangle xl yl (- 512 xl) yl tv:alu-andca)
      (zl::send wdw ':draw-line (- 512 xl) 0 (- 512 xl) yl)
      (zl::send wdw ':draw-line (- 512 xl) yl 512 yl)
      (zl::send wdw ':draw-string
            (zl::string (format nil "P~D" pn)) (+ (- 512 xl) 5) (- yl 5)))
)
;;;
(defun write-out-list-of-points (point-list)
       ;append to frame-file.
    (let ((snapshot))

(dolist (point point-list)
         (multiple-value-bind (ip pid frame x y)
                 (values-list point)
            (setq snapshot
                  (read-back-snapshot frame))          ;pass filename here
            (cond
               ((null snapshot)
                (write-out-snapshot (list 'assert point) frame))
```

```
              (t
                (write-out-snapshot (cons 'assert (cons point snapshot)) frame))))))
)
;;;
(defun write-out-snapshot (snapshot frame)
   (let ((snap-file
           (make-snap-file-name frame)))
      (with-open-file
              (outfile snap-file :direction :output
                       :if-exists :new-version
                       :if-does-not-exist :create)
              (format outfile "~A ~%" snapshot)))
)
;;;
(defun read-back-snapshot (frame)
   (let ((frame-file (make-snap-file-name frame))
         (exist) (old-snapshot nil))
      (setq exist (probe-file frame-file))
      (cond
       ( exist
         (with-open-file
              (infile frame-file :direction :input
                      :if-does-not-exist nil)
              (setq old-snapshot (read infile)))
         (cdr old-snapshot))              ;eliminate "assert" from beginning of list
       (t nil)))

)

;;;
(defun mark-single-point (pt x y wdw)
   (let ((X (floor (* x ?*scale-hor*))) (Y (floor (* y ?*scale-ver*))))
      (cond (((< pt 100)
             (zl::send wdw ':draw-triangle X Y  (+ X 10) Y  X (+ Y -10)  tv:alu-andca)
             (zl::send wdw ':draw-line X Y X (+ Y -10) tv:alu-ior)
             (zl::send wdw ':draw-line X Y  (+ X 10) Y tv:alu-ior)

(zl::send wdw ':draw-filled-in-circle (+ X 10) (+ Y -10) 10 tv:alu-andca)
             (zl::send wdw ':draw-circle           (+ X 10) (+ Y -10) 10 tv:alu-ior)
             (multiple-value-bind (txt xc yc)
                (center-text X (+ Y -20) (+ X 20) Y (format nil "~D" pt) 'cptfont)
                (zl::send wdw ':draw-string txt xc yc)))
            ((< pt 1000)
             (zl::send wdw ':draw-triangle X Y  (+ X 10) Y  X (+ Y -10)  tv:alu-andca)
             (zl::send wdw ':draw-line X Y X (+ Y -10) tv:alu-ior)
             (zl::send wdw ':draw-line X Y  (+ X 10) Y tv:alu-ior)

(zl::send wdw ':draw-filled-in-circle (+ X 15) (+ Y -15) 15 tv:alu-andca)
             (zl::send wdw ':draw-circle           (+ X 15) (+ Y -15) 15 tv:alu-ior)
             (multiple-value-bind (txt xc yc)
                (center-text X (+ Y -30) (+ X 30) Y (format nil "~D" pt) 'cptfont)
                (zl::send wdw ':draw-string txt xc yc)))
            ((< pt 10000)
             (zl::send wdw ':draw-triangle X Y  (+ X 10) Y  X (+ Y -10)  tv:alu-andca)
             (zl::send wdw ':draw-line X Y X (+ Y -10) tv:alu-ior)
             (zl::send wdw ':draw-line X Y  (+ X 10) Y tv:alu-ior)

(zl::send wdw ':draw-filled-in-circle (+ X 20) (+ Y -20) 20 tv:alu-andca)

(zl::send wdw ':draw-circle           (+ X 20) (+ Y -20) 20 tv:alu-ior)
             (multiple-value-bind (txt xc yc)
                (center-text X (+ Y -40) (+ X 40) Y (format nil "~D" pt) 'cptfont)
                (zl::send wdw ':draw-string txt xc yc)))))
)
;;;
(defun mark-list-of-points (point-list frame wdw)
   (dolist (assertion point-list)
      (multiple-value-bind (ip pid fr x y) (values-list assertion)
         (when (= frame fr) (mark-single-point pid x y wdw))))
)
;;;
```

```
(defun relabel-snapshots (first-frame)
  (let ((N 1) (old-snapshot) (new-snapshot) (old-label-list '())
        (new-label) (old-new))

(do ((frame first-frame (+ frame 1)) (done nil ()))
        ((or () frame (+ first-frame 100)) done))

(setq old-snapshot (read-back-snapshot frame))
      (write-line (format nil "~%reading frame ~D ~A" frame old-snapshot))
      (cond
        ((consp old-snapshot)                    ;does exist (setq
           old-snapshot (reverse old-snapshot)
           new-snapshot '())
         (dolist (point old-snapshot)
           (multiple-value-bind (ip old-label time x y)
                                (values-list point)

(setq old-new (find old-label old-label-list :key 'car))
             (cond                               ;this is a new label
               ((null old-new)
                (setq new-label N
                      N (+ N 1))
                (push (list old-label new-label) old-label-list)
                (write-line (format nil "new ~D -> ~D" old-label new-label)))
               (t                                ;this is an old label
                (setq new-label (second old-new))
                (write-line (format nil "old ~D -> ~D" old-label new-label))))

(push (list ip new-label time x y) new-snapshot)))

(write-out-snapshot (cons 'assert new-snapshot) frame))

(t (setq done t))))))
)

; #!(z!::load "FRODO:>burger>DRIVE>z-windows.lisp" 'su nil);
; #L(art-load "FRODO:>burger>DRIVE>data>sequ2>tracs>point1.art")
```

We claim:

1. A qualitative detection and tracking system for a mobile platform, comprising:

sensing means, mounted on the mobile platform, for acquiring images having entities, wherein each of the entities is either mobile or stationary relative to a world frame of reference;

selecting means, connected to said sensing means, for selecting features from the images;

matching means, connected to said selecting means, for matching the features of successive frames of the images, thereby resulting in two-dimensional displacement vectors between distinct features of the successive frames;

computing means, connected to said matching means, for computing possible focus of expansion locations within the images, from the two-dimensional displacement vectors;

combining means, connected to said computing means, for combining possible focus of expansion locations, thereby resulting in a fuzzy focus of expansion that indicates the approximate direction of heading and amount of rotation in space of the sensing means;

derotation means, connected to said computing means, for removing effects of rotation of said sensing means from the images so as to output derotated two-dimensional displacement vectors;

generating means, connected to said combining means and to said derotation means, for generating hypotheses of qualitative properties of entities in the images, that indicate which entities are in motion relative to the world frame of reference, which entities are stationary relative to the world frame of reference, and which entities are closer to the mobile platform;

qualitative scene model, connected to said generating means, for providing a qualitative three-dimensional representation of the images, wherein the three-dimensional representation is derived from the hypotheses; and verification means, connected to said qualitative scene model, to said combining means and to said derotation means, for testing the hypotheses for consistency with changes occurring in the images and for deleting hypotheses that are inconsistent with changes occurring in the images, and, in turn, for indicating, according to the hypotheses that are consistent, stationary entities and mobile entities in the images, and for indicating the stationary entities to said computing means.

2. A detection and tracking system for a mobile platform, comprising:

qualitative scene model for providing a three-dimensional representation from a scene from a field of view from a platform in a world, from two-dimensional images, from hypotheses of qualitative properties of entities in the images, that indicate which entities are in motion relative to a world frame of reference, which entities are stationary relative to the world frame of reference, and which entities are closer to the mobile platform, and from premises about the world;

generation means, connected to said qualitative scene model, for generating the hypotheses;

verification means, connected to said qualitative scene model, for verifying internal consistency of the hypotheses and verifying compatibility of the hypotheses with the two-dimensional images;

derotation means, connected to said generation means and to said verification means, for removing effects of rotation from the two-dimensional images;

fuzzy focus of expansion means, connected to said generation means, to said verification means and to said derotation means, for computing a fuzzy focus of expansion wherein said fuzzy focus of expansion locations for each of the two-dimensional images; and computing means, connected to said verification means, to said derotation means and to said fuzzy focus of expansion means, for computing the possible focus of expansion locations.

3. A qualitative detection and tracking system for a mobile platform, comprising:

a three-dimensional qualitative scene model having interpretations about distance and motion of entities in a scene relative to a world frame of reference, wherein each interpretation is a set of hypotheses about the entities, which portrays a three-dimensional view of the entities for three-dimensional scene model generation;

sensing means, mounted on the mobile platform, for sensing two-dimensional images from the scene;

computing means, connected to said sensing means, for selecting a set of points in each of two consecutive images and for computing displacement vectors for the two sets of points;

focus of expansion means, connected to said computing means, for computing a focus of expansion location from the displacement vectors and for using the focus of expansion location in a subsequent image after said each of two consecutive images;

derotation means, connected to said computing means, for mapping each set of points to locations in the images that the points would be at if said sensing means had not rotated about any axis;

fuzzy focus of expansion means, connected to said derotation means and to said focus of expansion means, for computing a region of possible focus of expansion locations, wherein the region is based on a calculated error of the focus of expansion location for the subsequent image;

generator means, connected to said qualitative scene model and to said fuzzy focus of expansion means, for generating, from the two-dimensional images, the sets of hypotheses that form the interpretations incorporated by said qualitative scene model, wherein the hypotheses are of qualitative properties of entities in the images, that indicate which entities are in motion relative to the world frame of reference, which entities are stationary relative to the world frame of reference, and which entities are closer to the mobile platform; and verification means, connected to said qualitative scene model, to said fuzzy focus of expansion means and to said focus of expansion means, for verifying the hypotheses and for indicating the interpretations of the qualitative scene model that have all hypotheses consistent with other hypotheses and information in the images, and for indicating stationary entities to said focus of expansion means.

4. A qualitative three-dimensional detection and tracking method for a mobile platform, comprising:

sensing two-dimensional images, having a world frame of reference, from a mobile platform;

selecting entities in the images;

determining two-dimensional displacement vectors from successive images;

computing a focus of expansion location from the two-dimensional displacement vectors of successive images;

computing a fuzzy focus of expansion region that is a qualitative indication of a location of the focus of expansion, wherein said region is an area of possible focus of expansion locations for each image;

determining an approximate direction of heading and amount of rotation from the fuzzy focus of expansion of said sensing from the mobile platform;

removing the effects of rotation of said sensing from the images;

generating hypotheses of qualitative properties of entities in the images, that indicate which entities are in motion relative to the world frame of reference, which entities are stationary relative to the world frame of reference, and which entities are closer to the mobile platform;

constructing interpretations of the images from the hypotheses, wherein each interpretation is a set of hypotheses, which portrays a three-dimensional view of the entities for three-dimensional scene model construction;

verifying the hypotheses of each interpretation that have internal consistency with one another and are compatible with the fuzzy focus of expansion;

rejecting each interpretation that has at least one hypothesis of the same interpretation or that is incompatible with the fuzzy focus of expansion of the image of the interpretation; and constructing a qualitative three-dimensional scene model from the interpretations having verified hypotheses.

5. A qualitative three-dimensional detection and tracking system for a mobile system, comprising;

a camera, mounted on the mobile platform, wherein said camera acquires sequential two-dimensional images in a world frame of reference;

a first computer, connected to said camera, wherein said computer processes the images, track tokens from successive images, matches the tokens in corresponding images, and determines two-dimensional displacement vectors from the tokens of the successive images;

a bidirectional network protocol device connected to said first computer; and a second computer, connected to said protocol device, wherein said protocol device interfaces said first and second computers, and wherein said second computer derotates the displacement vectors to remove rotation effects of said camera from the vectors, computes a fuzzy focus of expansion that is a region of possible focus of expansion locations for each image, generating hypotheses that indicate which tokens are stationary and which tokens are mobile relative to the world frame of reference and which tokens are closer to said camera, constructing interpretations of the images from the hypotheses, wherein each interpretation is a set of hypotheses, that portrays a three-dimensional view of the tokens for three-dimensional scene model construction, rejecting interpretations having at least one hypothesis that is inconsistent with any other hypothesis or is incompatible with the fuzzy focus of expansion, and constructing a qualitative three-dimensional scene model from the remaining interpretations.

* * * * *

UNITED STATES PATENT AND TRADEMARK OFFICE
CERTIFICATE OF CORRECTION

PATENT NO. : 5,036,474

DATED : July 30, 1991

INVENTOR(S) : Bir Bhanu, Wilhelm Burger

It is certified that error appears in the above-identified patent and that said Letters Patent is hereby corrected as shown below:

Column 104, line 42, after "hypotheses" add -- having internal inconsistency with any other hypotheses --

Column 104, line 54, cancel "track" and insert -- tracks --

Signed and Sealed this

Second Day of February, 1993

*Attest:*

STEPHEN G. KUNIN

*Attesting Officer*   *Acting Commissioner of Patents and Trademarks*